(12) United States Patent
Richardson

(10) Patent No.: US 10,219,647 B2
(45) Date of Patent: *Mar. 5, 2019

(54) PORTABLE COFFEE BREWING DEVICE

(71) Applicant: Brett C. Richardson, Clive, IA (US)

(72) Inventor: Brett C. Richardson, Clive, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,895

(22) Filed: May 15, 2018

(65) Prior Publication Data

US 2018/0263403 A1  Sep. 20, 2018

Related U.S. Application Data

(63) Continuation-in-part of application No. 15/660,504, filed on Jul. 26, 2017, which is a continuation of application No. 15/246,598, filed on Aug. 25, 2016, now Pat. No. 9,743,797, which is a continuation-in-part of application No. 14/585,317, filed on Dec. 30, 2014, now Pat. No. 9,743,796.

(60) Provisional application No. 61/922,239, filed on Dec. 31, 2013.

(51) Int. Cl.
| | |
|---|---|
| A47J 31/00 | (2006.01) |
| A23F 5/26 | (2006.01) |
| A47J 31/057 | (2006.01) |
| A47J 31/06 | (2006.01) |

(52) U.S. Cl.
CPC ............... *A47J 31/005* (2013.01); *A23F 5/26* (2013.01); *A47J 31/0576* (2013.01); *A47J 31/0626* (2013.01)

(58) Field of Classification Search
CPC .. A47J 31/0576; A47J 31/0626; A47J 31/005; A23F 5/26

USPC ....................................................... 99/302 R
See application file for complete search history.

(56) References Cited

U.S. PATENT DOCUMENTS

| | | | | |
|---|---|---|---|---|
| 1,414,494 A | * | 5/1922 | Arntfield | A47J 27/004 219/415 |
| 1,774,927 A | * | 9/1930 | Lambert | A47J 31/306 99/303 |
| 1,962,165 A | * | 6/1934 | Wilcox | A47J 31/103 99/282 |
| 1,990,508 A | * | 2/1935 | Wilcox | A47J 31/103 99/282 |
| 2,025,426 A | * | 12/1935 | Walker | F28D 1/024 165/122 |

(Continued)

*Primary Examiner* — Eric Stapleton
(74) *Attorney, Agent, or Firm* — Christopher A. Proskey; BrownWinick Law Firm

(57) ABSTRACT

A portable coffee brewing device includes a lid pivotally connected to an upper end of the container by a hinge and button. A heating element housing and an electrical component housing is connected to a lower end of the container. A drain is positioned in a bottom wall of the container and is fluidly connected to a heating element positioned within the heating element housing. The heating element is controlled by electrical components positioned in the electrical components housing. A drip tube is fluidly connected to the heating element and the lid. A single serve coffee holding device is positioned below the lid. When the container is filled with fluid and the heating element is powered, heated fluid is forced up the drip tube through the passageway in the lid and into the coffee grounds holding device in a continuous cycle. The device is connectable to an external power source.

25 Claims, 43 Drawing Sheets

(56) References Cited

U.S. PATENT DOCUMENTS

| | | | | |
|---|---|---|---|---|
| 2,057,421 | A | * | 10/1936 | Dickson ............... A47J 37/041 126/41 B |
| 2,175,727 | A | * | 10/1939 | Graham ............... A47J 31/053 392/444 |
| 2,346,389 | A | * | 4/1944 | Peters ............... A47J 31/057 219/518 |
| 2,419,416 | A | * | 4/1947 | Mustain ............ B65D 81/3881 126/246 |
| 2,516,637 | A | * | 7/1950 | McCollum ......... A47J 36/2433 219/433 |
| 2,560,214 | A | * | 7/1951 | Cameron ............... A47J 31/20 219/445.1 |
| 2,730,034 | A | * | 1/1956 | Svendsgaard .......... A47J 31/40 210/141 |
| 2,824,509 | A | * | 2/1958 | Trogden ............. A47J 31/0576 99/292 |
| 2,863,037 | A | * | 12/1958 | Johnstone .......... A47J 36/2466 165/135 |
| 2,880,664 | A | * | 4/1959 | Bagarozy ........... A47J 31/0663 99/283 |
| 2,893,307 | A | * | 7/1959 | Latorre Rodriguez ..................... A47J 37/041 126/275 E |
| 2,953,171 | A | * | 9/1960 | Arnett ................... G07F 13/065 141/174 |
| 3,004,130 | A | * | 10/1961 | Miller .................... F24H 1/185 219/202 |
| 3,083,450 | A | * | 4/1963 | Harvey ................. A47G 19/14 219/428 |
| 3,087,415 | A | | 4/1963 | Kaplan |
| 3,264,973 | A | * | 8/1966 | Tavera ................. A47J 31/053 99/295 |
| 3,327,613 | A | * | 6/1967 | Davis ................... A47J 31/408 222/335 |
| 3,374,897 | A | * | 3/1968 | Martin .................. A47J 31/446 210/455 |
| 3,375,774 | A | * | 4/1968 | Fujimura ............. A47J 31/053 219/441 |
| 3,467,816 | A | * | 9/1969 | Wahlberg ........... A47J 36/2461 219/202 |
| 3,473,463 | A | * | 10/1969 | McKnight ............. A47J 31/10 99/288 |
| 3,589,273 | A | * | 6/1971 | Karlen ................. A47J 31/057 99/307 |
| 3,798,418 | A | * | 3/1974 | Reik ........................ B01L 7/00 219/433 |
| 4,070,956 | A | * | 1/1978 | Brown ................ A47J 31/4478 392/467 |
| 4,095,090 | A | * | 6/1978 | Pianezza ............ A47G 19/2288 219/435 |
| 4,121,093 | A | * | 10/1978 | Wainwright ............ H05B 3/56 219/528 |
| 4,143,589 | A | | 3/1979 | Weber |
| 4,149,454 | A | * | 4/1979 | Kemp ................. A47J 31/0621 210/481 |
| 4,215,267 | A | * | 7/1980 | Kaebitzsch ........... A47J 27/004 219/432 |
| 4,309,940 | A | * | 1/1982 | Lowerre, Jr. ....... A47J 31/0573 99/281 |
| 4,463,664 | A | * | 8/1984 | Peace ................. A47J 36/2461 126/390.1 |
| 4,506,597 | A | * | 3/1985 | Karns ................. A47J 31/106 99/295 |
| 4,642,190 | A | * | 2/1987 | Zimmerman ........... B67C 11/02 210/464 |
| 4,674,400 | A | * | 6/1987 | Rondel ................. A47J 31/30 99/279 |
| 4,704,954 | A | * | 11/1987 | Mollenhoff ........... A47J 31/005 99/279 |
| 4,798,222 | A | * | 1/1989 | Kauffman ........... A47J 31/0605 137/132 |
| 4,801,782 | A | * | 1/1989 | Ineson ................ A47J 36/2466 219/438 |
| 4,801,783 | A | * | 1/1989 | Milroy ................. H01R 12/613 219/541 |
| 4,967,647 | A | | 11/1990 | King |
| 4,983,798 | A | * | 1/1991 | Eckler .................... A47G 23/04 126/246 |
| 5,068,196 | A | * | 11/1991 | Hays ..................... G01N 17/008 422/53 |
| 5,208,896 | A | * | 5/1993 | Katayev ............. A47J 36/2433 219/432 |
| 5,233,914 | A | * | 8/1993 | English ................ A47J 31/005 99/282 |
| 5,283,420 | A | * | 2/1994 | Montalto ........... A47G 19/2288 219/432 |
| 5,440,972 | A | * | 8/1995 | English ................ A47J 31/005 99/282 |
| 5,508,494 | A | * | 4/1996 | Sarris .................... A47J 31/005 219/385 |
| 5,644,972 | A | * | 7/1997 | Dahmen .............. A47J 31/007 426/433 |
| 5,671,325 | A | * | 9/1997 | Roberson ................ A47J 31/41 222/146.5 |
| 5,694,115 | A | * | 12/1997 | Desatoff ................ A47J 31/44 307/140 |
| 5,823,095 | A | * | 10/1998 | Walker ............... A47J 31/4439 99/281 |
| 5,842,353 | A | * | 12/1998 | Kuo-Liang ........ A47G 19/2288 62/190 |
| 5,927,179 | A | * | 7/1999 | Mordini .................. A47J 31/08 99/304 |
| 6,037,570 | A | * | 3/2000 | Noles .................. A47J 27/2105 219/432 |
| 6,072,161 | A | * | 6/2000 | Stein .................. A47G 19/2288 219/386 |
| 6,075,229 | A | * | 6/2000 | Vanselow ........... A47J 36/2461 219/432 |
| 6,101,835 | A | * | 8/2000 | Butsch ................ B67D 1/0864 222/146.1 |
| 6,118,933 | A | * | 9/2000 | Roberson ................ A47J 31/41 222/146.5 |
| 6,121,585 | A | * | 9/2000 | Dam ................... A47G 19/2288 219/385 |
| 6,140,614 | A | * | 10/2000 | Padamsee ........... A47J 36/2466 219/438 |
| 6,142,063 | A | | 11/2000 | Beaulieu et al. |
| 6,192,787 | B1 | * | 2/2001 | Montalto ............ A47J 36/2472 219/430 |
| 6,250,208 | B1 | * | 6/2001 | Helps .................. A47J 31/0615 99/279 |
| 6,279,460 | B1 | * | 8/2001 | Pope .................... A47J 31/0615 426/433 |
| 6,281,611 | B1 | * | 8/2001 | Chen ....................... A47J 36/26 219/201 |
| 6,350,969 | B1 | * | 2/2002 | Rothchild ............. C04B 37/021 219/505 |
| 6,353,213 | B1 | * | 3/2002 | Miller ................... A47J 31/542 219/628 |
| 6,403,928 | B1 | * | 6/2002 | Ford .................... A47J 36/2461 219/386 |
| 6,511,031 | B2 | * | 1/2003 | Lin ..................... A47G 19/2261 220/719 |
| 6,516,141 | B1 | * | 2/2003 | DeSantis ................ A47J 31/56 222/146.5 |
| 6,571,686 | B1 | * | 6/2003 | Riley ................... A47J 31/057 99/299 |
| 6,641,304 | B1 | * | 11/2003 | Ang ....................... F16L 11/12 236/93 R |
| 6,674,052 | B1 | * | 1/2004 | Luo ..................... A47J 41/0077 219/432 |
| 6,703,590 | B1 | * | 3/2004 | Holley, Jr. .......... A47J 36/2433 126/265 |
| 6,840,159 | B1 | * | 1/2005 | Li .......................... A47J 27/05 99/337 |
| 6,852,954 | B1 | * | 2/2005 | Liu ....................... A47J 41/005 219/387 |

(56) References Cited

U.S. PATENT DOCUMENTS

| | | | | |
|---|---|---|---|---|
| 6,870,135 B2* | 3/2005 | Hamm | A47J 36/2433 | 219/202 |
| 6,964,224 B2* | 11/2005 | Minamigawa | A47J 27/06 | 99/403 |
| 7,291,812 B2* | 11/2007 | Kaney | A47J 27/004 | 219/432 |
| 7,455,011 B2* | 11/2008 | Brouwer | A47J 31/0678 | 426/433 |
| 7,581,489 B2 | 9/2009 | Van Hattem et al. | | |
| 7,798,373 B1* | 9/2010 | Wroblewski | B05B 11/00 | 222/1 |
| 7,980,422 B2* | 7/2011 | Lassota | A47J 31/50 | 222/146.2 |
| 8,225,708 B2* | 7/2012 | Lassota | A47J 31/56 | 219/477 |
| 8,286,547 B1* | 10/2012 | Lassota | A47J 31/20 | 99/283 |
| 8,726,789 B2 | 5/2014 | Clark | | |
| 9,486,107 B2 | 11/2016 | Kobylarz | | |
| 9,526,373 B2 | 12/2016 | Olsen | | |
| 9,743,796 B2* | 8/2017 | Richardson | A47J 31/005 | |
| 9,743,797 B2* | 8/2017 | Richardson | A47J 31/0576 | |
| 2002/0020302 A1* | 2/2002 | Heczko | A23L 2/00 | 99/317 |
| 2002/0023912 A1* | 2/2002 | McGee | A47J 36/2461 | 219/432 |
| 2002/0094481 A1* | 7/2002 | Goto | H01M 4/364 | 429/218.1 |
| 2002/0096512 A1* | 7/2002 | Abbott | B29C 45/73 | 219/543 |
| 2002/0175158 A1* | 11/2002 | Sanoner | A47G 19/2227 | 219/387 |
| 2003/0079613 A1* | 5/2003 | Williamson | A47J 31/52 | 99/282 |
| 2004/0020369 A1* | 2/2004 | Long | A47J 31/005 | 99/307 |
| 2004/0025702 A1* | 2/2004 | Cutter | A47J 27/21 | 99/279 |
| 2004/0055472 A1* | 3/2004 | Stoner | A47J 31/3685 | 99/295 |
| 2004/0055473 A1* | 3/2004 | Stoner | A47J 31/36 | 99/295 |
| 2004/0140304 A1* | 7/2004 | Leyendecker | A47J 36/2433 | 219/386 |
| 2005/0016985 A1* | 1/2005 | Haas | A61L 9/03 | 219/438 |
| 2005/0092736 A1* | 5/2005 | Raterman | B05B 7/1693 | 219/508 |
| 2005/0160918 A1* | 7/2005 | Winstanley | A47J 31/34 | 99/279 |
| 2005/0199130 A1* | 9/2005 | Palese | A47J 31/005 | 99/279 |
| 2005/0247206 A1* | 11/2005 | Lyall, III | A47J 31/52 | 99/280 |
| 2005/0252382 A1* | 11/2005 | Gamez Duch | A47J 31/005 | 99/279 |
| 2005/0284302 A1* | 12/2005 | Levin | A61J 9/00 | 99/275 |
| 2005/0284303 A1* | 12/2005 | Zell | A47J 31/005 | 99/279 |
| 2006/0163232 A1* | 7/2006 | Hollander | H05B 3/46 | 219/202 |
| 2006/0186297 A1* | 8/2006 | Lore, Sr. | B60N 3/103 | 248/311.2 |
| 2007/0137495 A1* | 6/2007 | Talbert | A47J 31/20 | 99/286 |
| 2007/0221067 A1* | 9/2007 | Scelza | A47J 31/005 | 99/279 |
| 2008/0236401 A1* | 10/2008 | Levin | A47J 31/005 | 99/295 |
| 2008/0302252 A1* | 12/2008 | O'Brien | A47J 31/005 | 99/302 R |
| 2009/0038317 A1* | 2/2009 | Otey | F25B 21/04 | 62/3.2 |
| 2009/0077992 A1* | 3/2009 | Anderson | B01D 1/02 | 62/291 |
| 2009/0285570 A1* | 11/2009 | Yeh | A47J 27/21033 | 392/501 |
| 2010/0000980 A1* | 1/2010 | Popescu | A47J 36/20 | 219/201 |
| 2010/0086650 A1* | 4/2010 | Levin | A47J 31/005 | 426/78 |
| 2010/0089901 A1* | 4/2010 | Montana | A47J 36/2466 | 219/385 |
| 2010/0098823 A1* | 4/2010 | Nenov | A47J 31/36 | 426/433 |
| 2010/0199852 A1* | 8/2010 | Webster | A47J 31/0605 | 99/306 |
| 2010/0282089 A1* | 11/2010 | Boussemart | A47J 27/21 | 99/281 |
| 2011/0103779 A1* | 5/2011 | Baston | A47J 31/005 | 392/444 |
| 2012/0167778 A1* | 7/2012 | Popeil | A47J 37/1209 | 99/339 |
| 2012/0210876 A1* | 8/2012 | Glucksman | A47J 31/4407 | 99/281 |
| 2012/0298676 A1* | 11/2012 | Cooks | B65D 1/04 | 220/592.21 |
| 2013/0098893 A1* | 4/2013 | Soule | A47J 36/2461 | 219/441 |
| 2013/0186280 A1* | 7/2013 | Sekiguchi | A47J 31/005 | 99/287 |
| 2013/0200063 A1* | 8/2013 | Cooke | A47J 41/0044 | 219/439 |
| 2013/0200064 A1* | 8/2013 | Alexander | A47G 19/2288 | 219/441 |
| 2013/0306617 A1* | 11/2013 | Soule | A47G 19/2288 | 219/442 |
| 2013/0312617 A1* | 11/2013 | Toporovsky | A47J 31/005 | 99/280 |
| 2014/0072684 A1* | 3/2014 | Madden | A47J 31/005 | 426/431 |
| 2015/0182059 A1* | 7/2015 | Richardson | A47J 31/005 | 99/302 R |
| 2016/0000252 A1 | 1/2016 | Olsen | | |
| 2016/0360917 A1* | 12/2016 | Richardson | A47J 31/0576 | |
| 2017/0340159 A1* | 11/2017 | Richardson | A47J 31/0576 | |

* cited by examiner

PORTABLE COFFEE BREWING DEVICE

CROSS REFERENCE TO RELATED APPLICATION

This application is a continuation-in-part of U.S. patent application Ser. No. 15/660,504 which was filed on Jul. 27, 2017, which is a continuation of U.S. patent application Ser. No. 15/246,598 which was filed on Aug. 25, 2016, which was a continuation-in-part of U.S. patent application Ser. No. 14/585,317 filed on Dec. 30, 2014, which claims the benefit of U.S. Provisional Application No. 61/922,239 filed Dec. 31, 2013.

BACKGROUND OF THE INVENTION

This invention relates to coffee brewing. More specifically, and without limitation, this invention relates to a portable coffee brewing device.

Coffee brewing is old and well known in the art. Initially, coffee was brewed by mixing ground coffee beans with water in a pot or other vessel which was placed over a source of heat. As the water warmed, the ground beans released flavors into the water, thereby forming what is known as coffee. Once this process was completed, the coffee grounds were separated from the coffee and the coffee was consumed.

With the advent and mass adoption of electricity, the technology of coffee brewing took a major leap forward. With the use of electricity, countless forms and designs of coffee machines or coffee makers (hereinafter "coffee makers") were developed. Manufacturers of these coffee makers include Cuisinart, Mr. Coffee, Hamilton Beach, Kitchen Aid, Bunn and countless others. Conventionally these devices include a base, an internal heating element which is connected to a source of electricity, a reservoir for holding water, a pot to receive the coffee and a coffee grounds holding device to hold the coffee grounds. Typically, these devices are designed to sit on a counter top and be used in a kitchen in a stationary and non-portable manner. As such, these conventional coffee makers are often bulky and are formed of multiple pieces and therefore these devices are not easily portable.

Understanding that conventional coffee makers are generally non-portable, yet many coffee drinkers like to take their coffee with them in the morning to work or to run errands, some manufacturers developed what are commonly known as personal coffee makers. These personal coffee makers are designed to make a single serving of coffee that can be poured into a to-go cup or travel mug. Some of these personal coffee makers are even designed to pour directly into the cup or travel mug, thereby avoiding the additional step of having to pour the coffee from the pot into the cup or travel mug. While these personal coffee makers have made it somewhat easier for someone to take coffee with them on the go, these personal coffee makers themselves are no more portable than conventional coffee makers.

Therefore, for the reasons stated above, and for other reasons stated below, which will become apparent to those skilled in the art upon reading and understanding the specification, and the drawings, there is a need in the art for a portable coffee brewing device.

Thus, it is a primary object of the invention to provide a portable coffee brewing device that improves upon the state of the art.

Another object of the invention to provide a portable coffee brewing device that is easy to use.

Yet another object of the invention to provide a portable coffee brewing device that brews a pleasing and high quality cup of coffee.

Another object of the invention to provide a portable coffee brewing device that is inexpensive to manufacture.

Yet another object of the invention to provide a portable coffee brewing device that has an intuitive design.

Another object of the invention to provide a portable coffee brewing device that has a robust and durable design.

Yet another object of the invention to provide a portable coffee brewing device that has a long and useful life.

Another object of the invention to provide a portable coffee brewing device that has a simple and ergonomic design.

Yet another object of the invention to provide a portable coffee brewing device that allows a user to make a fresh cup of coffee whenever and wherever they so desire.

Another object of the invention to provide a portable coffee brewing device that allows a user to load the device with water and coffee grounds at one time and one place while allowing for brewing of the coffee at another time and another place.

Another object of the invention to provide a portable coffee brewing device that uses what are known as K-cups.

Yet another object of the invention to provide a portable coffee brewing device that has an appealing design.

Another object of the invention to provide a portable coffee brewing device that is safe to use.

Yet another object of the invention to provide a portable coffee brewing device that is easy to clean.

Another object of the invention to provide a portable coffee brewing device that does not leak.

Yet another object of the invention to provide a portable coffee brewing device that uses disposable coffee grounds holding devices.

These and other objects, features, or advantages of the invention will become apparent from the specification, drawings and claims.

BRIEF SUMMARY OF THE INVENTION

A portable coffee brewing device includes a lid pivotally connected to an upper end of the container by a hinge and button. A heating element housing and an electrical component housing is connected to a lower end of the container. A drain is positioned in a bottom wall of the container and is fluidly connected to a heating element positioned within the heating element housing. The heating element is controlled by electrical components positioned in the electrical components housing. A drip tube is fluidly connected to the heating element and the lid. A single serve coffee holding device is positioned below the lid. When the container is filled with fluid and the heating element is powered, heated fluid is forced up the drip tube through the passageway in the lid and into the coffee grounds holding device in a continuous cycle. The device is connectable to an external power source.

BRIEF DESCRIPTION OF THE DRAWINGS

FIG. 30 is an elevation section view of the portable coffee brewing device shown in FIGS. 24-29, the section view along line AA shown in FIG. 24;

DETAILED DESCRIPTION OF THE PREFERRED EMBODIMENTS

Figure 1:
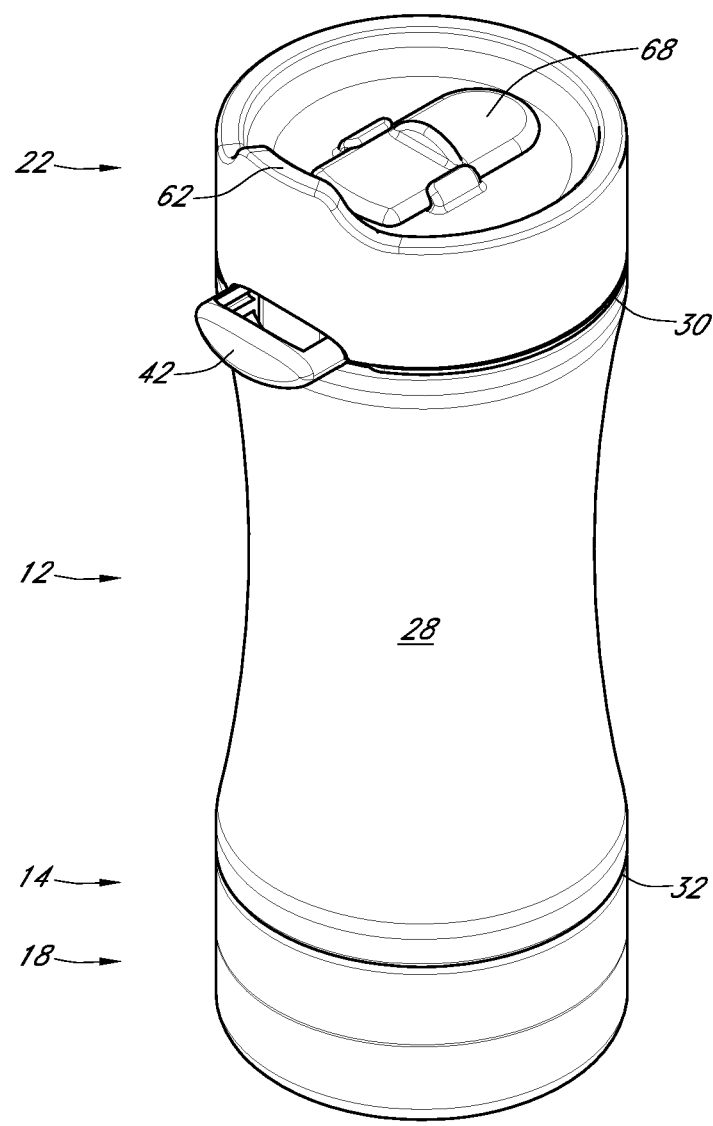
FIG. 1 is a perspective view of a portable coffee brewing device with the lid in a closed position.
Figure 2:
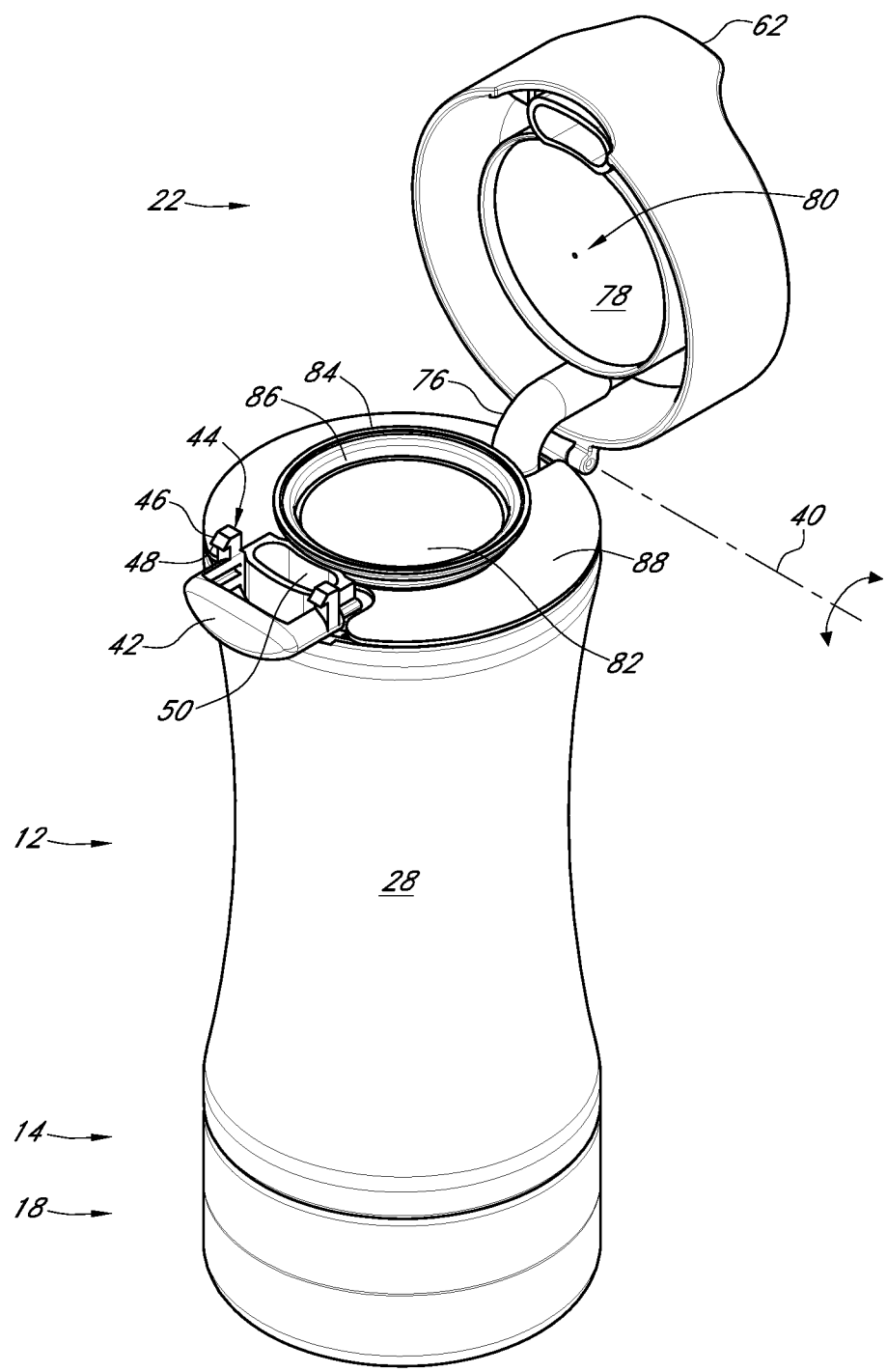
FIG. 2 is a perspective view of a portable coffee brewing device with the lid in an open position showing the K-cup holder or insert.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the inventions. The following detailed description is, therefore, not to be taken in a limiting sense, and the scope of the present invention is defined only by the appended claims, along with the full scope of equivalents to which such claims are entitled.

As used herein, the terminology such as vertical, horizontal, top, bottom, front, back, end and sides are referenced according to the views presented and with respect to the orientation of related parts and pieces as is described herein. It should be understood, however, that the terms are used only for purposes of description, and are not intended to be used as limitations. Accordingly, orientation of an object or a combination of objects may change without departing from the scope of the invention.

A portable coffee brewing system 10 is presented in the figures. The system 10 includes a container 12, a heating element housing 14 that holds a heating element 16, an electrical components housing 18 that holds electrical components 20, a lid 22, a holder or insert 24, and a coffee grounds holding device 26.

Container: Container 12 is formed of any suitable size, shape and design and is any form of a liquid holding vessel such as a cup, a mug, a travel mug, a thermal mug, or the like. In one arrangement, as is shown, container 12 includes a sidewall 28 that extends in a generally circular manner from an upper end 30 to a lower end 32.

Sidewall 28 connects at or near its lower end 32 to bottom wall 34 that defines the bottom of the hollow interior 36 formed by container 12. Sidewall 14 terminates in an open upper end to which lid 22 is connected.

In one arrangement, sidewall 14 includes connecting features, such as threads, snap-fit-features, grooves or the like, adjacent either the interior surface or exterior surface of the open upper end 30 of sidewall 28. These connecting features are used for connecting lid 22 to container 12 in a manner that allows lid 20 to be opened if not removed entirely.

In one arrangement, as is shown, lid 20 connects to container 12 by hinge 38. In the arrangement shown, hinge 38 is positioned in the rearward upper end of sidewall 28. Lid 22 pivots upon hinge 38 between an open position and a closed position around axis 40 that extends through the center of hinge 38.

In one arrangement, as is shown, a button 42 is positioned at or near the upper end 30 of sidewall 28, on the opposite side of container from opposite hinge 38. Button 42 is formed of any suitable size, shape and design and is used to hold lid 20 in a closed position as well as release lid 20 to an open position. Button 42 slides laterally a distance toward and away from the center of container 12 and is urged forward by a biasing member (not shown) such as a spring, compressible piece of material or a flexible member, so as to hold lid 22 in a closed position.

In the arrangement shown, button 42 includes a pair of latching arms 44, one on either side of button 42, the latching arms 44 each having a rounded or angled upper surface 46 that connects to a generally flat bottom surface 48 or locking surface. These latching arms 44 engage and connect to mating features in the underside of lid 22.

As the lid 22 is lowered, the bottom surface of lid 22 engages the rounded or angled surfaces 46 of latching arms 44 which causes the button 42 to move rearward against the force of biasing member and towards the center of container 12. This movement continues until the rounded or angled surface 46 of latching arms 44 pass the mating feature of lid 22, at which point the biasing member forces the button 42 forward as the flat or locking surfaces 48 of latching arms 44 engage and hold onto the lid 22 thereby locking the lid 22 in a closed position.

Button 42 is positioned in front of and/or around a pour spout 50 connected to container 12. Pour spout 50 is formed of any suitable size, shape and design. In the arrangement shown, as one example, pour spout 50 is connected to the interior surface of sidewall 28 adjacent its upper end 30 opposite hinge 38. Pour spout 50 provides fluid communication from the hollow interior 36 of container 12 to lid 22.

Container 12 includes a lip 52. Lip 52 is formed of any suitable size, shape and design. In one arrangement, as is shown, lip 52 extends around the interior surface of sidewall 28 and extends inward therefrom a distance. Lip 52 is recessed a distance below the upper end 30 of sidewall 28.

Container 12 also includes a drip tube 54. Drip tube 54 is formed of any suitable size, shape and design. In one arrangement, as is shown, drip tube 54 is a generally circular tube that extends from below the bottom wall 34 to at or near the upper end 30 of sidewall 28. In one arrangement, drip tube 54 is connected to, positioned within sidewall 28 of container 12. In this arrangement, where drip tube 54 is a separate piece from container 12, drip tube 54 is removable so as to allow cleaning or replacement of drip tube 54. Alternatively, drip tube 54 is formed on or in sidewall 28 as part of sidewall 28.

The lower end of drip tube 54 fluidly connects to heating element 16, either directly or by way of connection to one or more other components. The upper end of drip tube 54 fluidly connects to lid 22, either directly or by way of connection to one or more other components. In this way, drip tube 54 provides a fluid conduit from below bottom wall 34 to lid 22.

Container 12 also includes a drain 56. Drain 56 is formed of any suitable size, shape and design. In one arrangement, as is shown, drain 56 is positioned within bottom wall 34 and provides a fluid passageway from the hollow interior 36 of container 12 to the heating element 16. In one arrangement, the drain 56 is centrally positioned in the bottom wall 34 so as to allow the heating element container 14 to be screwed onto the lower end 32 of container 12 in a removable and replaceable fashion. Alternatively, as in the arrangement shown, drain 56 is positioned in an off-center arrangement.

Drain 56 includes a filter or screen 58 that covers the drain 56 and prevents particles, such as coffee grinds, from entering drain 56 and plugging it. Drain 56 also includes a valve or check valve 60. Check valve 60 allows for fluid to flow through valve 60 in one direction, but prevents fluid flow in an opposite direction. In this application, check valve 60 allows fluid to flow from hollow interior 36 to heating element 16, but prevents flow in the opposite direction. In this way, as the fluid is boiled by the heating element 16, the fluid is forced up the drip tube 54, through lid 22 and back into the hollow interior 36 thereby causing continuous circulation of fluid.

Lid: Lid 22 is formed of any suitable size, shape and design. Lid 22 connects to the upper end 30 of container 12. In one arrangement, as is shown, lid 22 is generally circular in shape when viewed from above and matingly engages the upper end 30 of container 12.

The rearward side of lid 22 connects to hinge 38 and the forward side of lid 22 connects to button 42. In this way, lid 22 is locked in a closed position by button 42, while releasing button 42 allows lid 22 to be opened upon hinge 38 thereby providing access to the hollow interior 36 of container 12.

The forward end of lid 22 includes a lip 62 that protrudes above the upper edge 64 of lid 22. Lid 22 includes a pour spout 66 that is positioned just rearward of lip 62. Pour spout 66 of lid 22 fluidly connects with pour spout 50 of container 12 when lid 22 is in a closed position.

Pour spout 66 of lid 22 is selectively opened and closed by cover 68. Cover 68 is any device that opens and closes pour spout 66. In the arrangement shown, as one example, cover 68 slides forward, to cover and close pour spout 66, and slides rearward to uncover pour spout 66, however any other form of a cover is hereby contemplated for use.

Lid 22 includes a passageway 70 therein (which is depicted by arrow 70). Passageway 70 is formed of any suitable size, shape and design and provides a fluid conduit from drip tube 54 to holder or insert 24 and/or coffee grounds holding device 26.

In one arrangement, as is shown, passageway 70 includes a vertical portion 72 that is positioned at the rearward side of lid 22 and fluidly communicates with drip tube 54, and a horizontal portion 74 that extends toward the center of lid 22 and fluidly communicates with holder or insert 24 and/or coffee grounds holding device 26.

In one arrangement, vertical portion 72 of passageway 70 connects to a flexible tube portion 76. Flexible tube portion 76 connects the upper end of drip tube 54 to the lower end of vertical portion 70 of passageway 70. As flexible tube portion 76 is flexible, it allows for opening and closing of lid 22 while keeping passageway 70 and drip tube 54 in fluid sealed communication.

In an alternative arrangement, vertical portion 72 and the upper end of drip tube 54 connect and seal to one another when lid 22 is in a closed position, whereas when lid 22 is in an open position vertical portion 72 and the upper end of drip tube 54 separate from one another. In this arrangement, to ensure proper sealing any form of a connection can be used. As examples, a compressible seal is positioned between the vertical portion 72 and the upper end of drip tube 54, the vertical portion 72 and the upper end of drip tube 54 are formed in mating overlapping condition when closed, or any other arrangement.

In one arrangement, as is shown, horizontal portion 74 is generally circular in shape and includes a sloped bottom wall 78 that angles downward as it extends toward the center of lid 22. This sloped bottom wall 78 includes at least one nipple 80 having an opening therein. Nipple 80 extends downward from the sloped bottom wall 78 such that when lid 22 is closed, nipple 80 punctures the coffee grounds holding device 26 thereby providing an opening and access for fluid into the coffee grounds holding device 26. As the bottom wall 78 is sloped downward, as the horizontal portion 74 fills with fluid, the force of gravity moves the fluid along the sloped bottom wall 78 into the coffee grounds holding device 26.

Holder or Insert: Holder or insert 24 is formed of any suitable size, shape and design. In one arrangement, as is shown, holder or insert 24 is sized and shaped to be positioned between container 12 and lid 22 and held in place there between when lid 22 is in a closed position. Holder or insert 24 includes a generally circular opening 82 positioned at its middle that is defined by a collar 84 that extends around the opening 82. Collar 84 includes at least one step 86 therein that is narrower than the collar 84. This step 86 is sized and shaped to matingly receive and hold a similar step in coffee grounds holding device 26 so as to prevent coffee grounds holding device 26 from falling through holder or insert 24.

A flange 88 extends outward from collar 84 in a generally flat and planar manner. Flange 88 is sized and shaped to fit just within the interior surface of sidewall 28 and sit on top of lip 52 adjacent the upper end 30 of container 12. Flange 88 includes a forward notch 90 therein that is sized and shaped to fit around the pour spout 66 of container 12. Flange 88 also includes a rearward notch 92 therein that is sized and shaped to fit around the area wherein drip tube 54 connects with passageway 70 of lid 22.

A frame member 96 connects to and extends downward from collar 84. Frame member 96 extends downward from collar 84 and connects to a bottom wall 98 having a nipple 100 with an opening therein. Nipple 100 extends upward from bottom wall 98. Frame member 96 and bottom wall 98 are sized and shaped to receive coffee grounds holding device 26 therein with close and tight clearance therein. Frame member 96 and bottom wall 98 may be skeletonized in shape, or they can be formed of a solid continuous wall.

When coffee grounds holding device 26 is placed in holder or insert 24 and lid 22 is closed, nipple 100 penetrates the bottom wall of coffee grounds holding device 26 thereby providing an exit for fluid flowing into the coffee grounds holding device 26.

Coffee Grounds Holding Device: Coffee grounds holding device 26 is formed of any suitable size, shape and design. In one arrangement, as is shown, coffee grounds holding device 26 is formed of what is commonly known as a "K-cup" which was designed and originally manufactured and distributed under the name Keurig which is part of Keurig Green Mountain, Inc. which has its headquarters in Waterbury, Vt. These coffee grounds holding devices 26 are single use, single serve and are formed of a plastic container that is generally circular sidewall 102 in shape and narrows as it extends downward before terminating in a bottom wall 104. The coffee grounds holding device 26 includes a flange 106 connected to the upper end of sidewall 102 and extends outward therefrom, as well as one or more steps 108 positioned between the flange 106 and the sidewall 102.

The hollow interior formed by the coffee grounds holding device 26 is enclosed by a foil cover 110. A filter member 112 is positioned within the hollow interior of the coffee grounds holding device 26 and holds an amount of coffee grounds 114 therein. The filter member 112 allows for the passage of fluids there through while preventing the passage of coffee grounds 114. This arrangement allows for quick and easy insertion and removal of a coffee grounds holding device 26 into holder or insert 24 when the lid 22 is in an open positions.

Heating Element Housing: Heating element housing 14 is formed of any suitable size, shape and design. In one arrangement, as is shown, heating element housing 14 is generally circular in shape or disc shaped and connects to the lower end 32 of container 12. Heating element housing 14 connects to container 12 by any manner or means. In one arrangement, heating element housing 14 is permanently connected to and sealed to the bottom of container 12, such as by use of welding, adhesive, friction fit, locking engagement, or any other method or means. In an alternative arrangement, heating element housing 14 is connected to the bottom of container 12 by any removable manner or means such as threaded engagement, snap fit, friction fit or any other method or means. By being removable, this allows the components of heating element housing 14 to be accessed and cleaned. By being permanently affixed, this ensures that heating element housing 14 is permanently and properly sealed ensuring that water does not infiltrate the hollow interior of heating element housing 14. In one arrangement, as is shown, the upper end of heating element housing 14 has a step 116 that is matingly received by, and fits just within, the interior surface of the lower end 32 of container 12, just below bottom wall 34.

Heating element housing 14 holds heating element 16. Heating element 16 is formed of any device which receives and heats fluids in container 12. In one arrangement, as is shown, heating element 16 is formed of an electrical conduit 118 that is connected to heating tube 120.

Electrical conduit 118 and heating tube 120 are formed of any suitable size, shape and design. In the arrangement shown, electrical conduit 118 and heating tube 120 are formed in a U-shape, however any other shape is hereby contemplated, such as a coil, spiral, zig-zag, or any other shape.

In the arrangement shown, electrical conduit 118 includes an opening through its middle that receives an electrical filament that when powered generates heat. Heating tube 120 is in direct physical contact to electrical conduit 118 throughout all or the majority of its length so that heat generated by electrical conduit 118 is efficiently absorbed or transmitted to heating tube 120, which is a hollow tube.

The entry end of heating tube 120 is fluidly connected to drain 56 so as to receive fluid from container 12. The exit end of heating tube 120 is fluidly connected to the lower end of drip tube 54. Due to the one-way check valve 60 in drain 56, heating tube 120 receives fluid from container 12, as the fluid is heated by electrical conduit 118 the fluid boils and expands. The expanding fluid cannot move against the check valve 60 and therefore it is forced up the drip tube 54.

In one arrangement, heating element housing 14 is insulated so as to sealing the heat generated from electrical conduit 118 and to prevent heat from transferring to other portions of the device 10.

Electrical Components Housing: Electrical components housing 18 is formed of any suitable size, shape and design. In one arrangement, as is shown, electrical components housing 18 is generally circular in shape or disc shaped and connects to the lower end of heating element housing 14 and thereby forms the bottom of portable coffee brewing device 10. Electrical components housing 18 connects to container 12/heating element housing 14 by any manner or means. In one arrangement, electrical components housing 18 is permanently connected to and sealed to the bottom of container 12/heating element housing 14, such as by use of welding, adhesive, friction fit, locking engagement, or any other method or means. In an alternative arrangement, electrical components housing 18 is connected to the bottom of container 12/heating element housing 14 by any removable manner or means such as threaded engagement, snap fit, friction fit or any other method or means. By being removable, this allows the components of electrical components housing 18 to be accessed and cleaned. By being permanently affixed, this ensures that electrical components housing 18 is permanently and properly sealed ensuring that water does not infiltrate the hollow interior of electrical components housing 18.

Electrical components housing 18 holds electrical components 20. Electrical components 20 are formed of any electrical components needed to turn on, turn off and control the portable coffee brewing device 10. These electrical components 20 are electrically connected to electrical conduit 118 and thereby powers on and powers off electrical conduit 118.

In one arrangement, as is shown, electrical components 20 include a switch 122 which controls the flow of energy to the electrical conduit 118.

In one arrangement, as is shown, electrical components 20 also include a sensor 124 which senses the temperature of the fluids within the container 12 and/or the temperature of the electrical conduit 118 and/or the temperature of the heating tube 120.

In one arrangement, as is shown, electrical components 20 also include a microprocessor 126 which receives information from the other electrical components 20 and processes this information based on instructions stored in memory and outputs results. In one arrangement, microprocessor 126 includes a clock or clock function which controls the amount of time the amount of time or duration that the electrical conduit 118 is powered.

In one arrangement the sensor 124 turns on and turns off the power to electrical conduit 118 based upon the sensed temperature, in another arrangement, the sensor 124 transmits the sensed temperature to the microprocessor 126 which controls the turning on and turning off of the power to the electrical conduit 118.

In one arrangement, the check valve 60 is mechanical in nature, whereas in another arrangement microprocessor 126 controls the operation of check valve 60. In this arrangement, the microprocessor 126 is programmed to close the check valve 60 a period of time before cutting power to the electrical conduit 118. This allows the remaining amount of fluid in the heating tube 120 to be boiled and transmitted up the drip tube 54 so as clearing the drip tube 54 and heating tube 120 before turning off the system 10. This prevents fluid from being stuck in the heating tube 120 between uses.

Electrical components housing 18 includes any other electrical components needed to operate portable coffee brewing system 10.

In an alternative arrangement, electrical components housing 18 and heating element housing 14 are combined into a single housing.

Socket & Plug: A socket 128 is connected to the portable coffee brewing system 10. Socket 128 is formed of any suitable size, shape and design and serves to connect portable coffee brewing device 10 to an external power source. Any form of a socket 128 that connects two components together and allows for electrical transmission there between is hereby contemplated for use, these include a two wire socket, a three wire socket, a headphones jack, a USB socket, or any other form of socket. Socket 128 is sized and shaped to matingly receive plug 130 in a removable manner. Plug 130 is connected to a power lead 132 which is designed to be connected to an external power source, such as a wall-plug-in, a USB port, a cigarette lighter socket in a vehicle, or any other source of power.

In Operation: A user desiring to use the portable coffee brewing system 10 fills opens the lid 22 by pressing button 42. This allows lid 22 to be pivotally opened on hinge 38. This exposes the holder or insert 24. If no coffee grounds holding device 26 is present, the user can simply pour the desired amount of water into the container 12 through the opening in the center of the holder or insert 24. If a coffee grounds holding device 26 is present, the user can remove coffee grounds holding device 26 or the holder or insert 24 entirely which will expose the open upper end of container 12 allowing the user to fill it with the desired amount of fluid.

Once container 12 is filled with fluid, the user replaces the holder or insert 24 by aligning the forward notch 90 with the pour spout 66 and the rearward notch 92 with the drip tube 54 and allows the holder or insert 24 to sit upon lip 52. Once the holder or insert 24 is this fully installed position, the user selects their desired coffee ground holding device 26 (also known as a K-cup) and places the coffee ground holding device 26 within the opening 82 until it settles there within and the flange 106 and steps 108 of coffee ground holding device 26 engages the collar 84 and steps 86 of holder or insert 24.

With the container 12 filled with water, and the coffee ground holding device 26 installed in the installed holder or insert 24, the user next closes the lid 22. As the lid is closed, the rounded or angled upper surface 46 of latching arms 44 engage the underside of lid 22 as it is forced downward toward container 12. As the lid 22 moves downward, the rounded or angled upper surfaces 46 of latching arms 44 force the button 42 rearward against the biasing force of biasing member until the bottom surface or locking surface 48 of latching arms 44 grab hold of the lid 22. In this position, the lid 22 is fully closed and the seam line between the upper end 30 of container 12 is fully sealed with the lower end of lid 22 in a watertight manner. In one arrangement, a compressible member, such as a plastic or rubber or composite O-ring is placed at the intersection of the container 12 and lid 22 to ensure proper sealing.

As the lid 22 is closed, this forces nipple 80 in the bottom surface of lid 22/sloped bottom wall 78 to penetrate the cover 110 of the coffee grounds holding device 26 thereby providing a fluid passageway into the coffee grounds holding device 26. Similarly, as the lid 22 is closed, this forces nipple 100 in the bottom wall 98 of holder or insert 24 to penetrate the bottom wall 104 of the coffee grounds holding device 26 thereby providing a fluid passageway out of the coffee grounds holding device 26 and into container 12.

In this condition, the portable coffee brewing device 10 is both portable as well as ready to brew a fresh cup of coffee.

When the user arrives at their location, such as at their office, they plug power lead 132 into an external power source and then they insert plug 132 into socket 128 which powers the device. In the arrangement wherein the check valve 60 is powered, the microprocessor 126 opens the powered check valve 60 which allows fluid to pass through drain 56 and into heating tube 120. Alternatively, wherein the check valve 60 is unpowered, fluid is allowed to move through drain 56 and into heating tube 12, but not the opposite direction.

Simultaneously, power is transmitted to the electrical conduit 118 which generates heat. This heat is transmitted to heating tube 120 and fluid within the heating tube 120, which is allowed through check valve 60 is heated. As the fluid is heated, its volume expands and fluid is forced through the only escape it has, and that is through the drip tube 54 (because it cannot move against or in the opposite direction of the check valve 60.

The heated fluid travels up the drip tube 54, through the flexible tube portion 76 and into the passageway 70 in lid 22. That is the fluid first moves through the vertical portion 72 of the passageway 70 before entering the horizontal portion 74 of the passageway 70. From there, the force of gravity, as well as the hydrodynamic forces of the expanding fluid coming up the drip tube 54, forces the heated fluid to drain down the sloped bottom wall 78 of the passageway 70, through the opening in nipple 80 and into coffee grounds holding device 26.

Once the heated fluid is in the coffee grounds holding device 26, the heated fluid drains through the coffee grounds 114, through the filter member 112 and out of the hole in the bottom wall 104 of coffee grounds holding device 26 formed by nipple 100. As the heated fluid, which is now coffee, passes through nipple 100 the heated fluid enters the again container 12 and the process is repeated in a continuous flow, similar to the process of what is known as a percolator.

Throughout the process, the sensor 124 and microprocessor 126 track the system. The sensor 124 and/or the microprocessor 126 will turn on or turn off the power to the electrical conduit 118 when the temperature exceeds a maximum predetermined temperature, or when the predetermined amount of time for brewing has been exceeded.

When the coffee is fully brewed, the user unplugs the power lead 132 and slides the cover 68 rearward thereby exposing the pour spout 66 which allows the user to drink directly from the container 12.

To remove and replace the coffee grounds holding device 26 the lid 22 is again opened and the coffee grounds holding device 26 is replaced.

Alternative Arrangement: In an alternative arrangement, with reference to FIGS. 7-8D a portable coffee brewing system 210 is presented in the figures. The system 210 includes a container 212. Container 212 is any form of a liquid holding vessel such as a cup, a mug, a travel mug, a thermal mug, or the like. In one arrangement, container 212 includes a sidewall 214 that surrounds and connects at its bottom edge to bottom 216. Sidewall 214 terminates in an open upper end 218 adjacent its end opposite bottom 216. In one arrangement, sidewall 214 includes connecting features 220, such as threads, snap-fit-features, grooves or the like, adjacent either the interior surface and/or exterior surface of the open upper end 218 of sidewall 214. These connecting features 220 are used for connecting lid 222 to container 212.

Lid 222 is formed of any suitable size shape and design. Lid 222 is removably connected to the open upper end 218 of container 212 and therefore seals and closes container 212 in a water-tight manner. Lid 222 also serves to hold the brewing components therein as is further described herein.

As one example, in the arrangement shown, lid 222 is formed of a lower component 224 and an upper component 226. The lower end 227 of lower component 224 includes a connecting member 228 that is sized and shaped to connect with or matingly engage connecting features 220 of the upper end of sidewall 214. As one example, in the arrangement shown, connecting features 220 of the upper end of sidewall 214 are threads positioned on the inside of the sidewall 214, whereas the a connecting member 228 of the lower end of lower component 224 includes a slightly necked-in portion with threads on its exterior surface that are sized and shaped to engage the threads of the connecting feature 220. In this way, as one example, lower component 224 can be installed on and removed from container 212 in a manner that seals the two components together. Lower component 224 can be removably and replaceably connected to container 212 in countless other ways, such as by replacing the threads of the connecting member 228 with a flexible and/or compressible seal that allows for a press-fit frictional engagement between container 212 and lower component 224, or any other arrangement that allows two components to be connected together.

Lower component 224 includes a main body 230 that is connected to the upper end of connecting member 228. In one arrangement, the exterior surface of main body 230 is wider than the connecting member 228 such that the exterior surface of main body 230 is approximately in parallel alignment or smooth and continuing alignment with the exterior surface of sidewall 214 so as to provide a flush and flat alignment between the lower component 224 and the container 212 when connected together.

A lower straw 232 extends outwardly from the bottom of lower component 224 a distance into the open interior of container 212 when installed thereon. Lower straw 232 also extends through at least a portion of lower component 224 and terminates in an open upper end 233 which is aligned to receive and connect to a portion of upper component 226 as is described herein.

Lower component 224 also includes a coffee basin 234 therein. Coffee basin 34 is any size which is designed to receive and hold coffee grounds therein for brewing purposes. In the arrangement shown, coffee basin 234 is an opening or recess in the lower portion 224. In the arrangement shown, the lower end of coffee basin 234 includes a nozzle 236 or opening through which liquid can pass after passing through the coffee grounds held in the coffee basin 234. Alternatively, the lower end of coffee basin 234 includes a plurality of nozzles 236 or a mesh or filter material, or any other device that serves the purpose of holding coffee grounds while allowing liquid to pass through it.

A passageway 238 is positioned adjacent the coffee basin 234. Passageway 238 is an opening that extends through the lower component 224 from the lower end to the upper end. Passageway 238 is sized and shaped to be large enough to easily allow coffee to flow out of the container 212 through the passageway 238 when a user desires to drink from container 212, and is also large enough for a user to add cream and sugar to the container through passageway 238 when they so desire.

Lower component 224 terminates in an upper edge 240 that is generally flat. Adjacent the upper edge 240 is a hinge 242. Hinge 242 connects lower component 224 to upper component 226 such that the upper component 226 can rotate upon hinge 242 between a closed position, wherein the upper component 226 is engaged with the lower component 224, and an open position, wherein the upper component 226 is separated from the lower component 24 (save for connection by hinge 242) thereby providing access to coffee basin 234 and passageway 238.

Upper component 226 is formed of any suitable size, shape and design. In the arrangement shown, upper component 226 includes a main body 230 that has an exterior surface that is approximately the same size and shape of the main body 330 of lower component 224, and container 212 such that when the three components 212, 224, 226 are connected together the exterior surface is generally smooth and flat. Upper component 226 has a bottom edge 244 that is generally flat and engages the upper edge 240 of lower component 224 when the two components are connected together.

Upper component 226 includes a pump 246 and a heating element 248 positioned within the upper component 226. Pump 246 is any form of a device that takes electric energy and converts it to mechanical movement and serves to move liquid from one position to another. Heating element 248 is any form of a device that takes electric energy and heats a liquid. An upper straw 250 is connected to the inlet side of pump 246 and heating element 248. A lower end of upper straw 250 protrudes a distance from the bottom edge 244 of upper component 226 and engages the upper end 233 of lower straw 232 of lower component 224. In this way, when upper component 226 is closed on lower component 224, upper straw 250 and lower straw 232 connect together to provide a fluid path from container 212 to pump 246 and heating element 248. A drip straw 252 is connected to the outlet end of pump 246 and heating element 248 and terminates in a drip nozzle 254 that is positioned above coffee basin 234, such that liquid that passes through pump 246 and heating element 248 is dispensed onto the coffee grinds held within coffee basin 234.

Upper component 226 also includes an On/Off switch 256 that is electrically connected to pump 246 and heating element 248 which selectively provides power to the electrical components of the system 210. On/Off switch 256 is also connected to electrical socket 258. Electrical socket 258 is any form of a device which receives and holds another device, such as cord 260, while forming an electrical connection there with. In the arrangement shown, cord 260 has an adapter 262 which is sized and shaped to engage and mate with electrical socket 258 on one end, and a conventional plug 264 which is sized and shaped to engage a conventional socket on the opposite end. In this way, cord 260 and electrical socket 258 are used to power system 210.

In an alternative arrangement, the system 210 includes an on-board power source, such as a battery, a plurality of batteries, or a battery pack, or the like which is used to power the system. In this wireless battery powered system, electrical socket 258 and cord 260 can still be used to recharge the power source.

Upper component 226 also includes a drinking port 266 that is aligned with passageway 238 when upper component 226 is installed on lower component 224. Drinking port 266 and passageway 238 connect to one another to allow coffee to pass from container 212 through lower component 224 and upper component 226. Because, passageway 238 is intentionally sized to be large enough to allow milk and sugar to easily be added to container without removing lower component 224, whereas drinking port 266 of upper component 226 is smaller so as to only allow the proper amount of coffee to be poured out of container 212, a step 268 protrudes from bottom edge 244 of upper component 226. Step 268 is sized and shaped and aligned to fit within and frictionally engage passageway 238 of lower component 224. In this arrangement, when upper component 226 is closed on lower component 224, step 268 fits within and engages the upper portion of passageway 238 thereby helping to hold the two components together. In one arrangement a flexible seal is positioned around step 268 which helps to seal passageway 238 when upper component 226 is closed onto the lower component 224 thereby preventing any leakage. In another arrangement, a snap-fit feature is present on the step 268 and/or the passageway 238 such that when the upper component 226 is closed on the lower component the snap-fit features engage one another thereby holding the two components together until an appropriate amount of force is applied to separate the two.

In one arrangement, a latch 270 is present on the upper component 226 and a corresponding notch 272 is present on the lower component 224, or vice versa, which serves to hold the upper component 226 and lower component 224 together when upper component 226 is closed on lower component 224. In this arrangement, when upper component 226 is closed, a snap-fit feature, such as a barb 274 or edge, fits within a similarly sized and shaped notch 272.

To facilitate easier drinking, the upper edge of upper component 226 includes a raised lip 276. Lip 276 is formed of any ergonomically design and serves to guide coffee towards a user's mouth when in use, while simultaneously helping to prevent spillage. Also positioned over the upper end of drinking port 266 is a sealing member 277. Sealing member 277 is any device that closes and seals drinking port 266 from spilling when not in use. In one arrangement, sealing member 277 is a slidable piece that slides over the upper end of drinking port 266 when not in use (thereby preventing accidental spillage and also keeping the contents of container 212 sanitary and temperature stable) and slides away from the upper end of drinking port 266 to allow a user to drink the contents of container 212.

The system 210 also includes a sensor 278, a microprocessor 280 and a controller 282. Sensor 278 is any sensor that senses conditions of the system 210. In one arrangement, sensor 278 is a temperature sensor, such as a thermometer or the like, however any other form of a sensor is hereby contemplated for use. Sensor 278 is electrically connected to microprocessor 280. Microprocessor 280 is any device which receives electronic information and processes it according to instructions stored in memory. Microprocessor 280 receives information from sensor 278 and processes this information. Microprocessor 280 is electrically connected to controller 282. Controller 282 is any device which receives information from one electronic component and uses that information to control another electronic device. In one arrangement, microprocessor 280 and controller 282 are combined into a single device. In one arrangement, sensor 278 senses the temperature of heating element 248, or the liquid within container 212, transmits this information to microprocessor 280 which processes this information. This processed information is passed to controller 282 which controls heating element 248 and/or pump 46, so as to properly and precisely control brewing.

In Operation: A user fills container 212 with a desired amount of water. Next, the user screws lid 222 onto the open upper end 218 of container 212 by meshing the threads of connecting features 220 with the connecting member 228 of lower component 224. By doing so, straw 232 is inserted into the water a distance.

Next, the user places the desired amount of coffee grounds within the coffee basin 234 of lower component 224. This can be by actually pouring coffee grounds into coffee basin 234, or by placing a pouch of coffee grounds in the coffee basin 234. At this time, or a later time, the user can pour milk or sugar or other additives into the container through passageway 238.

Next the user closes upper component 226 onto lower component 224. In doing so, the upper straw 250 aligns with the lower straw 232 and the drip nozzle 254 is positioned above the coffee grounds in the coffee basin 234, and the upper edge 240 of lower component 224 engages the flat bottom edge of upper component, and the step 228 fits within the passageway 238 thereby sealing the passageway 238 and the narrower drinking port 266. Also, in the arrangement wherein a latch 270 and notch 272 are present, when closed, the latch 270 engages the notch 272 thereby holding the upper component 226 onto the lower component 224.

When the sealing member 277 closes the drinking port 266, the system is now ready to travel. When the user arrives at their office or wherever they desire a fresh cup of coffee, the user inserts plug 264 of cord 260 into a conventional wall socket, or in another arrangement, a car socket, USB port or any other suitable power source and inserts adapter 262 into the electrical socket 58 of the upper component 226. Next, the user powers on the system 10 by pressing the On/Off button 256 which starts the brewing process.

Brewing occurs by transmitting power to the heating element 248 and pump 246. Heating element 248 warms to an operating temperature and pump 246 sucks water from container 212 through lower straw 232 and upper straw 242 and into heating element 248. The water passes through heating element 248 and out drip straw 252 and through drip nozzle 254 and onto coffee grounds held within coffee basin 234. The heated water passes through coffee grounds and is held within coffee basin 234 until it passes through nozzle 236 and back into container 212. This process is repeated until the user turns off the power to the system, or alternatively until microprocessor 280 and/or controller 282 shuts power off to the system 210. While the system is brewing, the sensor 278 senses the temperature and other variables of the system 210 and feeds this information into microprocessor 280 and/or controller 282 which adjusts the system 210 to provide optimum results.

Once the coffee is brewed, the user simply slides the sealing member 277 away from the drinking port 266 and drinks a fresh brewed cup of coffee.

Figure 8A:
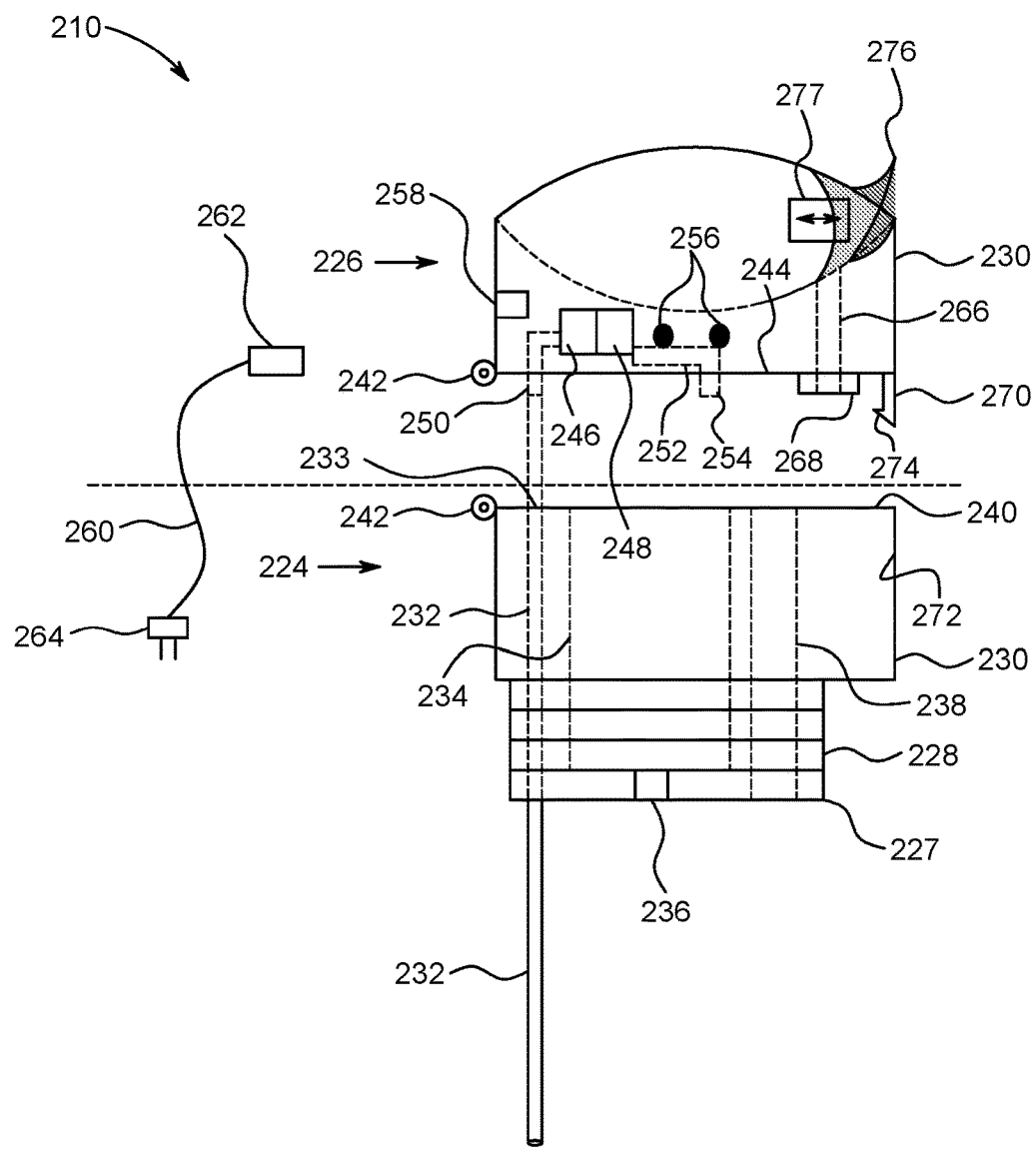
FIG. 8A is a side cut-away elevation exploded view of the lid of the portable coffee brewing device of FIG. 7 having a lower component and an upper component, a pump positioned within the lid and a coffee basin positioned within the lid.
Figure 8B:
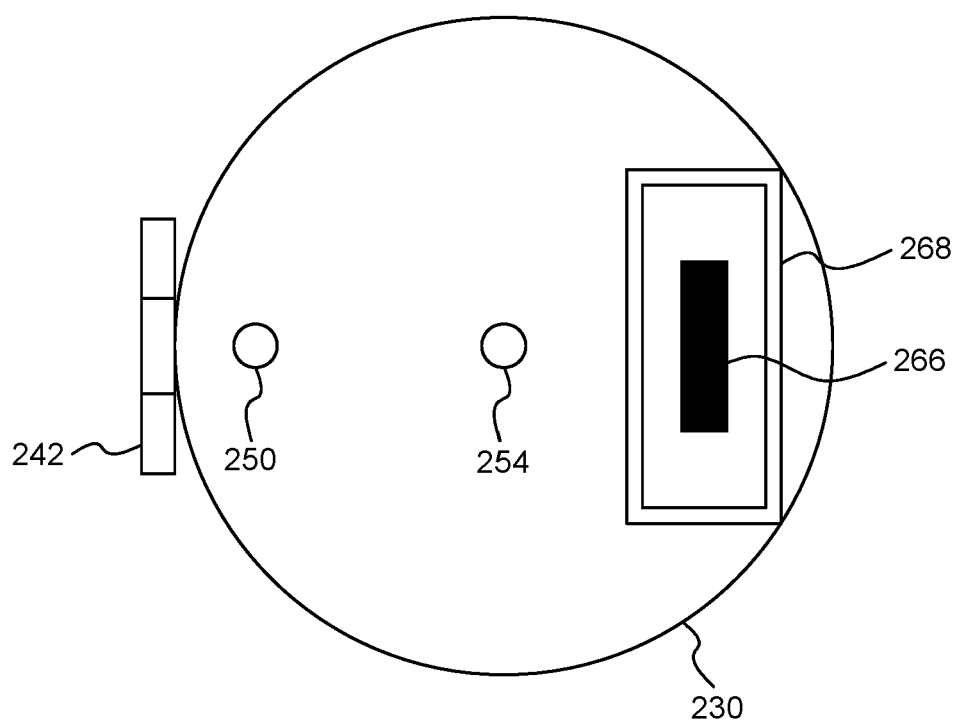
FIG. 8B is a bottom elevation view of the upper component of the lid of FIGS. 7 and 8A.
Figure 8C:
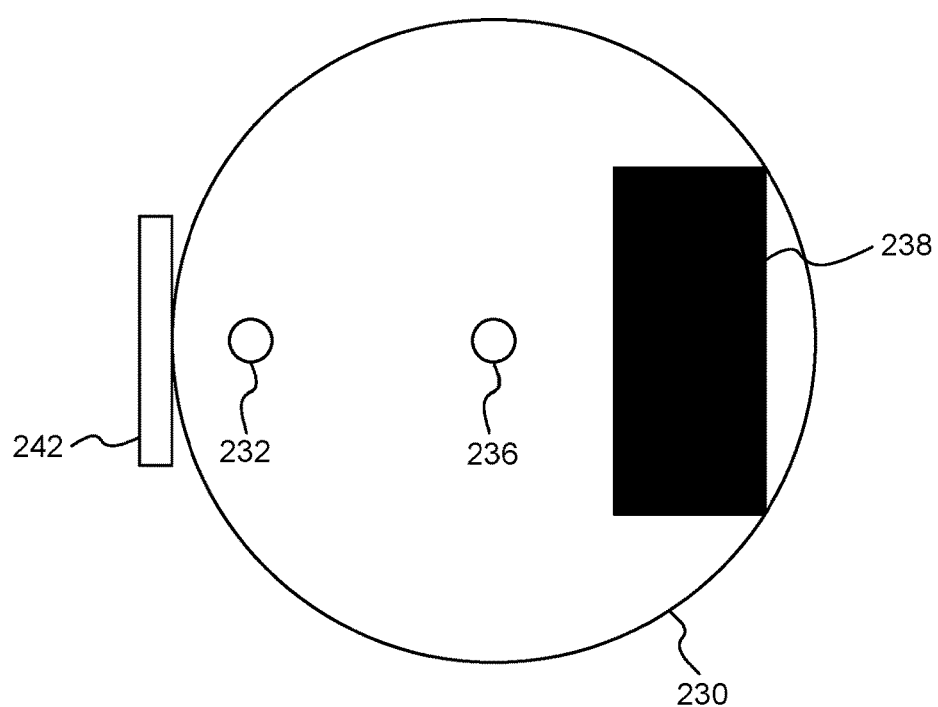
FIG. 8C is a bottom elevation view of the lower component of the lid of FIGS. 7 and 8A
Figure 8D:
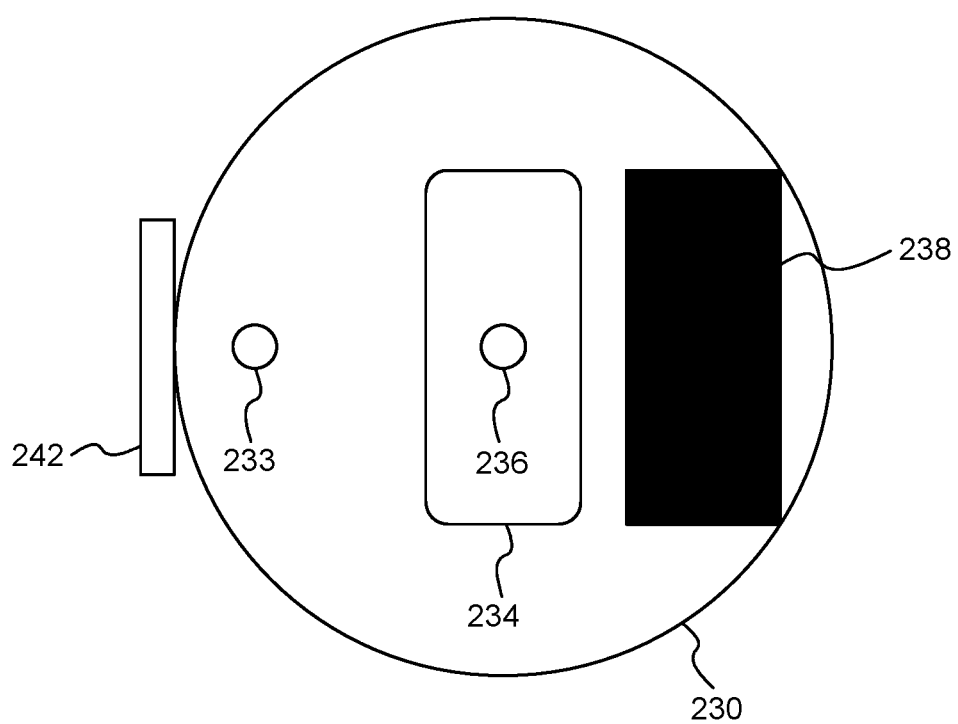
FIG. 8D is a top elevation view of the lower component of the lid of FIGS. 7, 8A and 8C.
Figure 9:
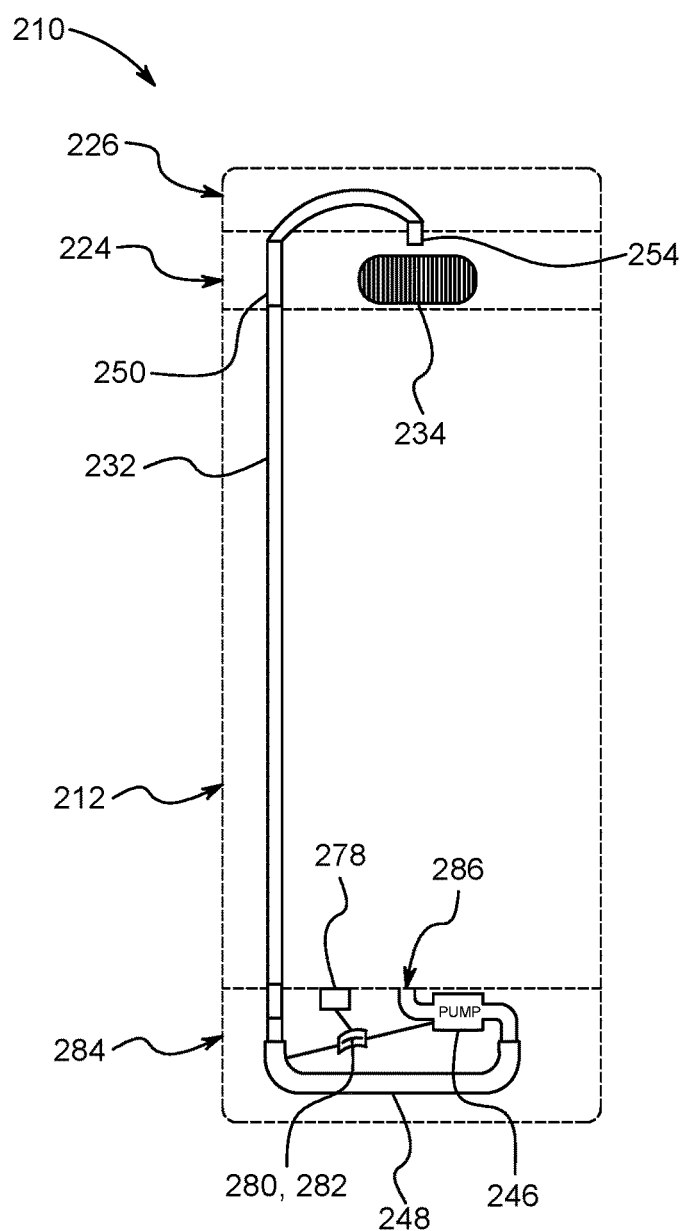
FIG. 9 is a side cut away elevation view of a third embodiment of a portable coffee brewing device having a lid formed of a lower component and an upper component, a pump positioned within a bottom component.
Figure 10:
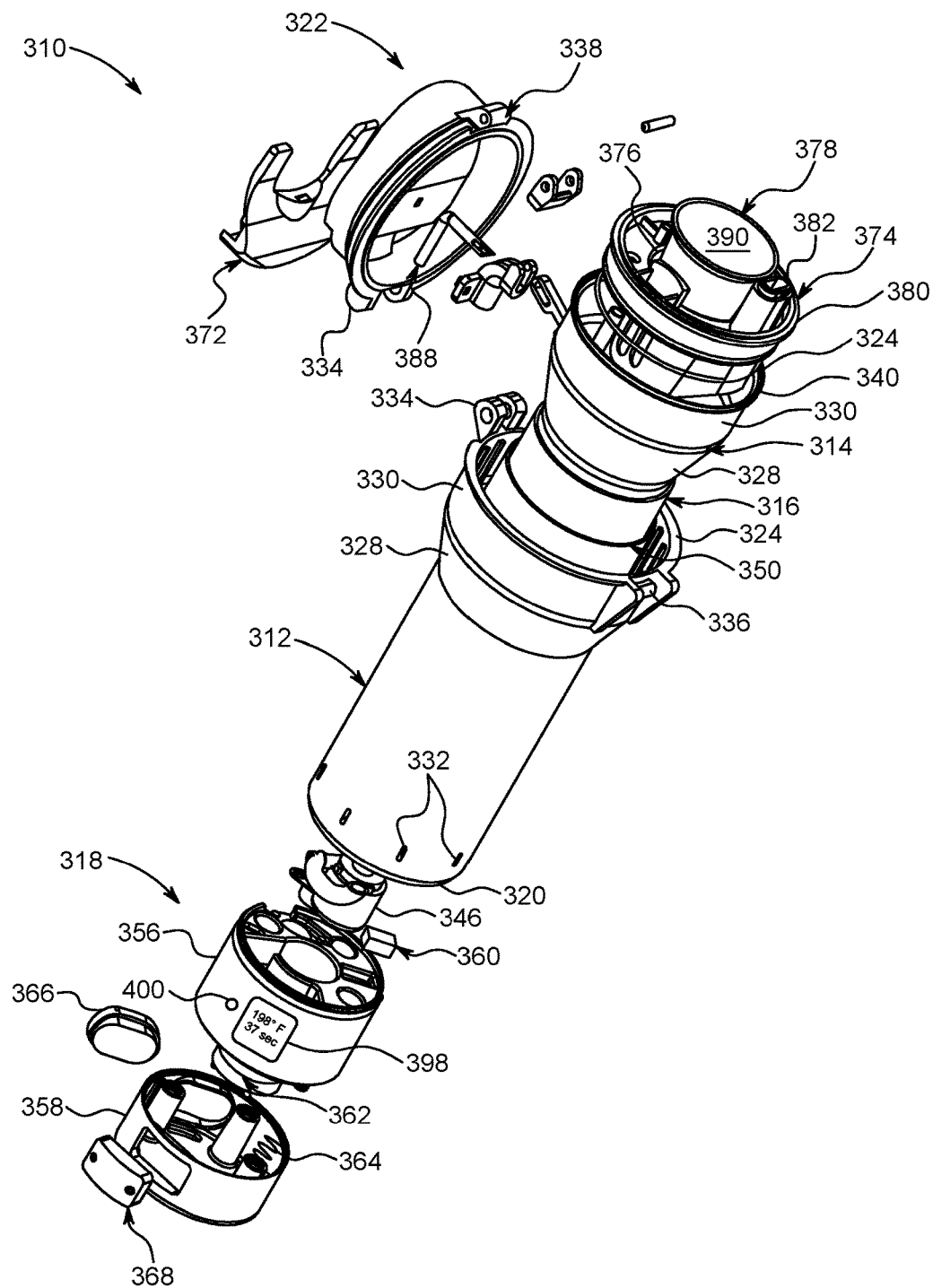
FIG. 10 is a perspective exploded view of a fourth embodiment of a portable coffee brewing device having a container, a sleeve, a lid hingedly connected to the container, a removable basket that is configured to hold a coffee grounds holding device, a heating element wrapped around the sleeve and positioned between the sleeve and the container, an electrical components housing connected to the bottom end of the container housing a pump and other electronic components, a digital display and an alarm positioned in the sidewall of the electrical components housing, the view showing the heating element wrapped around the sleeve and a layer of thermal insulating material wrapped around the heating element.
Figure 11:
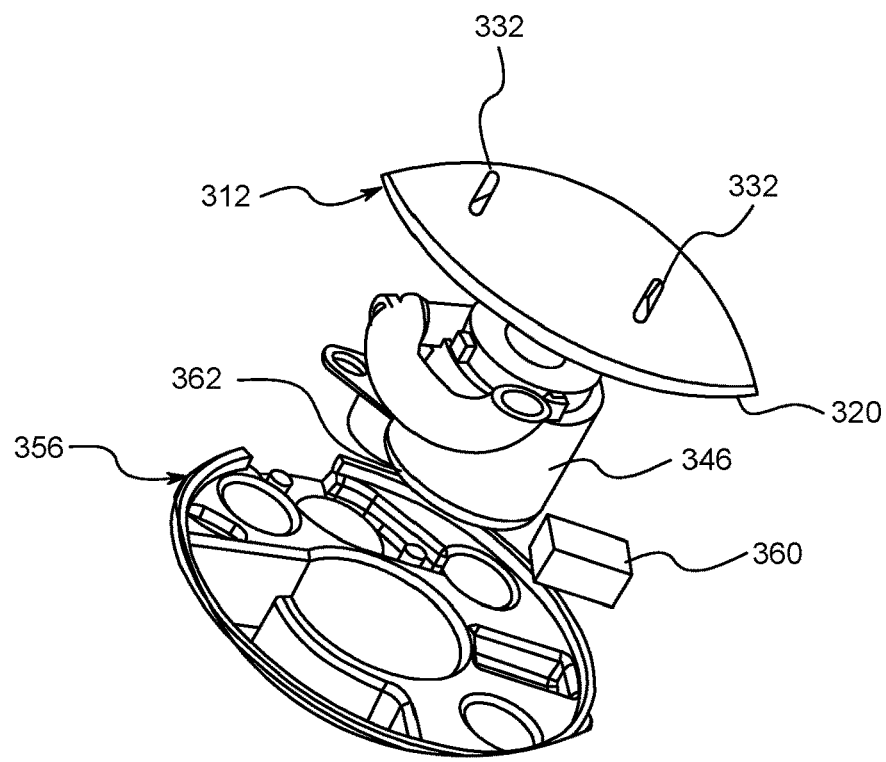
FIG. 11 is a close-up perspective view of the lower end of the container of the portable coffee brewing device shown in FIG. 10, the view showing the pump, sensor and electrical components housing.
Figure 12:
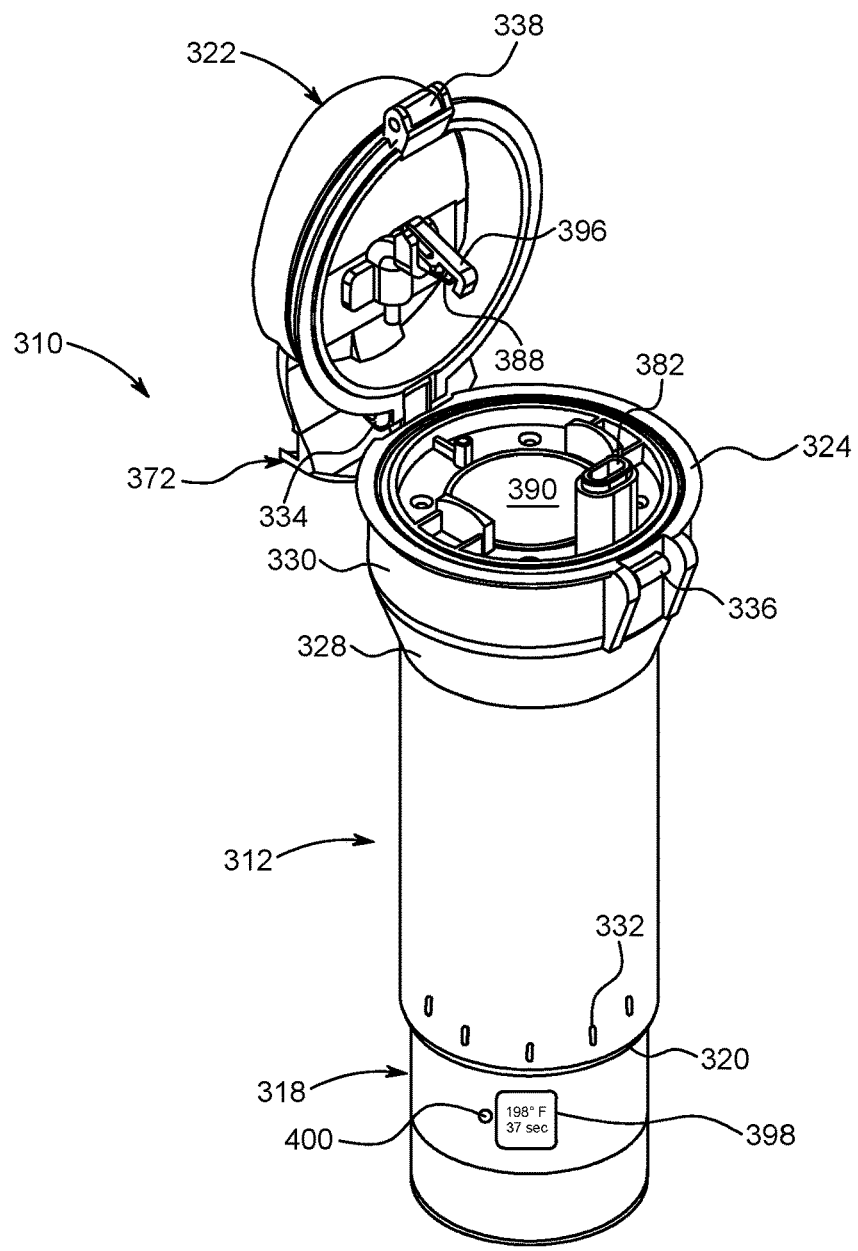
FIG. 12 is a perspective view of the portable coffee brewing device shown in FIGS. 10 and 11, the view showing the lid open.
Figure 13:
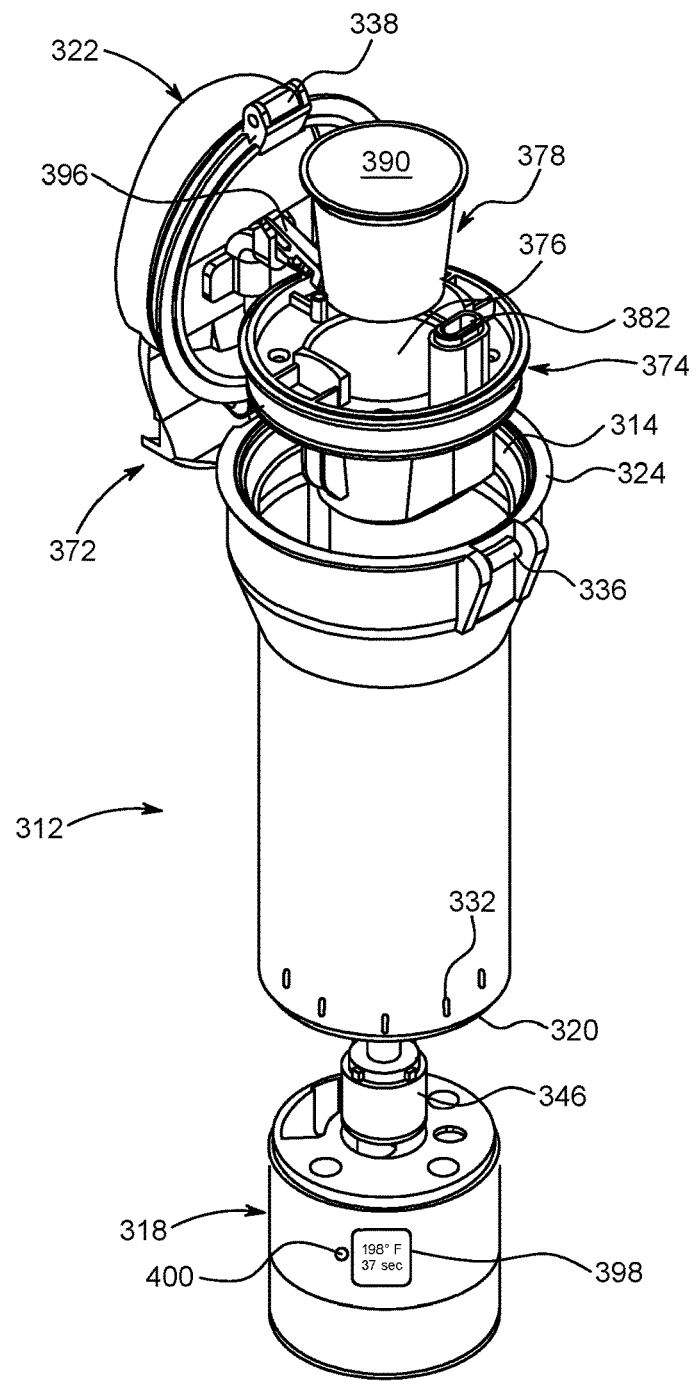
FIG. 13 is an exploded perspective view of the portable coffee brewing device shown in FIGS. 10-12, the view showing the lid open and the basket in a removed position and the view showing the coffee grounds holding container in a removed condition.
Figure 14:
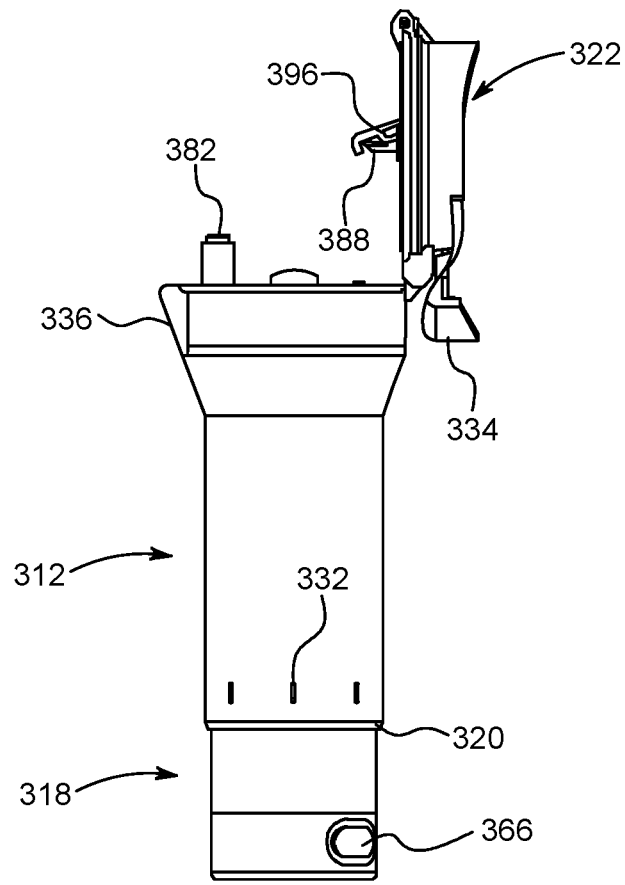
FIG. 14 is a side elevation view of the portable coffee brewing device shown in FIGS. 10-13, the view showing the lid in an open position.
Figure 15:
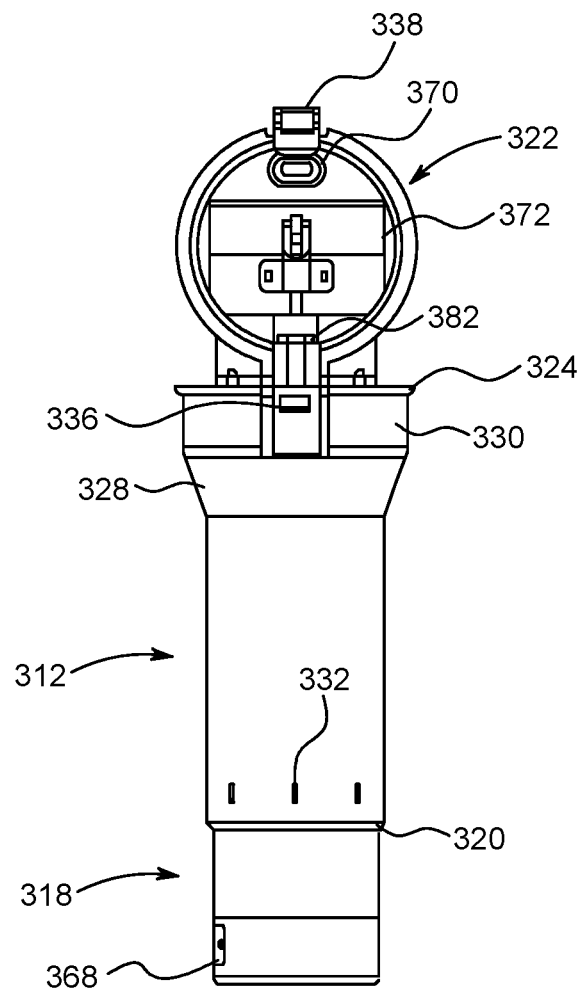
FIG. 15 is a front elevation view of the portable coffee brewing device shown in FIGS. 10-14, the view showing the lid in an open position.
Figure 16:
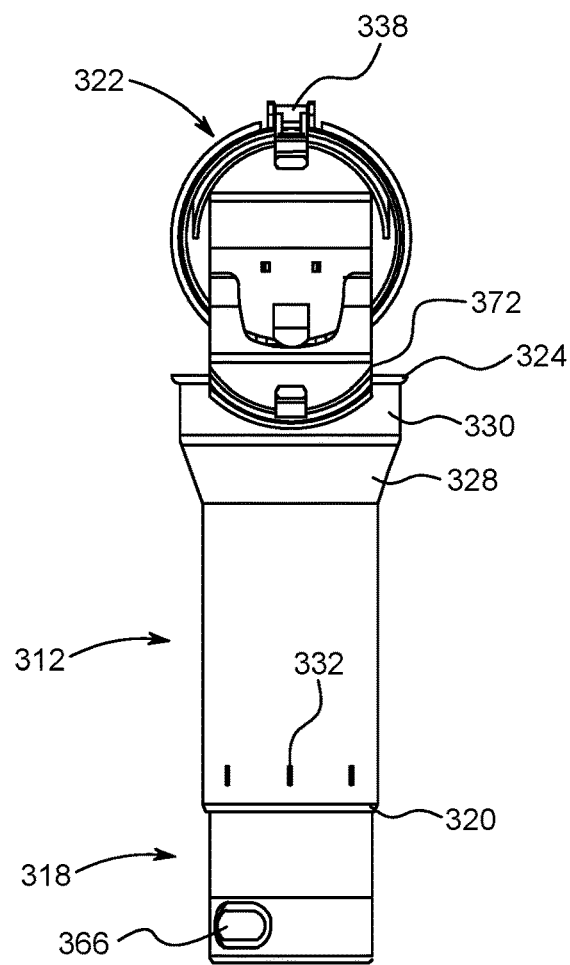
FIG. 16 is a rear elevation view of the portable coffee brewing device shown in FIGS. 10-15, the view showing the lid in an open position.
Figure 17:
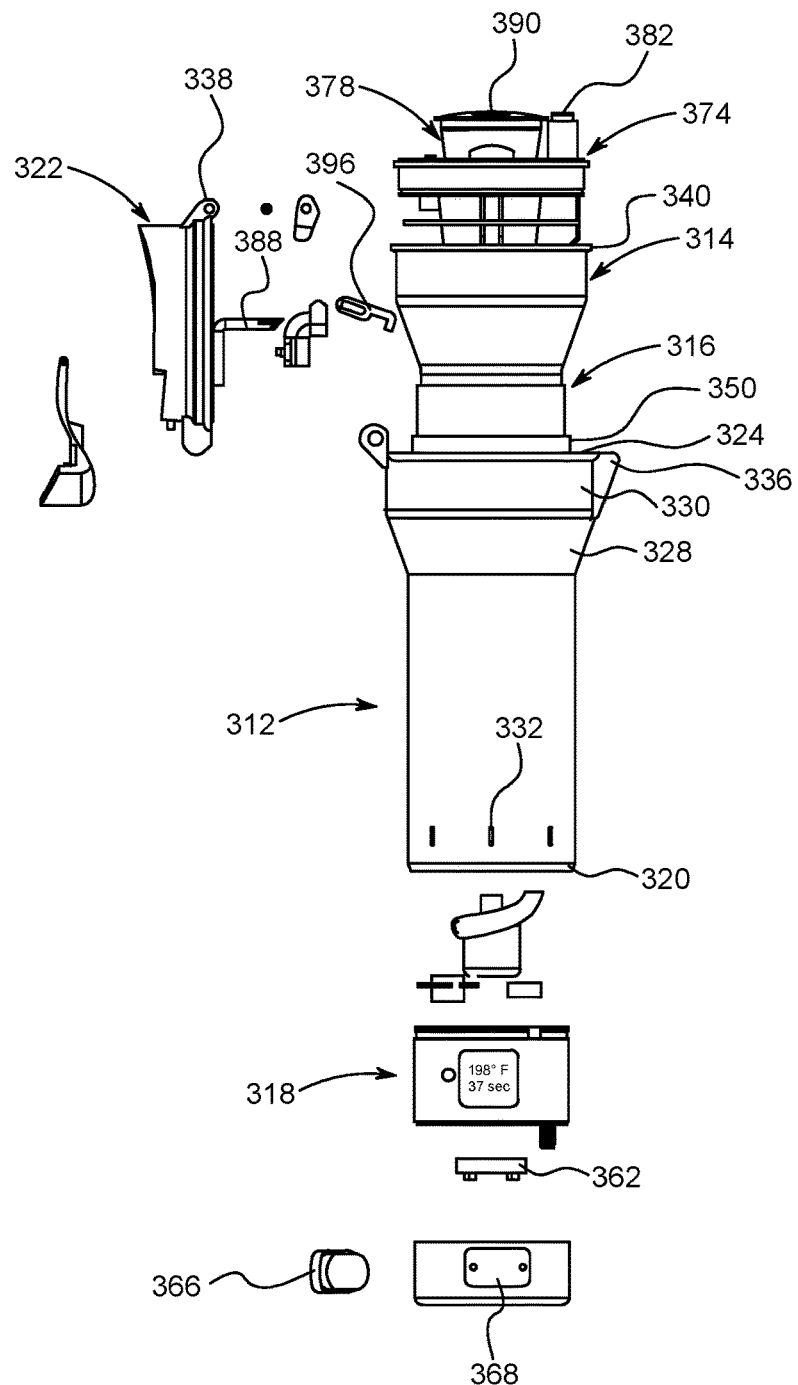
FIG. 17 is a side elevation exploded view of the portable coffee brewing device shown in FIGS. 10-16.
Figure 18:
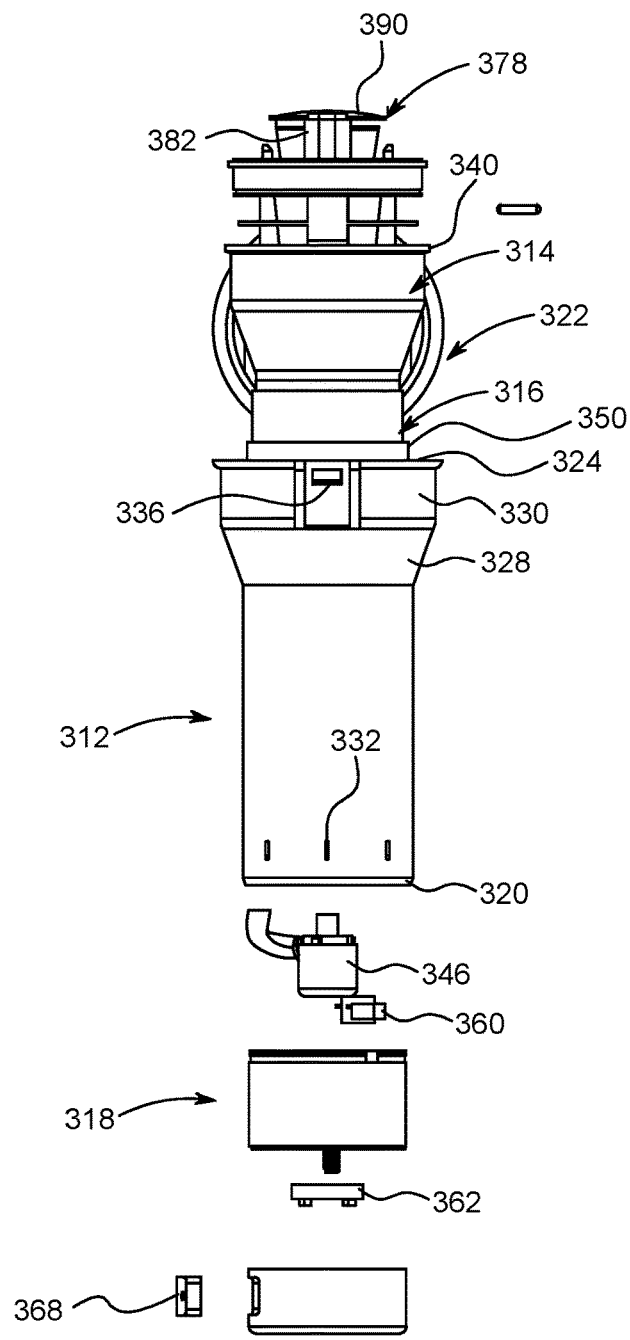
FIG. 18 is a front elevation exploded view of FIG. 17.
Figure 19:
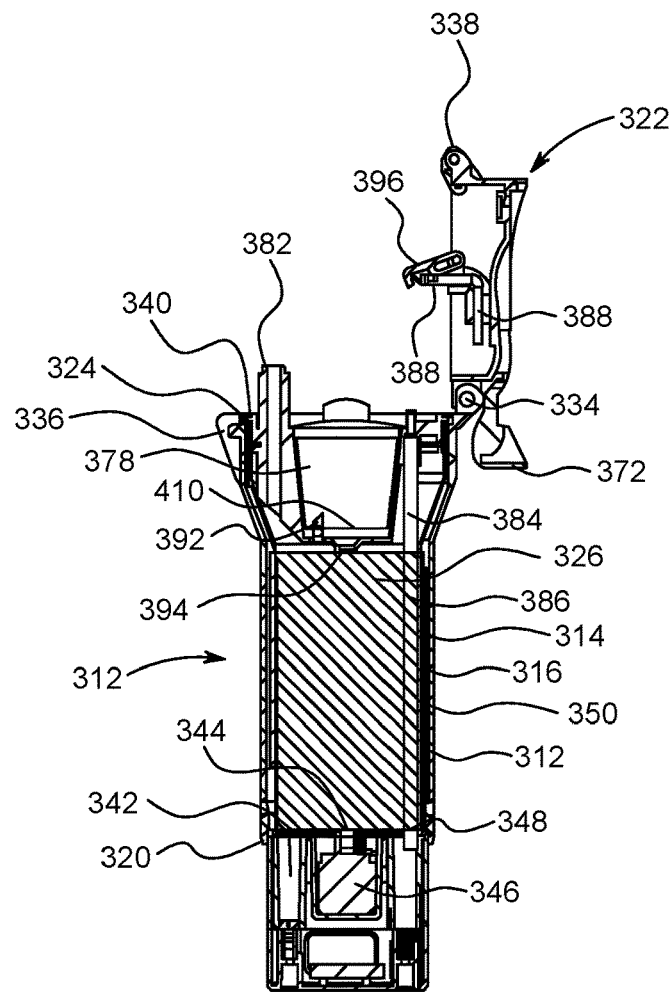
FIG. 19 is a side elevation cut-away view of the portable coffee brewing device shown in FIGS. 10-18, the view showing the lid in an open position.
Figure 20:
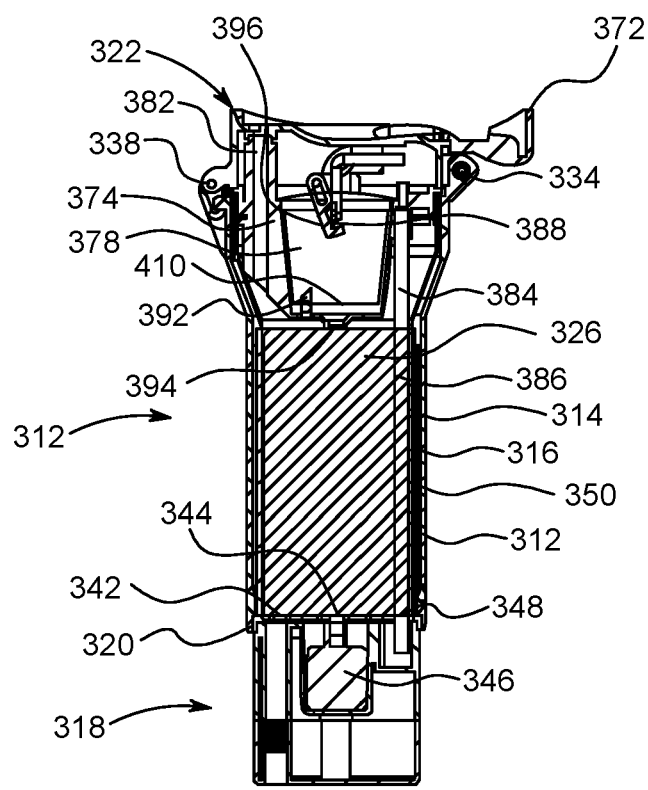
FIG. 20 is a side elevation cut-away view of the portable coffee brewing device shown in FIG. 20, the view showing the lid in a closed position.
Figure 21:
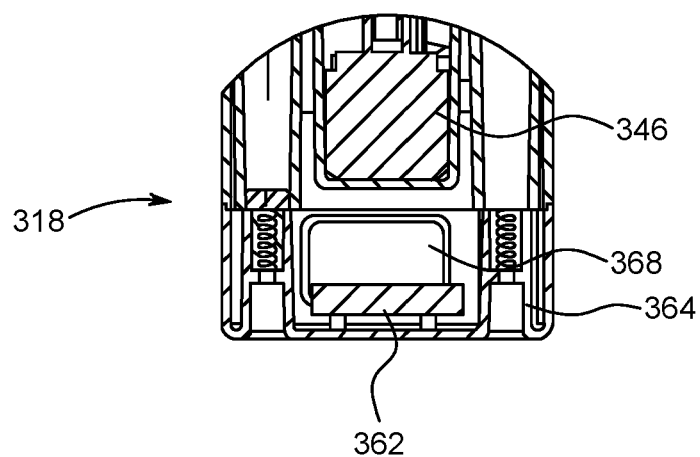
FIG. 21 is a close up side elevation cut-away view of the lower end of the portable coffee brewing device shown in FIG. 19.
Figure 22:
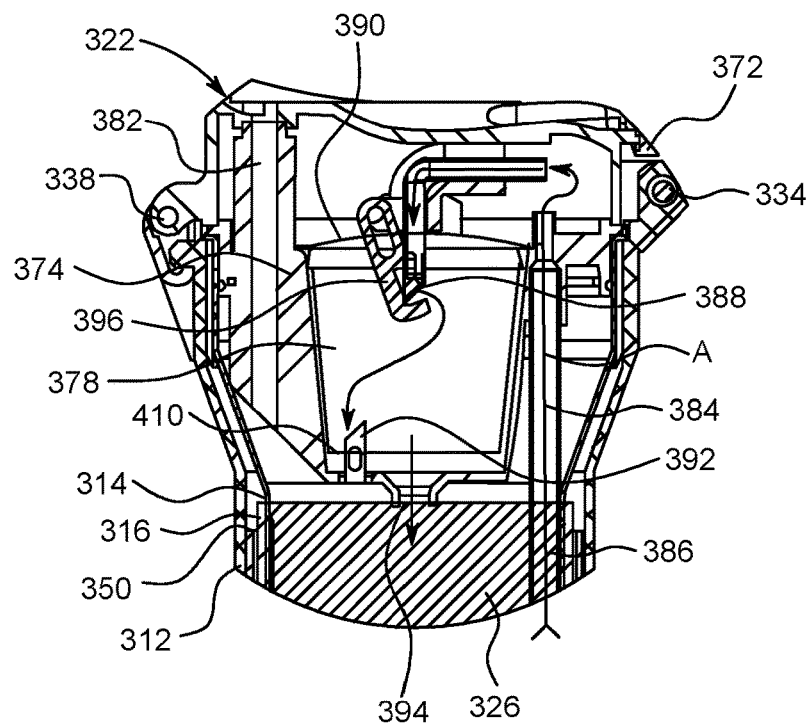
FIG. 22 is a close up side elevation cut-away view of the upper end of the portable coffee brewing device shown in FIG. 20.
Figure 23:
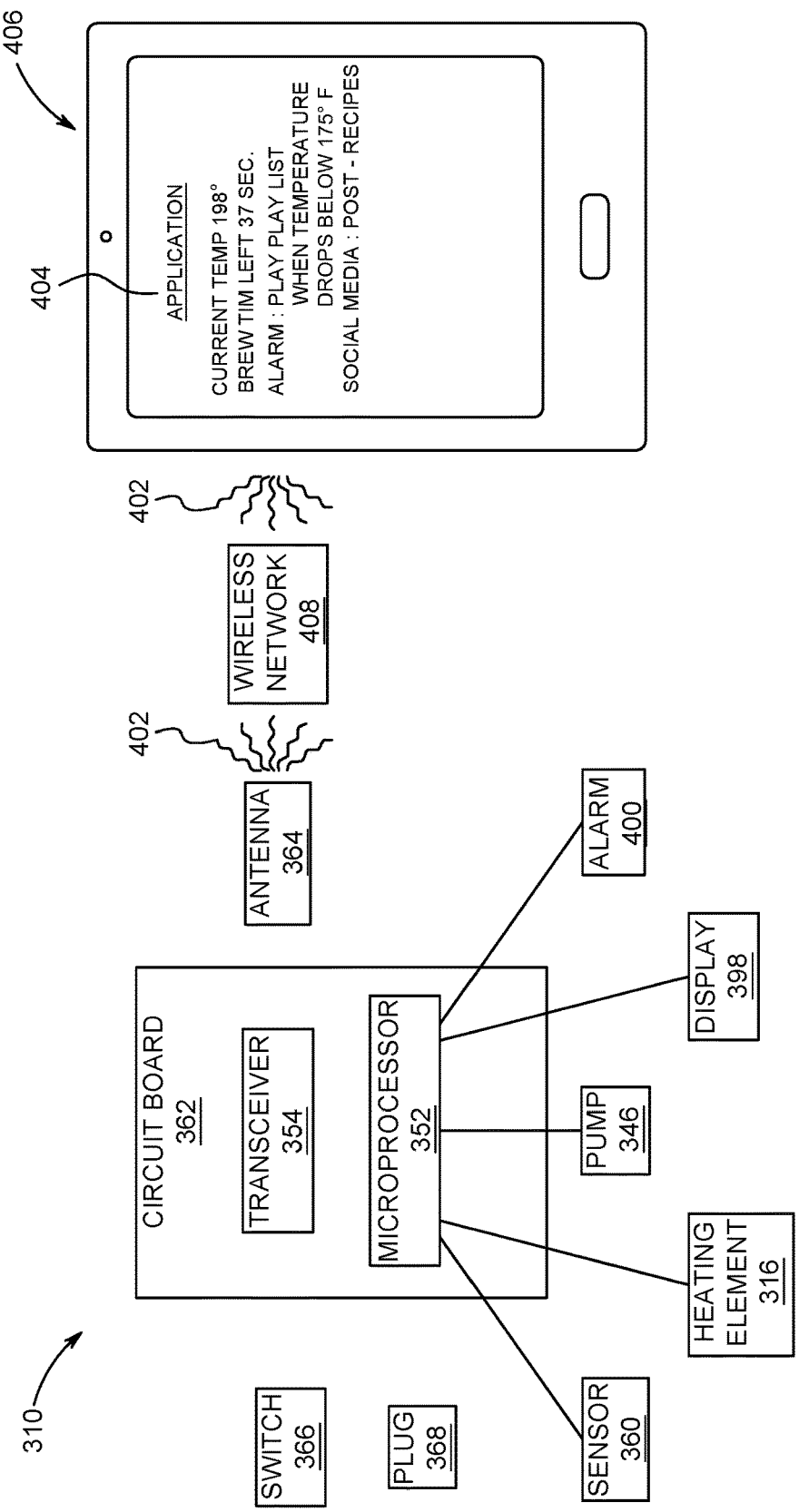
FIG. 23 is a plan view of the electrical components of the system including the circuit board, microprocessor, transceiver, antenna, sensor, heating element, pump, display, alarm, plug and switch, as well as its wireless connection with its related application run on a computing device and controlled through wireless control signals over the air or through an electronic network.
Figure 24:
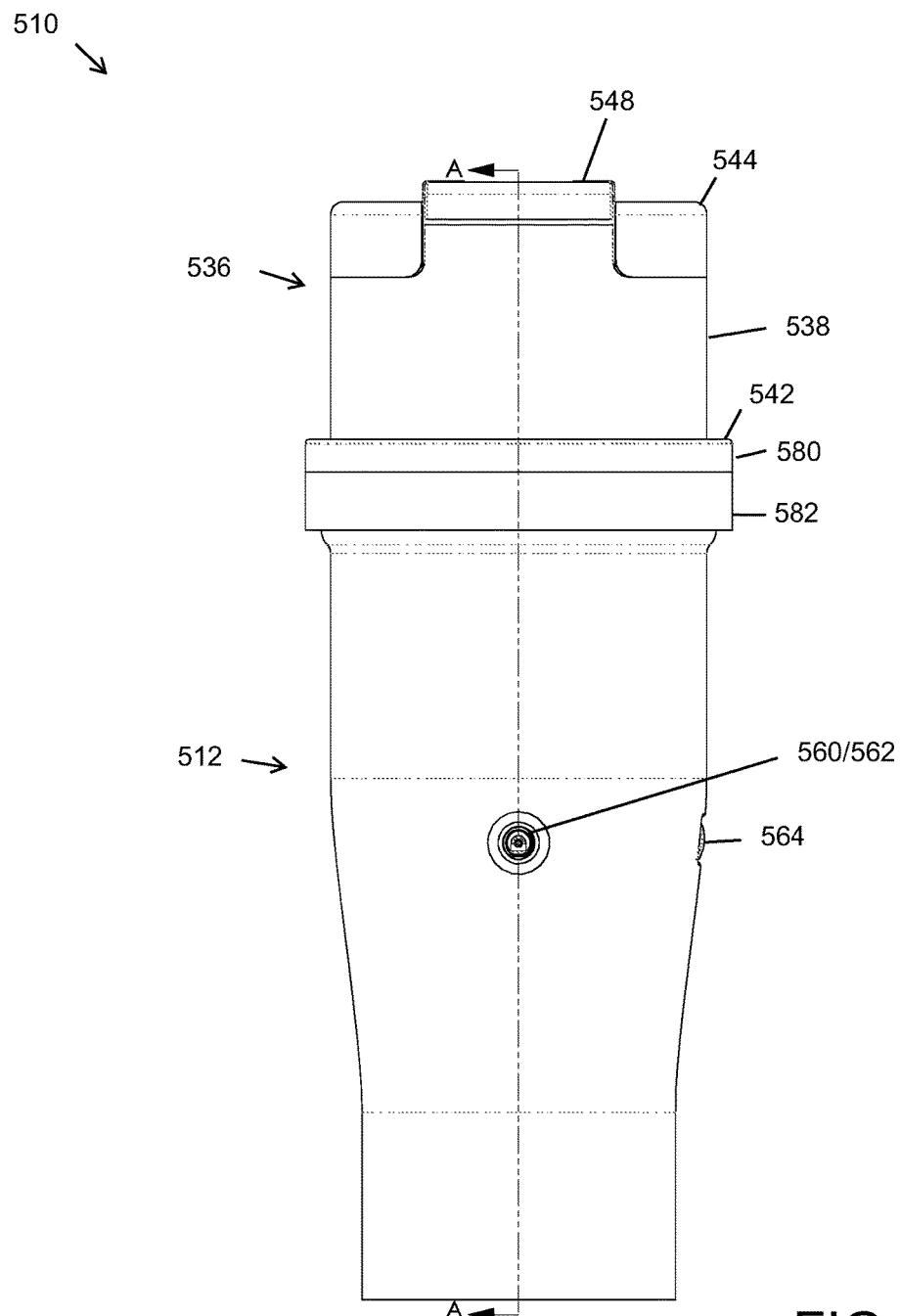
FIG. 24 is an elevation view of a first side of another embodiment of a portable coffee brewing system that has a container, a lid and a first chamber and a second chamber.
Figure 25:
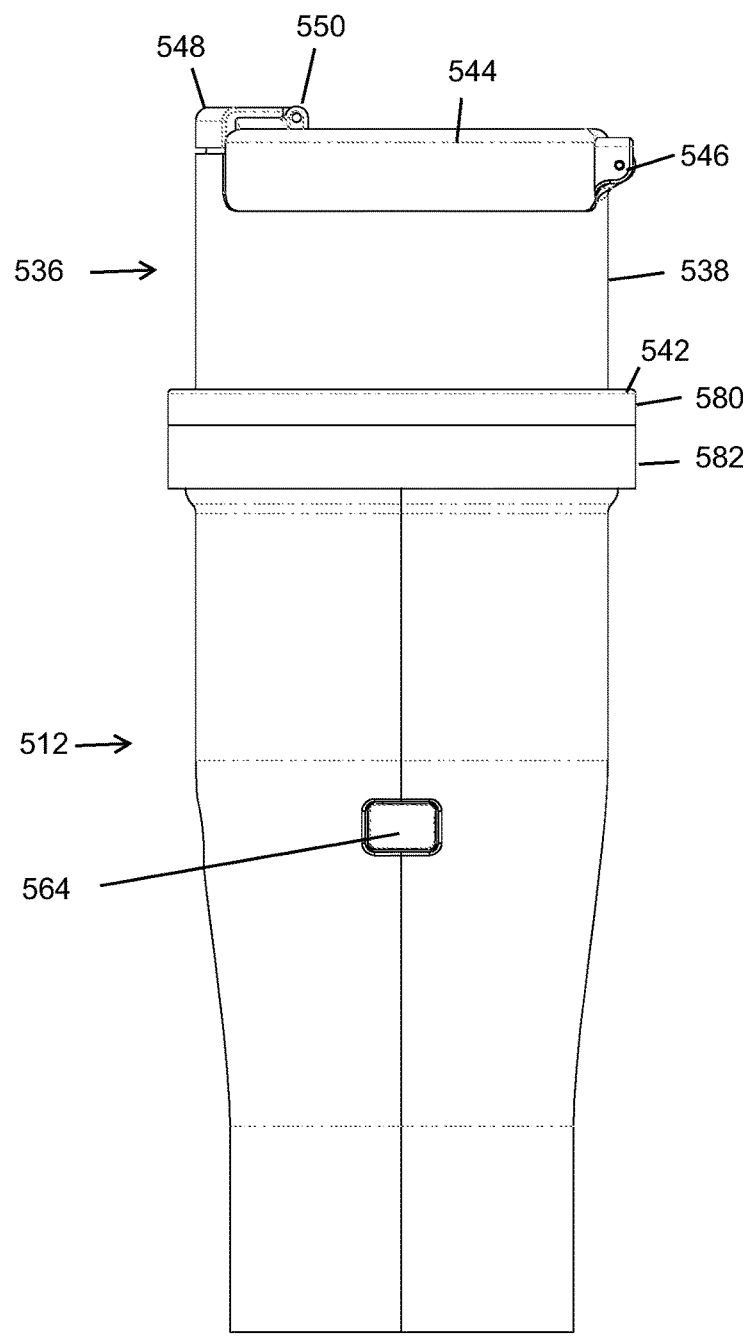
FIG. 25 is an elevation view of a second side of the portable coffee brewing device shown in FIG. 24.
Figure 26:
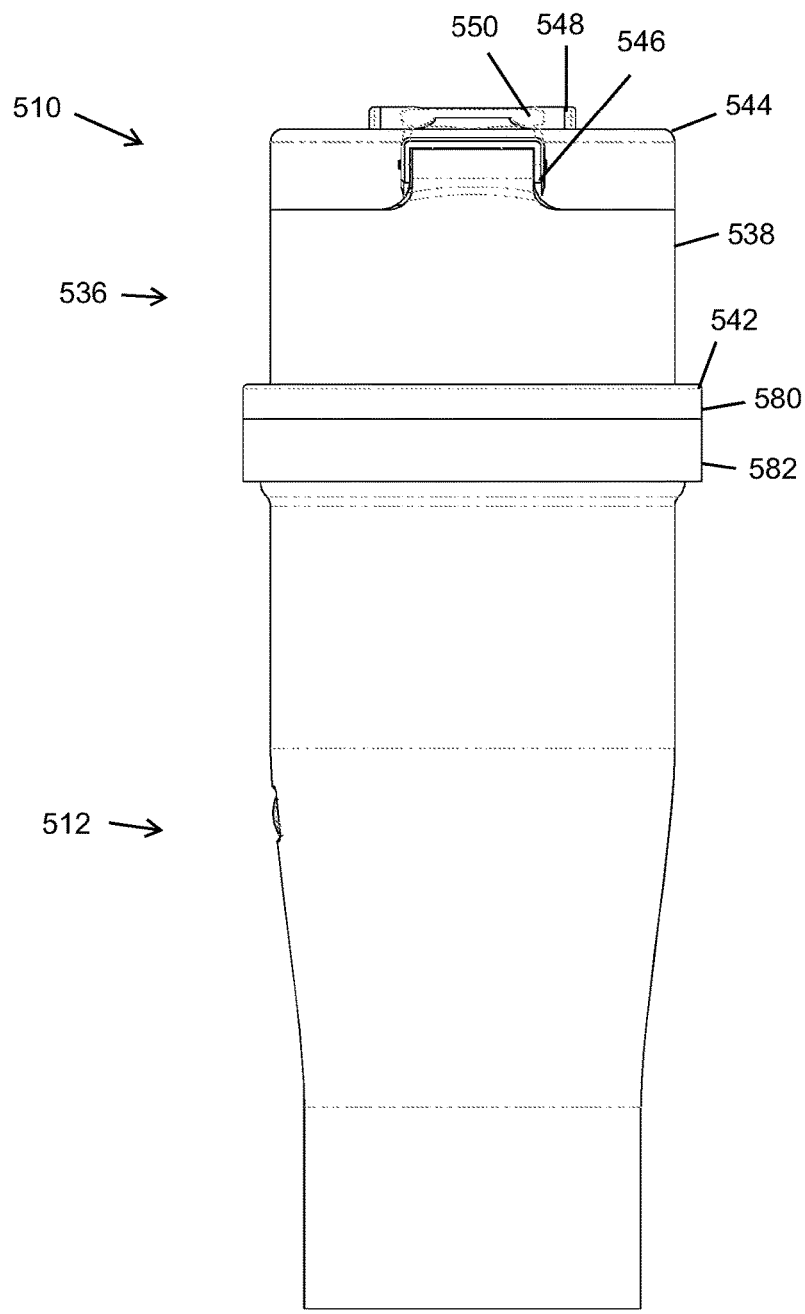
FIG. 26 is an elevation view of a third side of the portable coffee brewing device shown in FIGS. 24-25.
Figure 27:
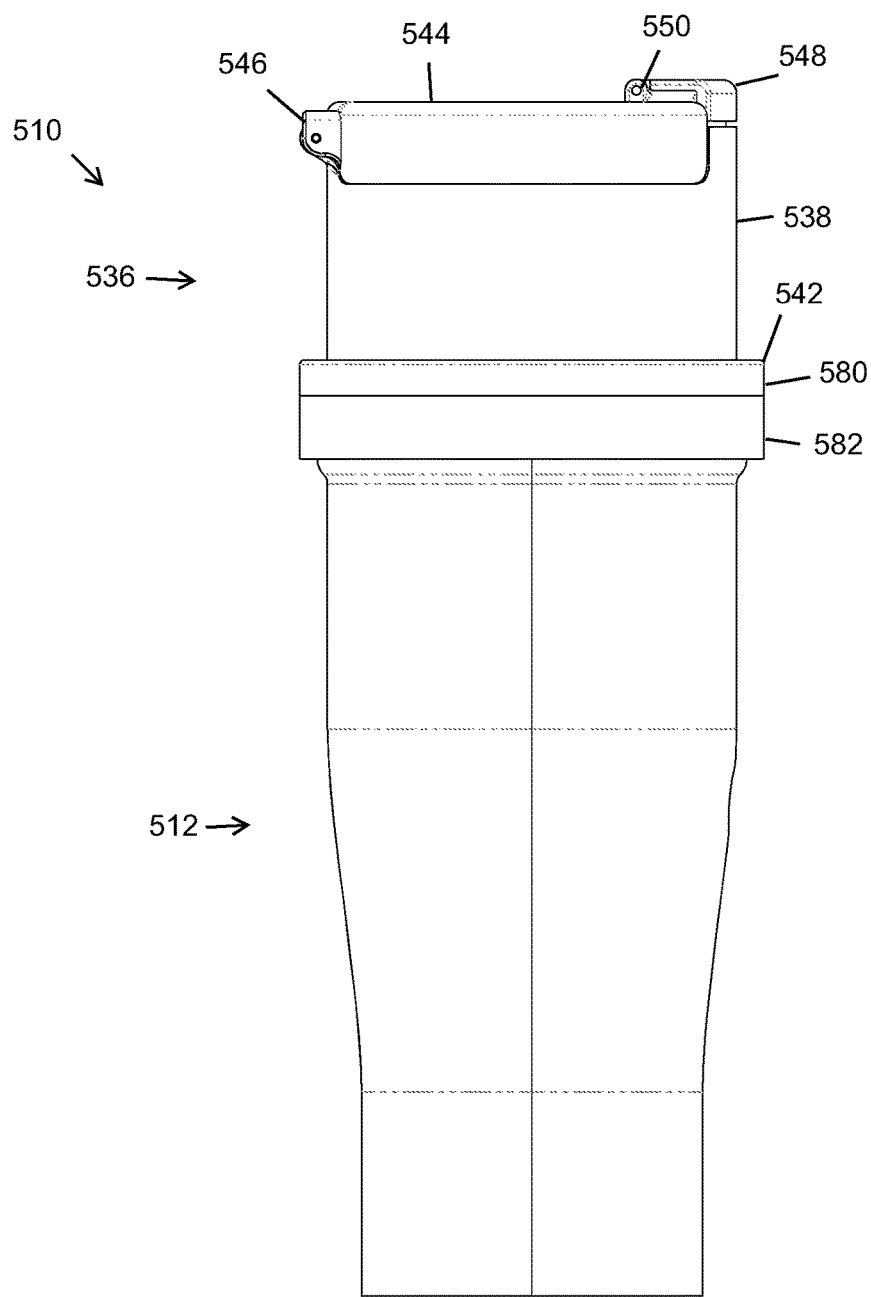
FIG. 27 is an elevation view of a fourth side of the portable coffee brewing device shown in FIGS. 24-26.
Figure 28:
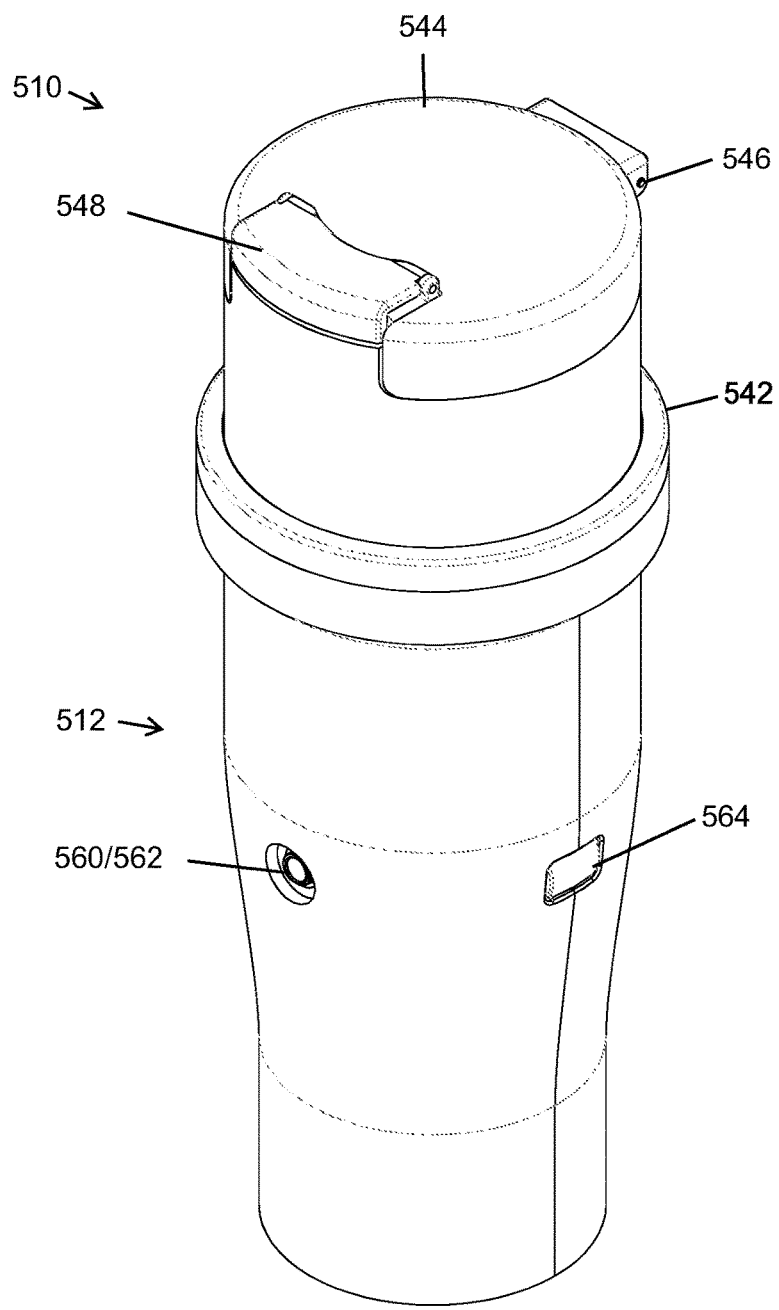
FIG. 28 is a perspective view of the portable coffee brewing device shown in FIGS. 24-27.
Figure 29:
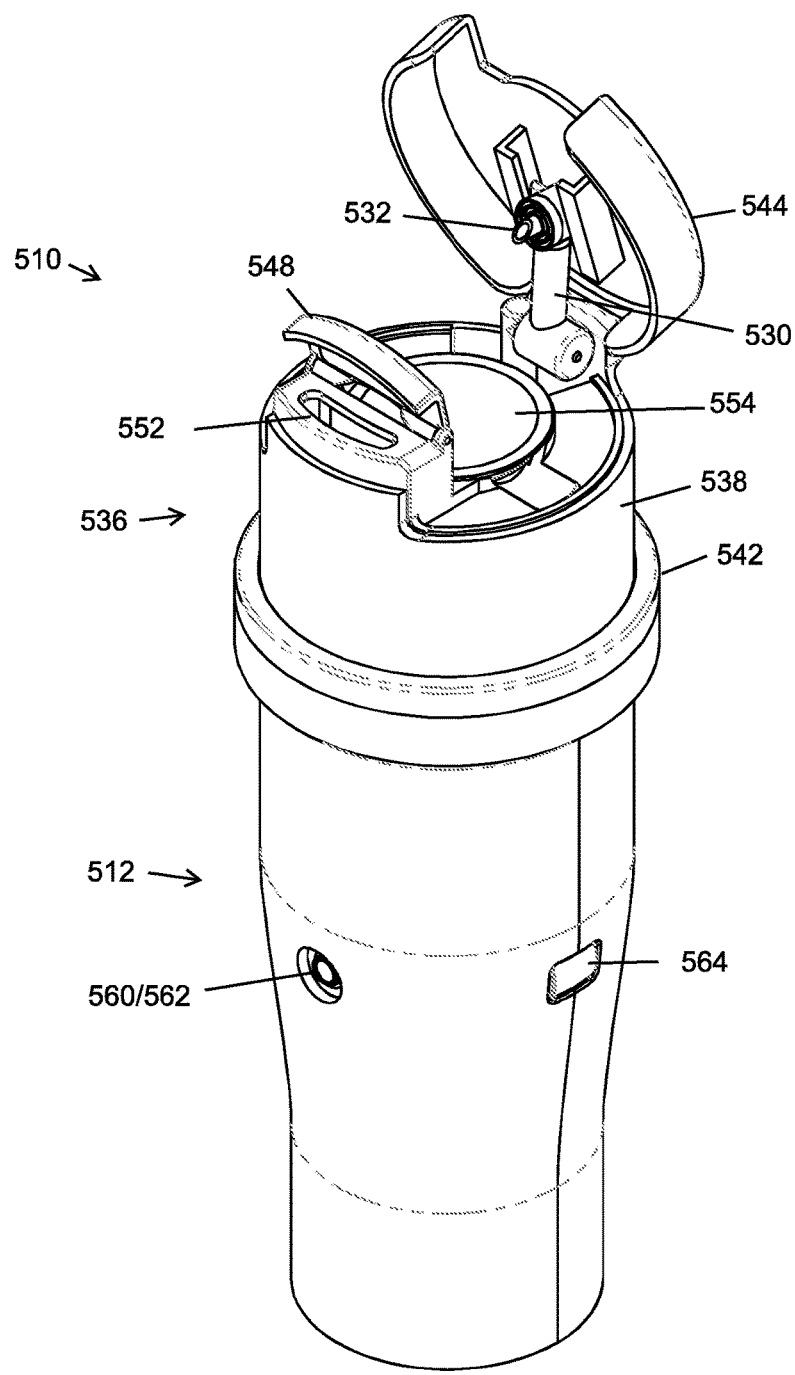
FIG. 29 is a perspective view of the portable coffee brewing device shown in FIGS. 24-28, the view showing the first cover in an open position showing the basket therein, the view also showing the second cover in an open position showing the pour spout.
Figure 30:
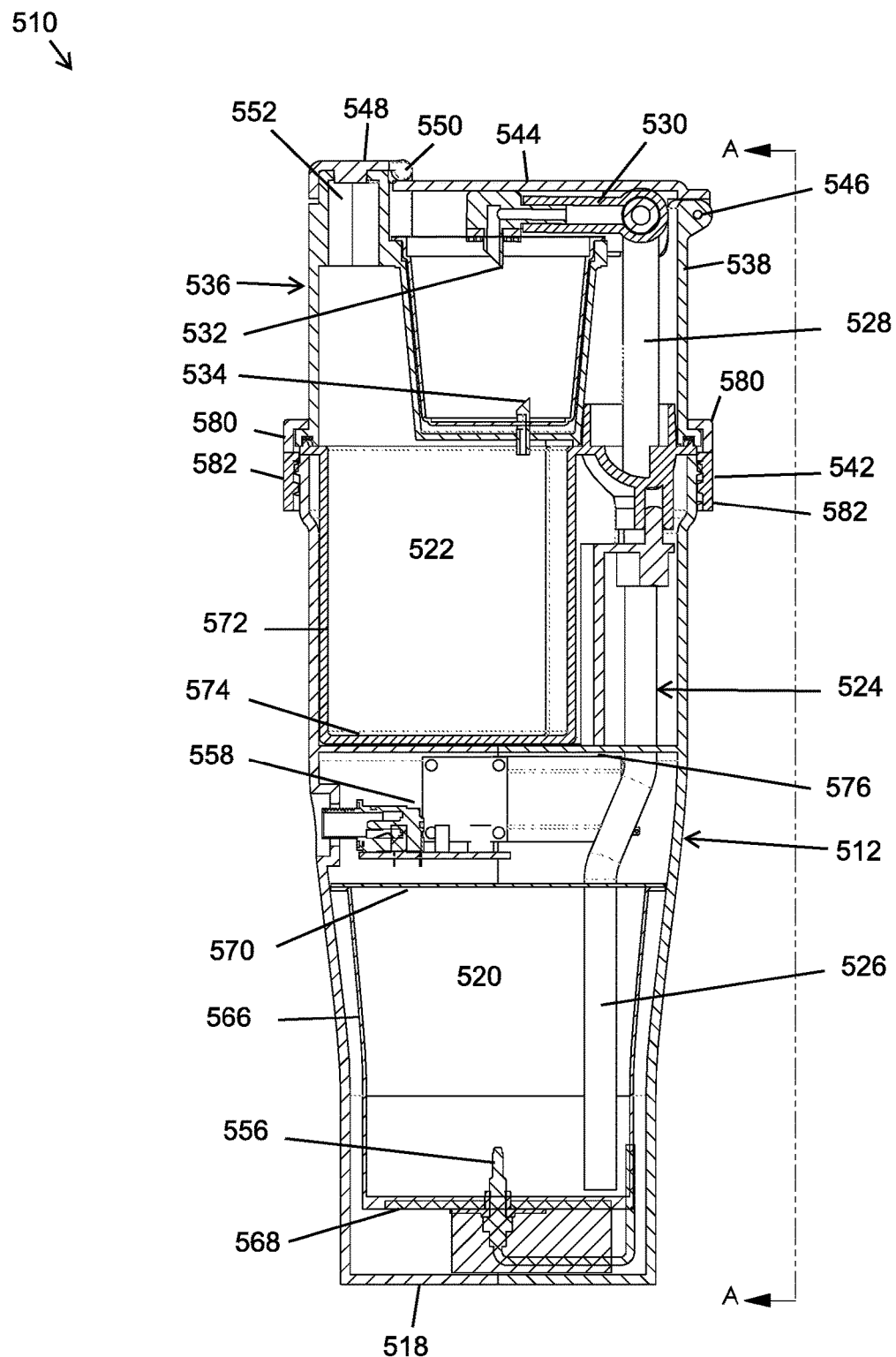
FIG. 30 is an elevation section view of the portable coffee brewing device shown in FIGS. 24-29.
Figure 31:
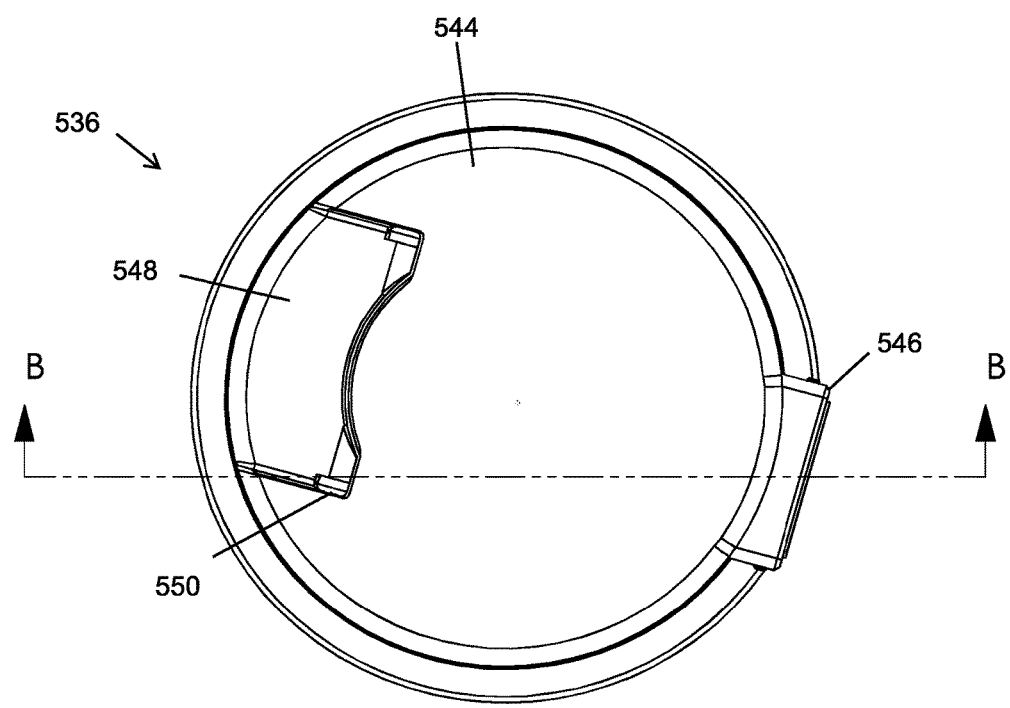
FIG. 31 is an elevation section view of the top side of the portable coffee brewing device shown in FIGS. 24-30.
Figure 32:
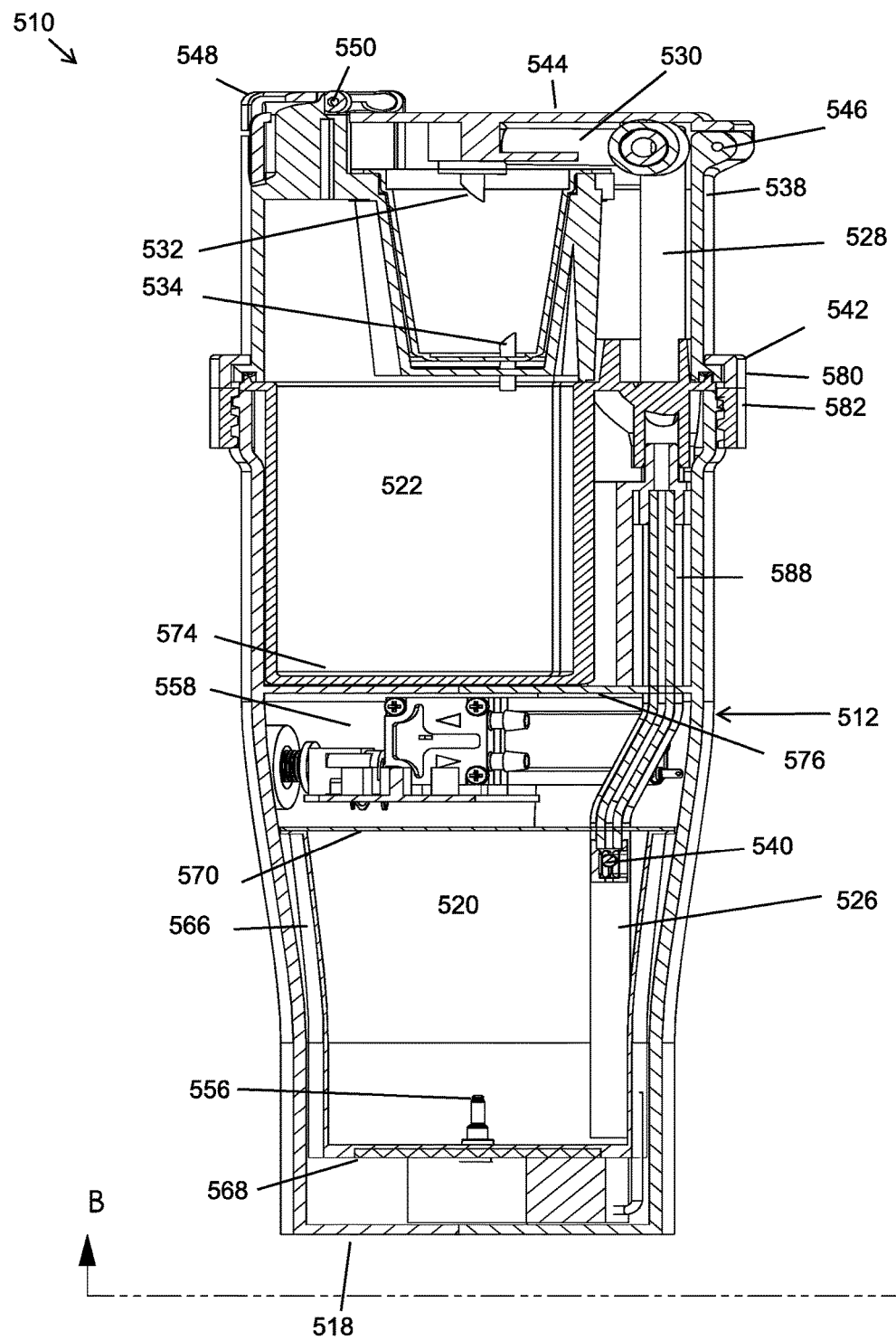
FIG. 32 is an elevation section view of the portable coffee brewing device shown in FIGS. 24-31, the section view along line BB shown in FIG. 31.
Figure 33:
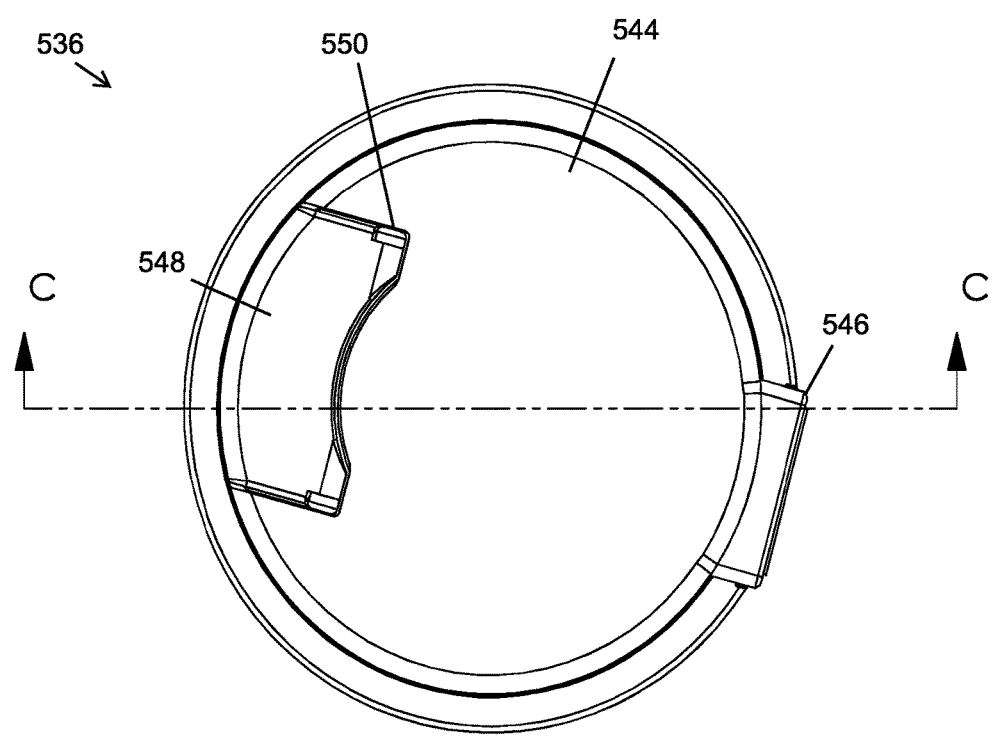
FIG. 33 is an elevation section view of the top side of the portable coffee brewing device shown in FIGS. 24-32.
Figure 34:
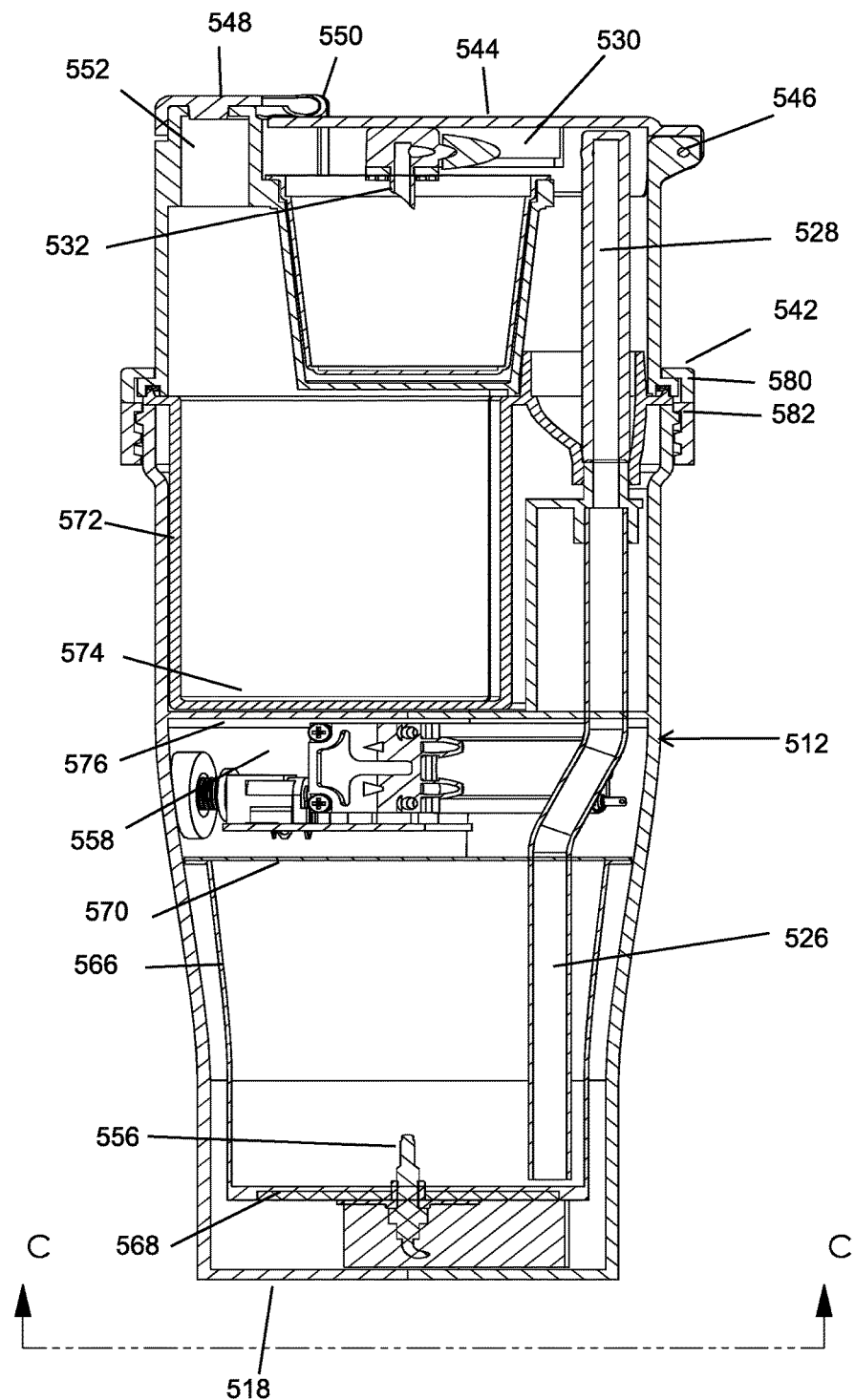
FIG. 34 is an elevation section view of the portable coffee brewing device shown in FIGS. 24-33, the section view along line CC shown in FIG. 33.
Figure 35:
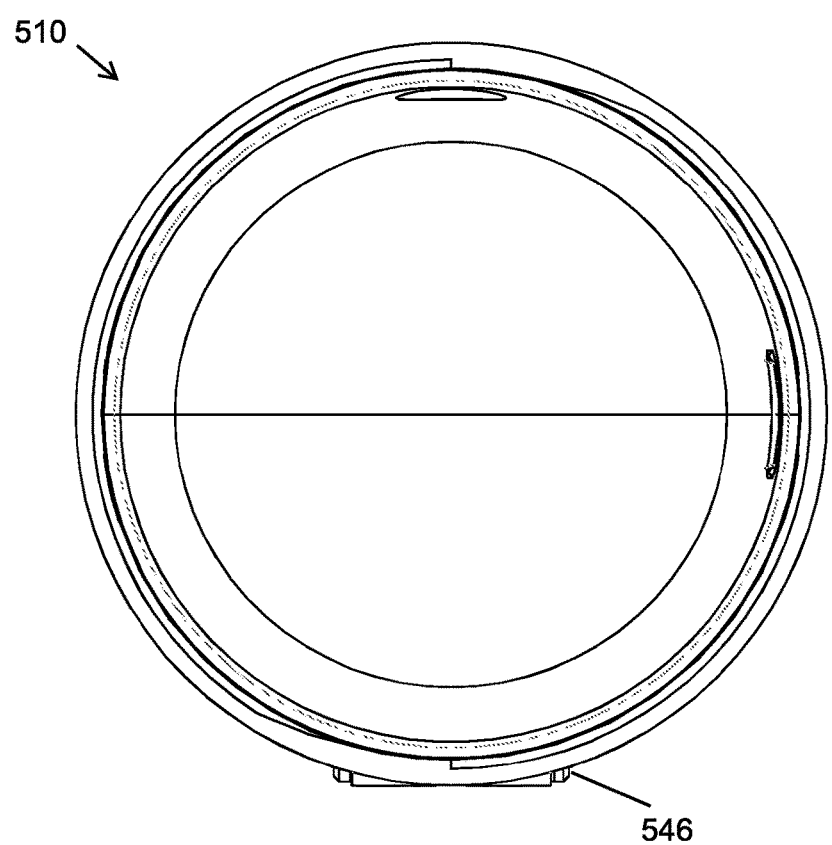
FIG. 35 is an elevation section view of the bottom side of the portable coffee brewing device shown in FIGS. 24-34.
Figure 36:
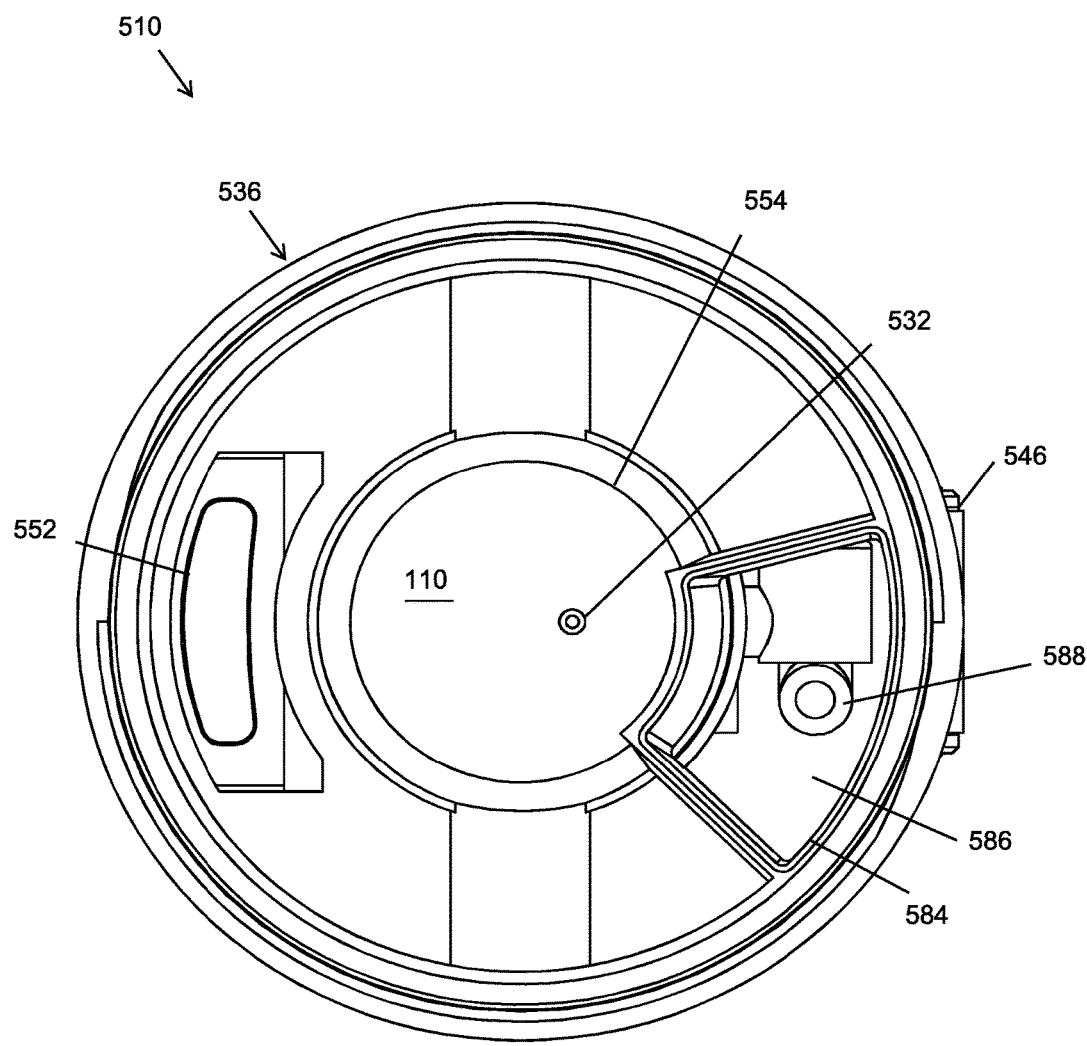
FIG. 36 is an elevation section view of the top side of the portable coffee brewing device shown in FIGS. 24-35, the view showing portions of the lid remove so as to expose the basket and fill opening.
Figure 37:
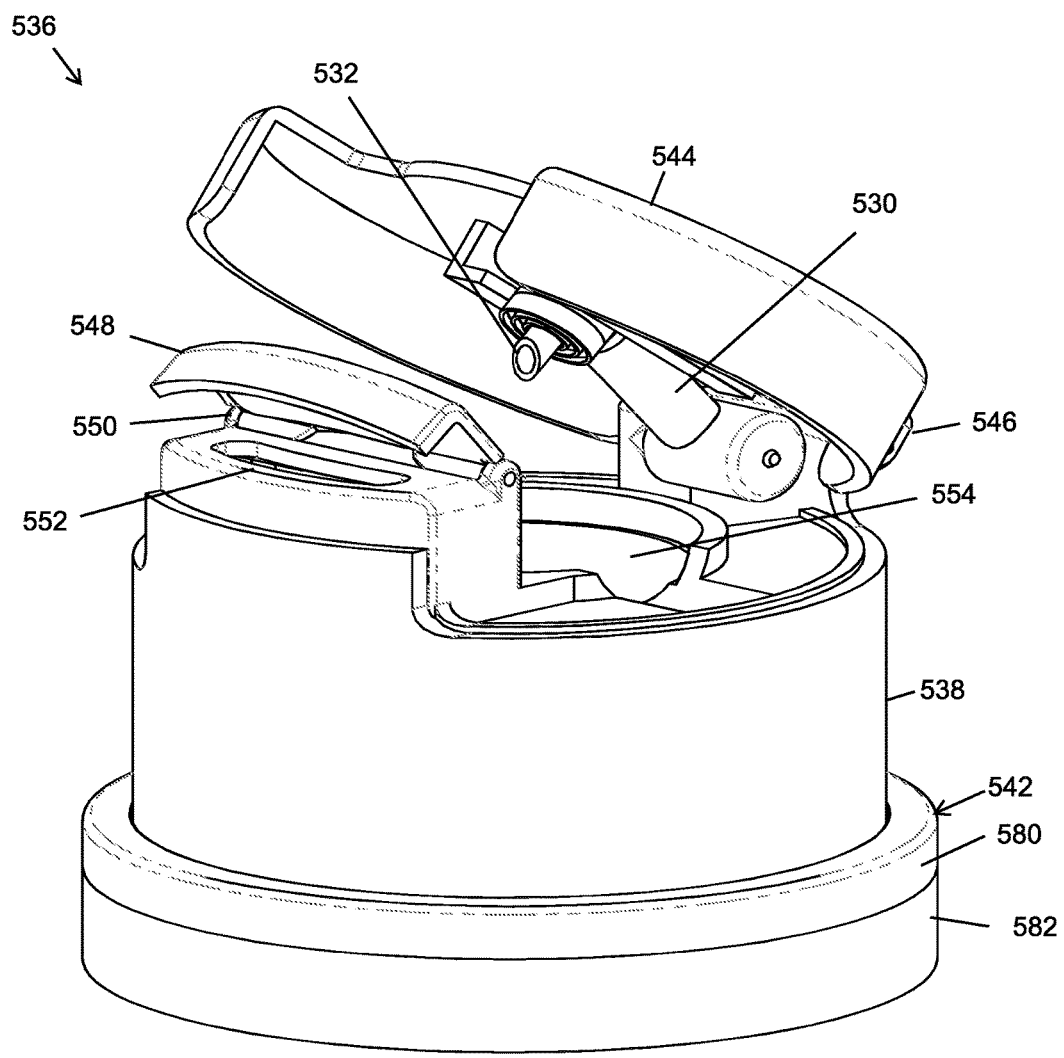
FIG. 37 is a perspective view of the lid of the portable coffee brewing device shown in FIGS. 24-36, the view showing the first cover in an open position showing the basket therein, the view also showing the second cover in an open position showing the pour spout.
Figure 38:
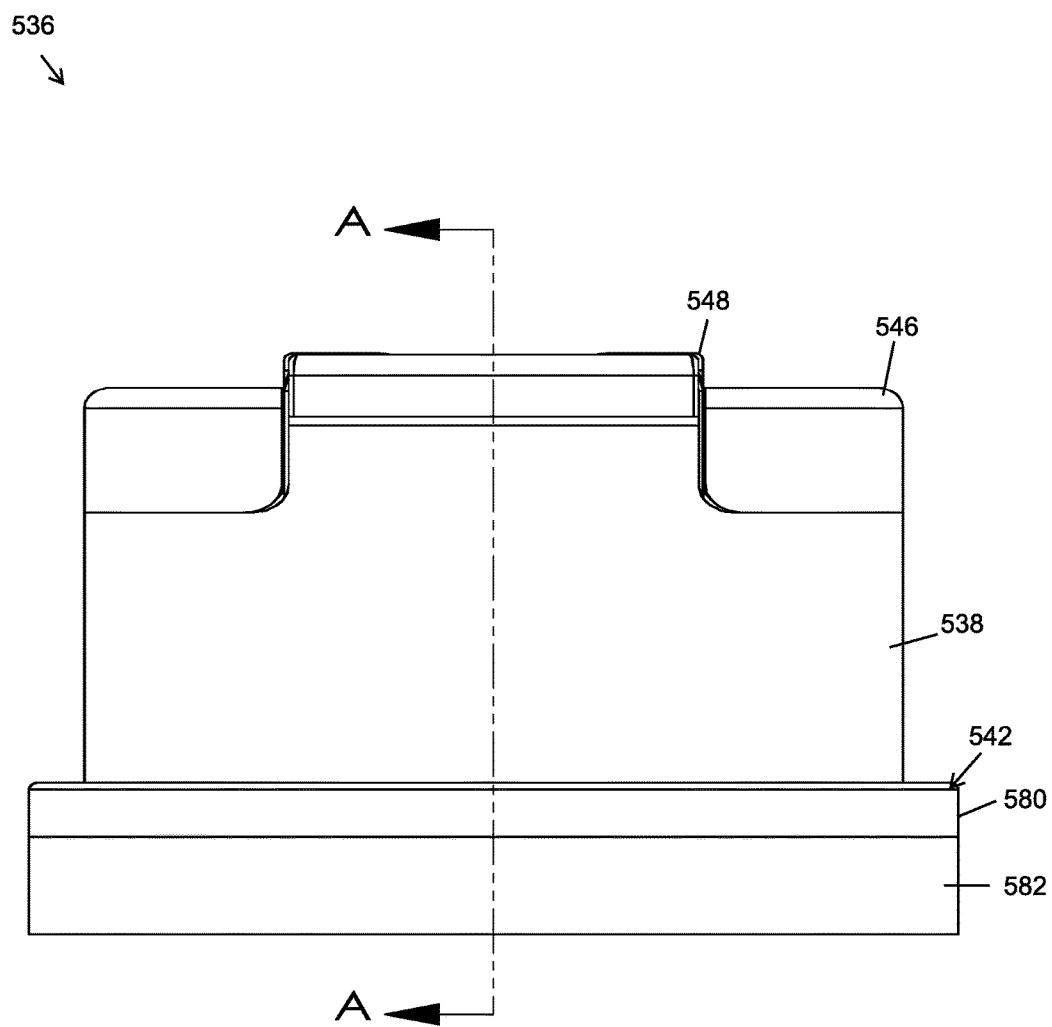
FIG. 38 is an elevation view of the lid of the portable coffee brewing device shown in FIGS. 24-37.
Figure 39:
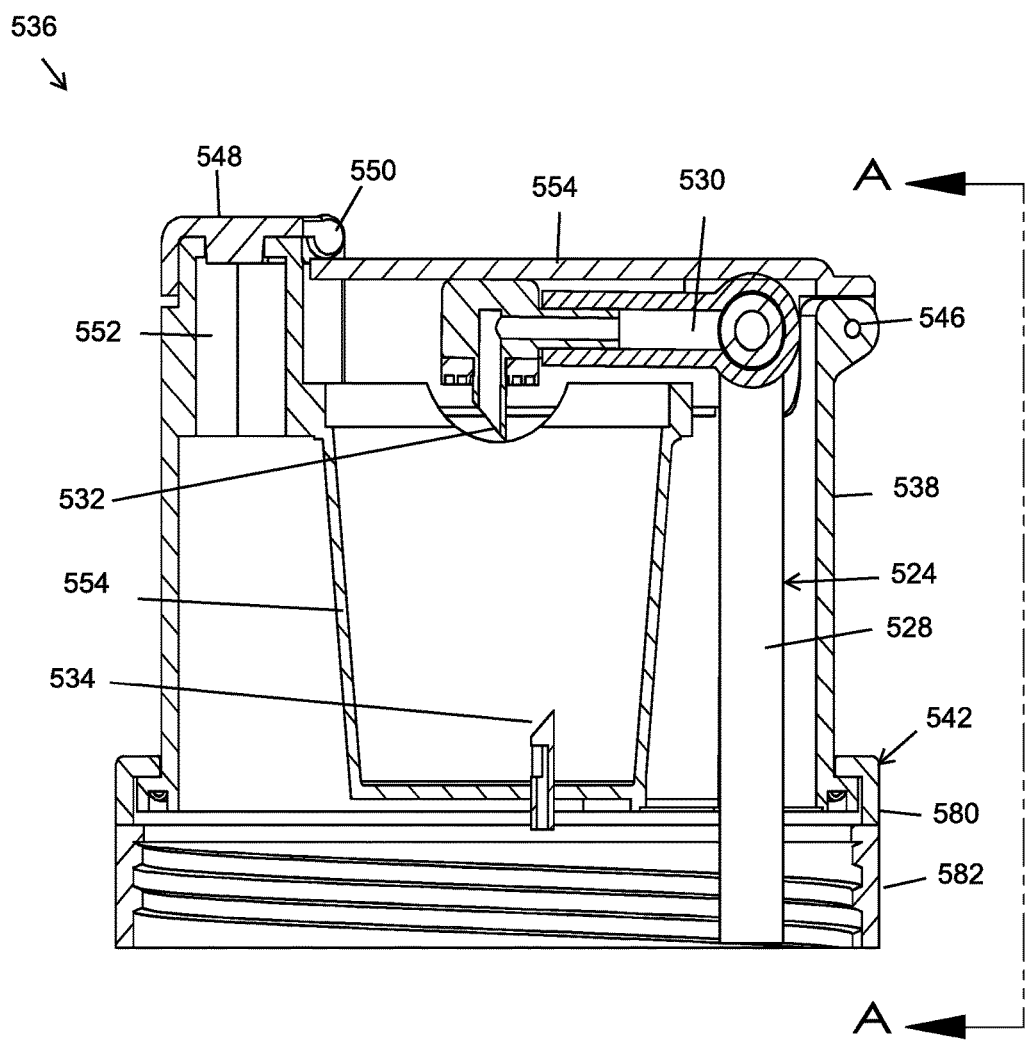
FIG. 39 is an elevation section view of the lid of the portable coffee brewing device shown in FIGS. 24-38, the section view along line AA shown in FIG. 37.
Figure 40:
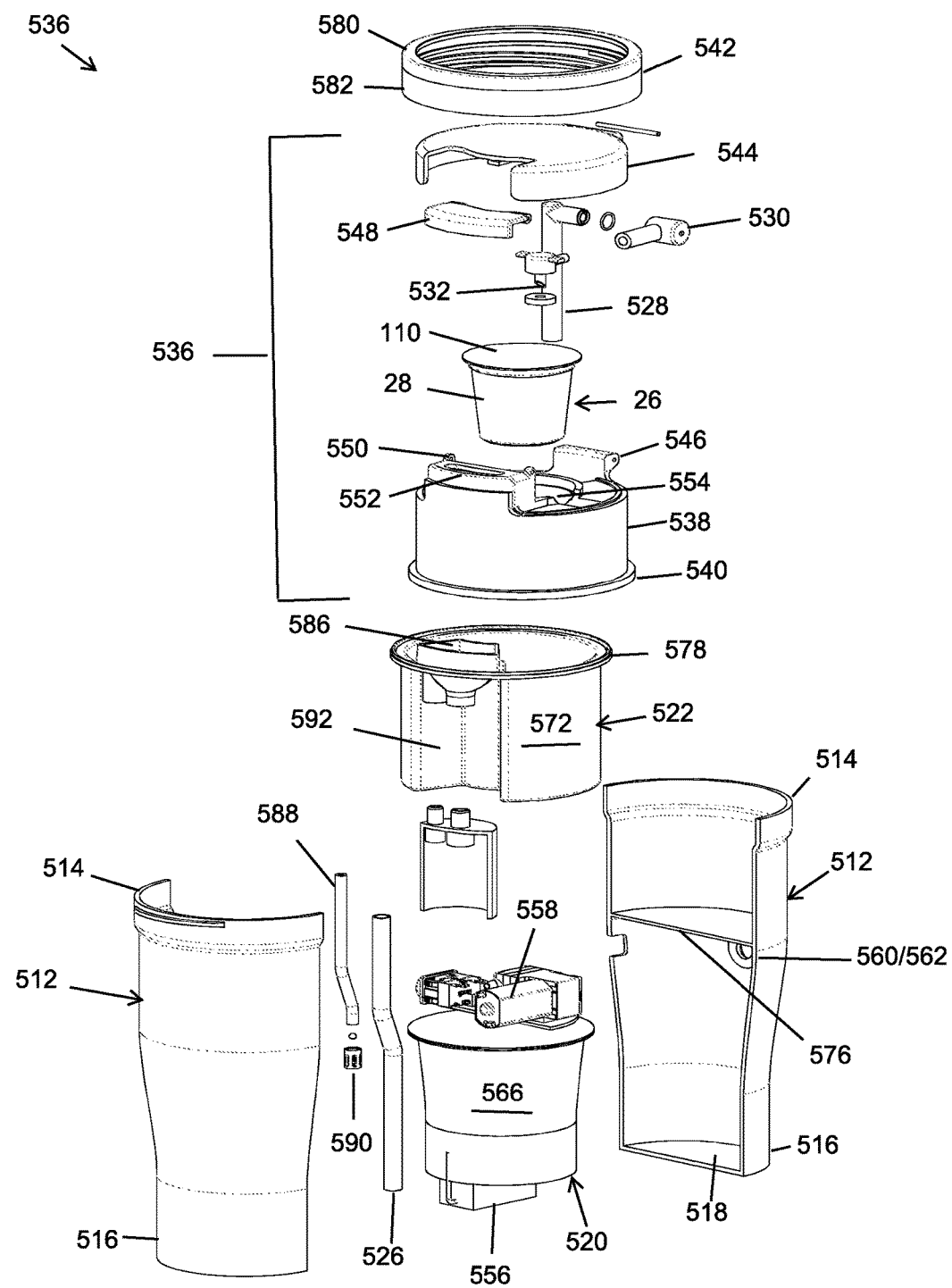
FIG. 40 is a perspective exploded view of the portable coffee brewing device shown in FIGS. 24-39.

Alternative Embodiment: With reference to FIG. 9, an alternative arrangement is presented that is slightly modified from the embodiment presented in FIGS. 7-8D. This alternative arrangement has a bottom component 284 which is positioned below the container 212. Bottom component 284 includes a drain 286 which fluidly connects to the bottom of container 212. Drain is fluidly connected to pump 246 which is fluidly connected to heating element 248. Heating element 248 fluidly connects to lower straw 232 which fluidly connect to upper straw 250. Upper straw 250 dispenses fluid onto the coffee grounds within the coffee basin 234. The remaining components of the system 210 are similar, if not identical to the system described herein.

Another Alternative Arrangement: With reference to FIGS. 10-23 an alternative arrangement is presented that is slightly modified from the embodiments presented in FIGS. 1-9. In this arrangement, a portable coffee brewing system 310 is presented that includes a container 312, a sleeve 314 positioned within the container 312, a heating element 316 positioned between the sleeve 314 and the container 312, an electrical components housing 318 connected to a lower end 320 of the container 312, and a lid 322 connected to the upper end 324 of the container 312.

Container: Container 312 is formed of any suitable size, shape and design and is any form of a liquid holding vessel such as a cup, a mug, a travel mug, a thermal mug, or the like. In one arrangement, as is shown, container 312 includes a sidewall 28 that extends in a generally circular manner from upper end 324 to lower end 320 and defines a hollow interior 326 therein.

In the arrangement shown, the upper end 324 of container 312 includes an angled portion 328 that angles outward to an upper portion 330 that has a larger diameter than the diameter of the portion of container 312 below the angled portion 328. The angled portion 328 and larger diameter upper portion 330 provide additional space for the components of lid 322 therein.

Container 312 also includes a plurality of vents 332 positioned at the lower end 320 of container 312. Vents 332 are configured to vent heat out of container 312 during operation of the device 310. Vents 332 also allow for the drainage of water or condensation that gets between container 312 and sleeve 314.

A hinge 334 is connected to the upper end 324 of upper portion 330 of container 312. Hinge 334 serves to pivotally connect lid 332 to container 312. The upper end 324 of container 312 also includes a catch 336 that is configured to receive latch 338 connected to lid 322 when lid 322 is in a closed position.

Sleeve: Sleeve 314 is formed of any suitable size, shape and design and is configured to fit within container 312 and hold liquid/coffee therein. In one arrangement, sleeve 314 is formed of a metallic material such as aluminum, stainless steel or the like, whereas container 312 is formed of a plastic or composite material. In the arrangement shown, sleeve 314 is configured to fit within container 312 and generally follow the contours of container 312 with a space between the exterior surface of sleeve 314 and the interior surface of container 312. More specifically, like container 312, sleeve 314 has a generally cylindrical sidewall that extends from a lower end 320 to an upper end 324 and includes an angled portion 328 that connects to upper portion 330 that has a larger diameter than the portion of sleeve below the angled portion.

A lip 340 is connected to the upper end 324 of sleeve 314 and extends outward therefrom. Lip 340 connects to the upper end 324 of container 312 and in one arrangement seals to container 312. Lip 340 helps to prevent liquid from getting between container 213 and sleeve 314. Lip 340 also helps to index the position of sleeve 314 within container 312. That is, sleeve 314 is fully inserted within container 312 when lip 340 engages the upper end 324 of container 312.

The lower end 320 of sleeve 314 includes a bottom wall 342 that closes the lower end 320 of sleeve 314. Bottom wall 342 includes a drain 344 that is fluidly connected to an inlet side of pump 346. Bottom wall 342 also includes an output opening 348 that is fluidly connected to an output side of pump 346. In this way, when pump 346 is activated, fluid is sucked from the hollow interior 326 of sleeve 314/container 312 through drain 344 and then is pumped out of output opening 348.

In one arrangement, sleeve 314 is removable from container 312 thereby allowing for easy cleaning of sleeve 314, such as by throwing the sleeve 314 in the dishwasher. In another arrangement, sleeve 314 is non-removable from container 312, thereby ensuring a proper and enduring seal is made between sleeve 314 and container 314 thereby preventing any liquid from getting between sleeve 314 and container 312.

Heating Element: Heating element 316 is formed of any suitable size, shape and design. In the arrangement shown, heating element 316 is positioned within the space between the interior surface of container 312 and the exterior surface of sleeve 314. In the arrangement shown, heating element 316 is formed of a flexible pad that includes a heating element therein. In one arrangement, the pad material is formed of silicone, or a flexible silicone composite, or alternatively the pad material is formed of plastic or any other composite material.

In the arrangement shown, heating element 316 is wrapped around the exterior cylindrical surface of sleeve 314 between the lower edge of angled portion 328 and the bottom wall 342. In one arrangement, to maximize heat transfer to the sleeve 314 and the liquid contained within sleeve 312, heating element 316 is adhered directly to the exterior surface of sleeve 312 using an adhesive. In an alternative arrangement, to maximize heat transfer to the sleeve 314 and the liquid contained within sleeve 314, the interior surface of heating element 316 is bonded to the exterior surface of sleeve 314 using a heat transfer compound, a heat transfer paste, a heat sink compound, a heat sink paste or any other material that bonds and/or helps to transfer heat from one object to another.

In one arrangement, after the heating element 316 is wrapped around the sleeve 314, thermal insulating material 350 is wrapped around the exterior surface of heating element 316. Thermal insulating material 350 is formed of any material or device that helps to insulate the exterior surface of heating element 316, and thereby help to direct or focus the heat produced by heating element 316 toward sleeve 314 and away from container 312. In one arrangement, thermal insulating material 350 is a thermally insulating tape, such as an aluminum tape, a metallic tape, fiberglass tape, a ceramic tape or any other type of tape that helps to direct and focus the heat produced by heating element 316 inward. In one arrangement, thermal insulating material 350 adheres to the exterior surface of heating element 316 and thereby helps to hold heating element 314 firmly onto sleeve 314 thereby improving and maximizing the heat transfer into sleeve 314. By wrapping heating element 316 with tape, this also helps to maintain the dimensional size, shape and accuracy of the sleeve 314 with the heating element 316 positioned there around, which eases assembly of sleeve 314 into container 312.

Heating element 316 electrically connects to microprocessor 352 which, in operation, controls operation of heating element 316 which serves to heat the liquid within sleeve 312.

While in the arrangement shown in FIGS. 10-23 the heating element 316 wraps around the sleeve 314, in an alternative arrangement the heating element 316 is positioned adjacent the bottom of sleeve 314.

In an alternative arrangement, heating element 316 is formed of what is known as a thick film heating element also known as thick film conduction heater. Thick film heating elements are formed of a thick film that includes a heating element therein that is connected to or adhered with a substrate film. The thick film heating element can be adhered or bonded directly to the exterior surface of sleeve 314, or alternatively the thick film heating element is printed directly onto the exterior surface of sleeve 314. Thick film heating elements are known for fast response and uniform heating as well as maximum heat transfer, thermal efficiency and temperature uniformity all while in a thin package that provide maximum room for other components. They provide maximum temperature response in a low profile package. They provide ultra-fast temperature ramp and allows for quick cool down. They allow for uniform temperatures to be provided across the heater's surface area in addition they can be precisely controlled. The use of a thick film heating element allows the space between the sleeve 314 and container 312 to be a minimum. Also, the use of a thick film heating element allows the use of additional or thicker insulation around the thick film heating element and sleeve 314 thereby additionally improving thermal efficiency. One manufacturer of these thick film heating elements is Watlow Electric Manufacturing Company having an address of 12001 Lackland Road St. Louis Mo. 63146.

Electrical Components Housing: Electrical components housing 318 is connected to the lower end 320 of container 312 and houses microprocessor 352, pump 346, and transceiver 354. Electrical components housing 318 is formed of any suitable size, shape and design. In the arrangement shown, electrical components housing 318 is formed of a generally cylindrical member having an upper portion 356 and a lower portion 358.

In the arrangement shown, pump 346 is held within upper portion 356 of electrical components housing 318. In addition, sensor 360 is held within the upper portion 356. Sensor 360 is any form of a device which senses operational characteristics of the system 310, such as temperature, or the like. Sensor 360 transmits the sensed information, such as temperature, to microprocessor 352, from this information microprocessor 352 controls operation of the system 310.

A circuit board 362 is also held with electrical components housing 318. In the arrangement shown, circuit board 362 is held between the upper portion 356 and the lower portion 358. By spacing the circuit board 362 a distance away from the heating element 316, this spacing tends to attenuate or reduce the heat received by the sensitive electrical components of circuit board 362. In one arrangement, circuit board 362 includes or is electrically connected to all of the electrical components that control operation of system 310 including microprocessor 352 and transceiver 354.

Microprocessor 352 is any device which receives information or signals, processes the information or signals and executes instructions stored in memory. In this way, microprocessor 352 controls operation of the system 310. Transceiver 354 is electrically connected to microprocessor 352. Transceiver 354 is any device that transmits and/or receives signals through an antenna 364. Antenna 364 is any device which converts electric power into radio waves, and vice versa. In this way, the connection of transceiver 354 and antenna 364 allow for wireless control of system 310, as is further described herein, by sending and receiving wireless control signals through transceiver 354 and antenna 364.

Electrical components housing 318 also includes a switch 366 therein. Switch 366 is any device which turns the power on or off to the electrical components of system 310. Electrical components housing 318 also includes a socket 368 that is configured to receive an electrical connection to an external power source, such as by plugging the system 10 into a USB port or a conventional wall plug.

Lid & Basket: Lid 322 is connected to the upper end 324 of container 312 and sleeve 314. Lid 322 is formed of any suitable size shape and design and serves to close the upper end 324 of container 312 and sleeve 314. In the arrangement shown, lid 322 is hingedly connected to container 312 by hinge 334 which allows lid 322 to rotate between an open position and a closed position. In a closed position, engagement between latch 338 of lid 322 and catch 336 of container 312 hold lid 322 in a closed position.

Lid 322 includes a pour spout 370 therein that provides a fluid passageway to the fluid held within sleeve 312. Lid 322 also includes a cover 372 that is movable between an open position where access is provided to pour spout 370 and a closed position where cover 372 closes pour spout 370.

A basket 374 is positioned between lid 322 and container 312, and/or is held between lid 322 and container 312. Basket 374 is formed of any suitable size, shape and design and is configured to hold coffee grounds therein during the brewing process. In one arrangement, as is shown, basket 374 includes an opening 376 that is sized and shaped to receive a coffee grounds holding device 378. Coffee grounds holding device 378 is formed of any suitable size, shape and design, and is in one arrangement is a K-Cup made commercially popular by Keurig Green Mountain, which is headquartered in Waterbury, Vt., however any other form of a coffee grounds holding device is hereby contemplated for use with the system 310.

Basket 374 includes a lip 380 positioned at its upper end that engages or indexes to lip 340 of sleeve 312 such that when lip 380 of basket is in engagement with lip 340 of sleeve 314, basket 374 is fully inserted within container 312/sleeve 314. In this position, basket 374 is held in place between the container 312 and sleeve 314 on its lower side and lid 322 on its upper side when lid 322 is in a closed position over basket 374.

Basket 374 includes a pour spout 382 therein that fluidly connects with the hollow interior 326 of sleeve 314 and pour spout 370 of lid 322. Basket 374 also includes an upper tube 384 that fluidly connects to a lower tube 386. Lower tube 386 removably connects at its lower end to output opening 348 in sleeve 314 and at its upper end to the lower end of upper tube 384 of basket 374. The upper end of upper tube 384 fluidly connects to upper punch 388 in lid 322. Upper punch 388 serves to fluidly connect to the upper end of upper tube 384 and also serves to punch a hole in the cover 390 of coffee grounds holding device 378 when lid 322 is closed on basket 374 with coffee grounds holding device 378 therein thereby providing a point of access for water to infiltrate into the coffee grounds holding device 378.

Basket 374 also includes a lower punch 392 positioned adjacent the bottom end of opening 376 that serves to punch a hole in the lower end of coffee grounds holding device 378 when lid 322 is closed on basket 374 with coffee grounds holding device 378 therein thereby providing a passageway for water to exit the coffee grounds holding device 378 through drain 394 in the lower end of basket 374.

When lid 322 is open, the sharp point of upper punch 388 is exposed. To provide an additional layer of safety, lid 322 includes a rotatable punch cover 396. When lid 322 is in an open position, punch cover 396 rotates into place thereby covering the sharp end of upper punch 388. When lid 322 is closed, punch cover 396 rotates thereby exposing upper punch 388 thereby allowing the sharp point of upper punch 388 to penetrate the cover 390 of coffee grounds holding device 378.

Basket 374 is removable from sleeve 314 and container 312 thereby facilitating easy cleaning of basket 374. Removing basket 374 also allows for easy removal of lower tube 386 for cleaning purpose. Removing basket 374 also allows for easy cleaning of the interior surface of sleeve 314.

Figure 3:
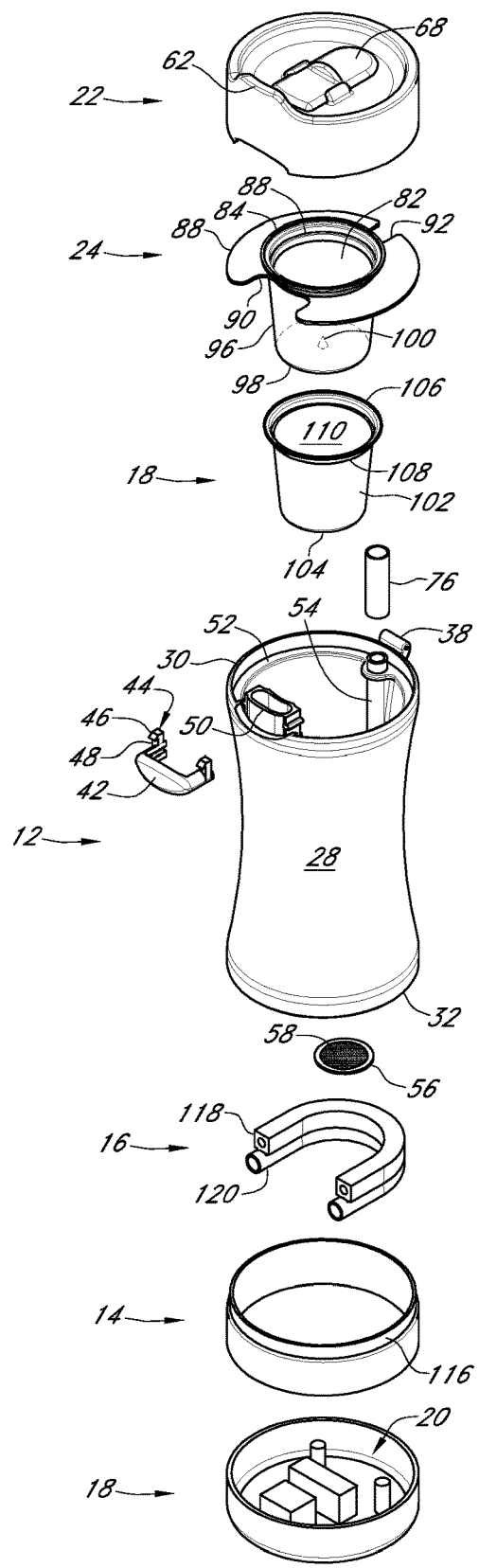
FIG. 3 is a perspective exploded view of a portable coffee brewing device showing the components thereof.
Figure 4:
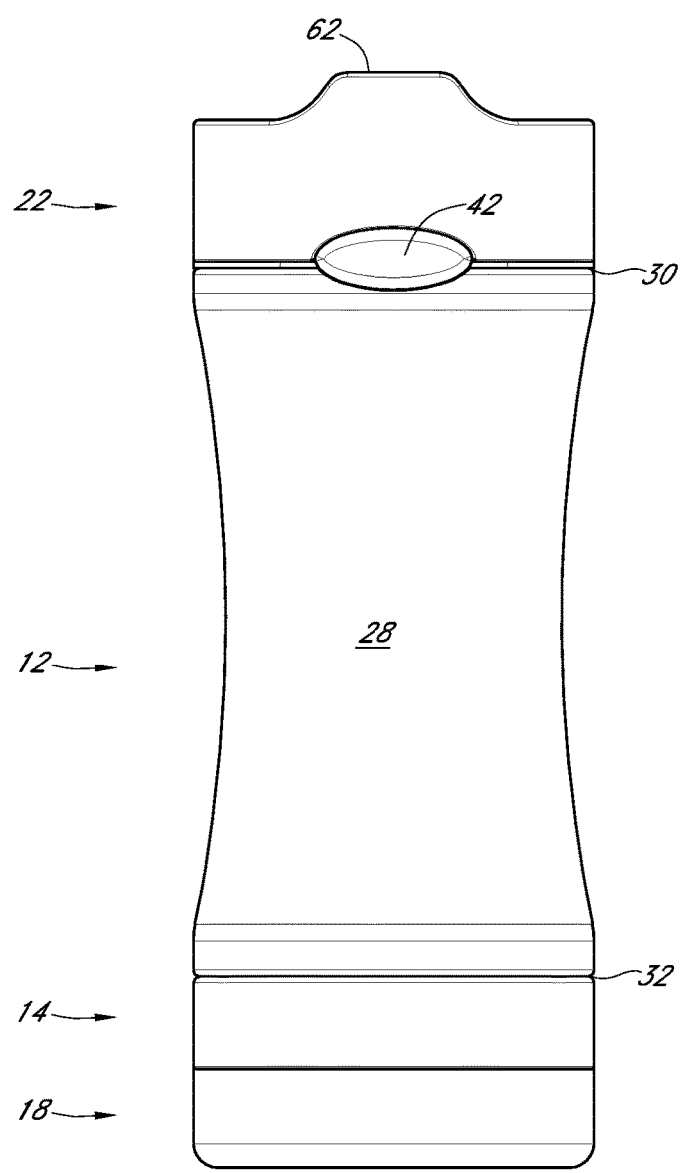
FIG. 4 is a front elevation view of a portable coffee brewing device.
Figure 5:
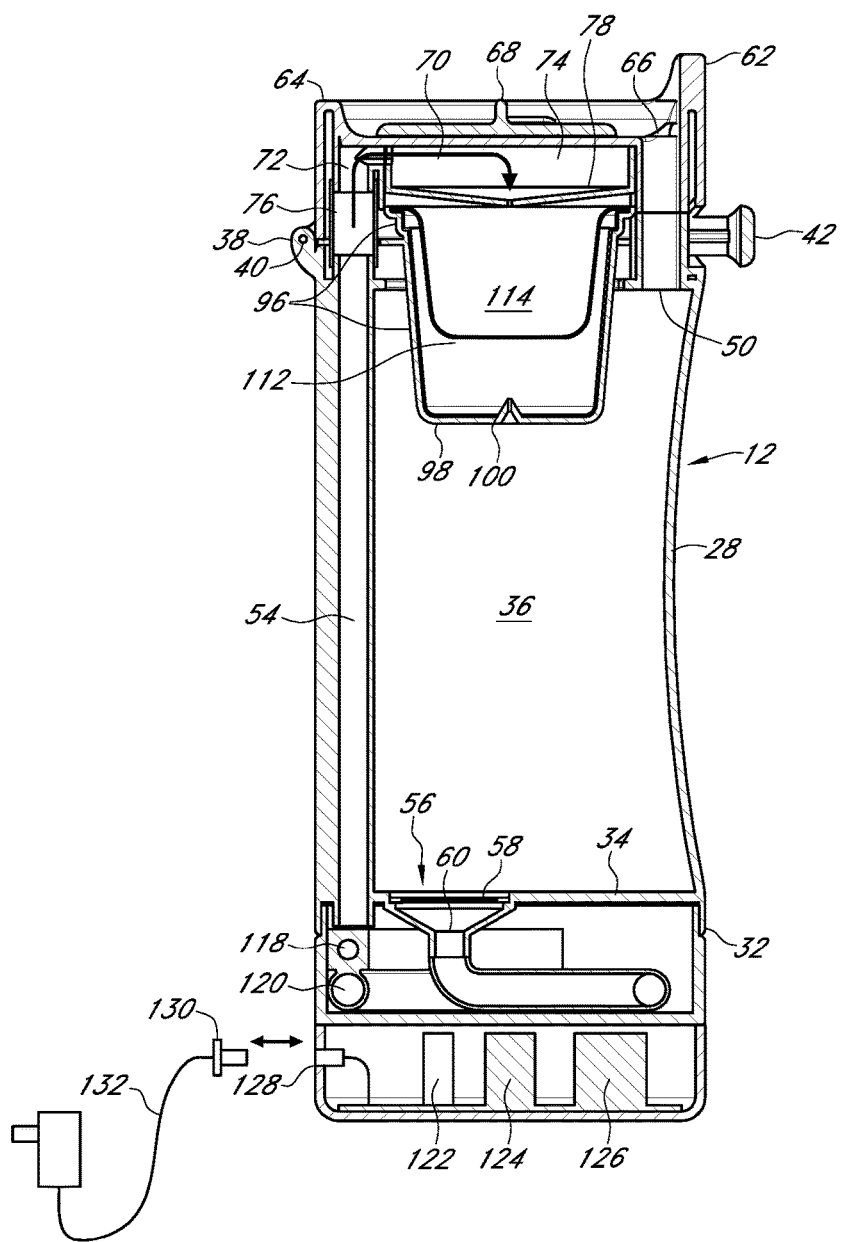
FIG. 5 is a side cut-away elevation view of a portable coffee brewing device.
Figure 6:
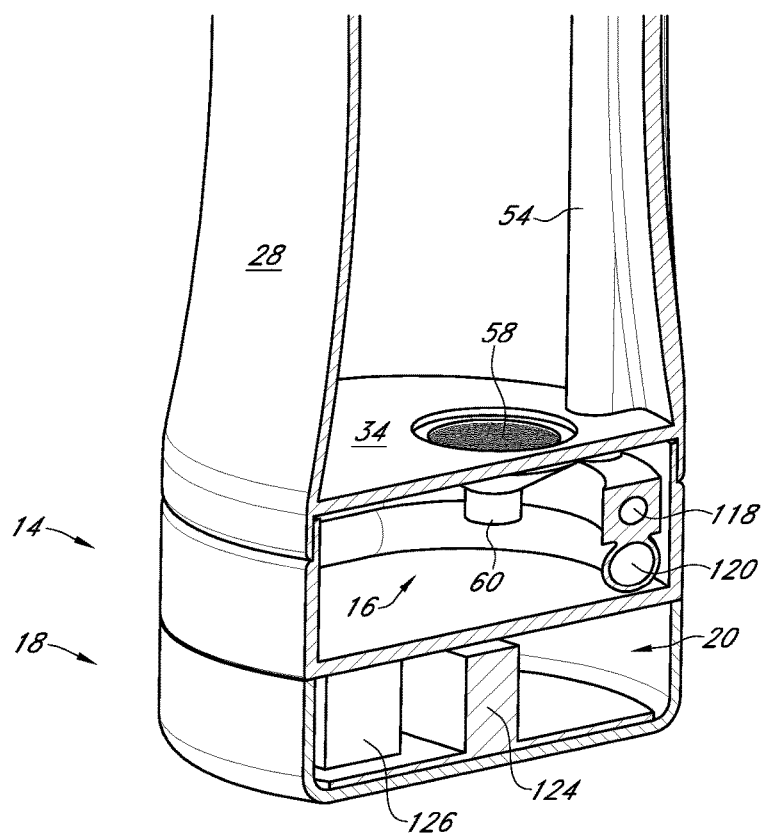
FIG. 6 is a side cut-away close-up perspective view of the bottom of a portable coffee brewing device.
Figure 7:
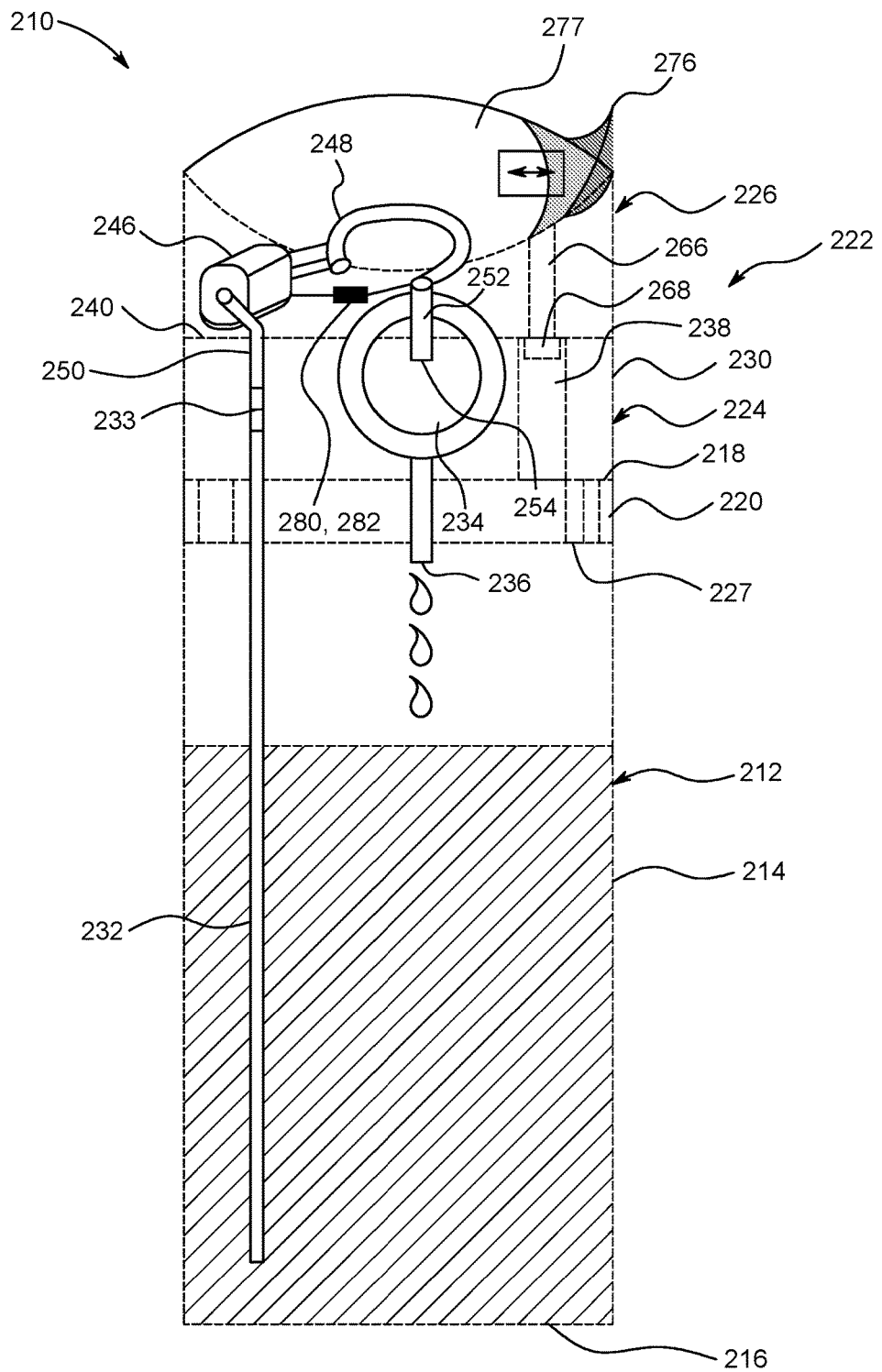
FIG. 7 is a side cut-away elevation view of a second embodiment of a portable coffee brewing device having a lid formed of a lower component and an upper component, a pump positioned within the lid and a coffee basin positioned within the lid.

While the term "basket" is used herein, this is term and the device it is used to describe is similar to the holder or insert 24 presented in FIGS. 3 and 5, as well as being similar in function to the lower component 224 of lid 22 presented in FIGS. 7-9 and the use of differing terminology should not distract from the similarities in function, purpose and design.

Display: In one arrangement, system 310 includes a display 398 which is electrically connected with microprocessor 352. Display 398 is formed of any suitable size, shape and design and is configured to display information related to the system 10. In one arrangement, display is positioned in the sidewall of electrical components housing 318, however it is hereby contemplated that display 398 may be positioned in any portion of the system 10.

In one arrangement, as is shown, display 398 is a digital display that is displays the status of the system, the temperature of the fluid within container 312, the amount of time the system 310 is set to brew for, the temperature the system 310 is set to brew at, the amount of brewing time left, the time, the time at which brewing will start, the amount of time that must pass before brewing will start, or any other information relevant to the system.

In one arrangement, microprocessor 352 and/or display 398 are electrically connected to an alarm 400. Alarm 400 is any device which indicates the state of system 310, such as when brewing is done, when a desired brewing temperature has been reached, when a desired drinking temperature has been reached, or any other information. Alarm 400 may be a speaker or other device that transmits a tone, noise or even spoken words, or a visual device such as a light or LED. In one arrangement, when alarm 400 is a color-changing LED alarm 400 is, for example, blue when in a powered ready state, red when brewing and green when ready.

In one arrangement, the display 398 is an interactive display that displays information about the system 310 as well as allows the user to set parameters such as:
The temperature at which brewing will start;
The amount of time that brewing will occur;
The time when brewing will occur;
Whether an alarm will issue when brewing is complete;
Whether an alarm will issue when the optimal consumption temperature is reached;
What the alarm settings are;
Any other setting.

Application: In one arrangement, system 310 is controllable through wireless control signals 402 sent and received between transceiver 354 through antenna 364 and application 404 running an a handheld device, such as a cell phone, tablet, laptop or other computing device 406.

Application 404 is any computer program designed to control system 310, display information related to system 310 and help the user enjoy use of system 310 through interaction with their cell phone or other computing device 406. In one arrangement, application 310 allows a user to wirelessly interact with their system 310 either directly, with wireless control signals 402 being exchanged directly between computing device 406 and transceiver 354/antenna 364, or through a wireless network 408, such as the internet. In doing so, the user may set the operating parameter of the system 310 such as:
The temperature at which brewing will start;
The amount of time that brewing will occur;
The time when brewing will occur;
Whether an alarm will issue when brewing is complete;
Whether an alarm will issue when the optimal consumption temperature is reached;
What the alarm settings are;
Whether music will play either through the computing device 406 or the alarm 400 when brewing is complete, and if so what music;
Whether music will play either through the computing device 406 or the alarm 400 when the optimal consumption temperature is reached, and if so what music;
Any other setting.

Application 404 allows the user to control brewing of their coffee in never before provided ways, such as by precise temperature setting, brew time setting and the like. In addition, application 404 allows the user to post to social media about their brewing experience. Application 404 also allows the user to order supplies, like replacement parts, more K-cups, coffee, or any other supply. Application 404 also allows for direct marketing to the user through application 404.

As computing device 406 is connected to the internet, any amount of information can be retrieved through the internet for use in the application. In addition, application 404 has access to the onboard memory of computing device 406. As such, application 404 can retrieve music to play through the computing device 406 and/or the audible alarm (speaker) 400 on the portable coffee brewing system 310 from the onboard memory of the computing device or from the internet.

Portable coffee brewing system 310 and application 404/computing device 406 communicate with one another using any form of a wireless communication protocol or language. Examples include the use of Bluetooth, Wi-Fi, Zigbee, Z-Wave or any other open source or proprietary language.

In Operation: A user using the system 310 opens the lid 322 which pivots upon hinge 334 thereby providing access to the basket 374. Next, the user removes the basket 743 and lower tube 386. Next the user fills the hollow interior 326 with the desired amount of water. The user then inserts the lower end of lower tube 386 into the output opening 348 in the bottom wall 342 of sleeve 314. Next, the user replaces the basket 374 in the upper end of the sleeve 314 and container 312. When inserting the basket 374 into container 312/sleeve 314, care is taken to ensure that the basket 374 is properly aligned with the upper end of lower tube 386 in alignment with and fluid communication with the lower end of upper tube 384. Once in the position, with the lip 380 of basket 374 in engagement with the lip 340 of sleeve 314/container 312 and upper rube 384 in alignment with and communication with lower tube 386, basket 374 is fully inserted within container 312.

Once basket 374 is inserted into container 312, coffee grounds holding device 378 (such as a K-Cup) is inserted within the opening 376 in basket 374. Next, the lid 322 is closed by pressing down on the forward end of the lid 322 thereby causing the lid 322 to rotate upon hinge 334 until the lower edge 408 of lid 322 seals with the upper edge of container 312/sleeve 314 and the latch 338 and catch 336 are in holding engagement with one another. Upon closing of lid 322, the lower punch 392 penetrates the bottom wall 410 of coffee grounds holding device 378 while the upper punch 388 penetrates the cover 372 of the coffee grounds holding device 378 thereby providing an entry point and exit point for water into and out of the coffee grounds holding device 378.

Now the system 310 is fully assembled and ready for transport and/or use. Once the user is ready to brew coffee, the user plugs the system 310 into a power source through plug 368 and then the user turns the brewing function on by use of switch 366. In doing so, unless modified by the user, as is further described herein, the system 310 will operate according to the factory settings.

That is, once activated, microprocessor 352 activates heating element 316. This cause energy to course through the filament embedded within the flexible silicone pad thereby heating the sleeve 314 and the water within sleeve 314. As this is occurring the sensor 360 senses the water temperature and transmits this information to microprocessor 352. Once microprocessor 352 detects that the pre-set brewing temperature has been reached (such as for example between 198° F. and 200° F.) microprocessor 352 activates pump 346.

When pump 346 is activated, pump 346 sucks water out of the hollow interior 326 of through drain 344 and then pumps the water out output opening 348, up lower tube 386, up upper tube 348, through upper punch 388, or alternatively through other piping within lid 322, through the coffee grounds held within coffee grounds holding device 378, and out the opening in the bottom of coffee grounds holding device 378 which is formed by lower punch 392 and out drain 394. This liquid then drains back into the hollow interior 326 and the process is repeated until pump 346 is deactivated. The flow of liquid/coffee follows Arrow A shown in FIG. 22.

In one arrangement, that includes an alarm 400 that is a light or LED, during the brewing process, the alarm 400 indicates that brewing is in-process, such as illuminating a first color such as red, yellow, or blue, and when the brewing process is complete the alarm 400 illuminates a second color, such as green or purple. In the arrangement wherein a consumption temperature is also set, the alarm 400 indicates that the preferred consumption temperature has been reach by illuminating a third color, such as white, when the temperature of the liquid drops below a predetermined consumption temperature informing the user that the coffee is ready to drink. In this way, the user is visually made aware of the status of the system 10.

Similarly, In one arrangement, that includes an alarm 400 that is a speaker, when the brewing process begins an alarm 400 is issued that indicates that brewing started, such as a first tone or noise, and when the brewing process is complete the alarm 400 issues a second tone or noise. In the arrangement wherein a consumption temperature is also set, the alarm 400 indicates that the preferred consumption temperature has been reach by issuing a third tone or noise when the temperature of the liquid drops below a predetermined consumption temperature informing the user that the coffee is ready to drink. In this way, the user is audibly made aware of the status of the system 10.

Similarly, the information about the system 310 is displayed on display 398, such as the current status of the system 310, such as brewing, waiting, ready, etc. In addition, other information is also visible on display 398, such as current liquid temperature, time, time until brewing begins, time until brewing completes, etc.

After the coffee is brewed, the user slides the cover 372 rearward thereby exposing the pour spout 370 and the user drinks the coffee from hollow interior 326.

Once empty, the user cleans the system by opening lid 322 by pivoting it on hinge 334 thereby exposing the basket 374 and coffee grounds holding device 378 which are both removed. In addition, the lower tube 386 is also removed, and in the arrangement with a removable sleeve 314, the sleeve 314 is removed as well. The coffee grounds holding device 378 is discarded. The lower tube 386 and sleeve 314 and the basket 374 can be washed, such as by placing them in a dishwasher. Once clean, the sleeve 314, lower tube 386, and basket 374 are reinserted into the container 312 and the system 310 is ready to be used again.

When an interactive display 398 is present, the user may modify any setting using the display 398, such as the brewing temperature, the preferred consumption temperature, when the brewing is to begin (such as at a certain time), how long brewing should last, among any other setting.

Similarly, when using application 404, the user may modify any setting using the application 404, such as the brewing temperature, the preferred consumption temperature, when the brewing is to begin (such as at a certain time), how long brewing should last, among any other setting. In addition, the user may post information to social media regarding their brewing experience through application 404, in addition they may order replacement parts or supplies, such as additional coffee or replacement coffee ground holding devices 378 (such as K-cups). When the user modifies a setting using application 404, a wireless control signal 402 is transmitted either over the air and directly to antenna 364, or through electronic network 408, such as the internet or a local network. Control signal 402 is received by antenna 364 which transmits the control single 402 to transceiver 354. Transceiver 354 receives the control signal 402, interprets it, and transmits it to microprocessor 352. Microprocessor 352 acts on the instructions received through control signal 402 to modify its operation accordingly.

Note: The use of the term K-Cup is only by way of example, and any form of a coffee grounds holding device manufactured by any maker is hereby contemplated for use with the system 310 and can be used by modifying the shape of basket 374 accordingly.

Batteries: While it is described herein to attach system 310 to an external battery source such as line power through a USB plug or conventional wall outlet, it is hereby contemplated to include an on-board power source, such as a battery or plurality of batteries, or battery pack within container 312 and/or electrical components housing 318. This battery or batteries provide the power for operation of the system as is described herein. This battery or batteries are charged by plugging into an external power source through plug 368.

Separator: In one arrangement, system 10 includes a separator 420. Separator 420 is formed of any suitable size, shape and design and is configured to separate the brewed coffee from the un-brewed water. In one arrangement, separator 420 is formed of a rigid or flexible membrane that is inserted within the hollow interior 36 of container 12 after the hollow interior 36 is filled with water. In this way, separator 420 floats on top of the water. When the system 10 is activated, and brewing is initiated, water is sucked out of the hollow interior 36 below the separator 420 and brewed coffee is injected or poured back into the hollow interior 36 on top of separator 420. In doing so, the separator 420 moves vertically within the hollow interior 36 of container 12 and floats on the diminishing level of un-brewed water below the separator 420 as brewed coffee is poured on top of the separator 420.

The brewing process is complete when the separator 420 reaches or engages the bottom wall 34 of hollow interior 36. In this position, all of the un-brewed water has been sucked out of the hollow interior 36 of the container 12 below separator 420 and has been replaced as coffee on top of the separator 420.

To ensure a proper seal between sidewall 28 of container 12 and the separator 420, and to ensure the water and brewed coffee are sufficiently separated, separator 420 has approximately the same size and shape as the hollow interior 36 and fits within hollow interior 36 with close and tight tolerances thereby separating the coffee and water while still allowing for vertical movement of separator 420 within hollow interior 36. Care is taken to ensure the dimensions and configuration properly separates the water from the coffee while allowing for proper and free vertical movement of separator 420—although some leakage is inevitable. In the arrangement shown, as one example, separator 420 includes a bottom wall 422 that extends across the hollow interior 36 and connects to a sidewall 424 that engages and seals with sidewall 28 of container 12. In one arrangement, sidewall 424 of separator 420 includes one or more seals, such as rubber gaskets, O-rings or the like, that engage sidewall 28 and improve sealing.

Separator 420 is easily removed from hollow interior 36 for cleaning purposes. The use of separator 420 helps to keep the internal components of system 10 clean by only running clean water through these components of the system 10.

Alternative Arrangement: In an alternative arrangement, with reference to FIGS. 24-40 a portable coffee brewing system 510 is presented. This portable coffee brewing device system 510 is similar to the other embodiments presented herein and therefore the teaching presented herein with reference to other embodiments applies to the embodiment of FIGS. 24-40 unless specifically specified otherwise (including the teaching related to all of the electrical components and functionality described herein, including microprocessor 352, transceiver 354, sensor 360, circuit board 362, antenna 364, switch 366, plug 368, display 398, alarm 400, wireless control 402, application 404, computing device 406, and the like components and functionality). In the arrangement shown, as one example, portable coffee brewing system 510 includes the components or features of: a container 512 having an upper end 514, a lower end 516 and a bottom wall 518, a first chamber 520, a second chamber 522, a hot water tube assembly 524 having a lower section 526, an upper section 528 and a pivot section 530, a first nipple 532, a second nipple 534, a lid 536 having main body 538, a lip 540, a collar 542, a first cover 544 connected by a first hinge 546 and a second cover 548 connected by a second hinge 550, a pour spout 552, and a basket 554, a heating element 556, a pump 558, an electrical socket 560, a vent 562 and a button 564, a coffee grounds holding device 26 having a sidewall 28 and a covering 110 that holds an amount of coffee grounds 114, among other components and features as is described herein.

Container: Portable coffee brewing system 510 includes a container 512. Container 512 is formed of any suitable size, shape and design and is configured to house and hold the other components of the system 510. In the arrangement shown, as one example, container 512 has an exterior surface that forms a generally cylindrical sidewall that extends from an upper end 514 to a lower end 516. Lower end 516 connects to a bottom wall 518 that encloses the lower end 516 of container 512. In this way, container 512 forms a hollow interior with an open upper end 514 that is configured to receive and hold the components of the system 510. In the arrangement shown, as one example, container 512 is formed of two parts that connect together along a seam in a clamshell-type arrangement. However, it is hereby contemplated that container 512 may be formed of any number of parts such as a single unitary part, two, three, four or more.

First Chamber: Portable coffee brewing system 510 includes a first chamber 520. First chamber 520 is formed of any suitable size, shape and design and is configured to receive and hold water to be used in the brewing process. In the arrangement shown, as one example, first chamber 520 has a generally cylindrical sidewall 266 that connects to a bottom wall 268 positioned at its lower end and is enclosed by an upper wall 270 at its upper end. In this way, first chamber 520 forms a hollow, enclosed, interior that holds water prior to brewing. First chamber 520 is positioned at or near the lower end of container 512 just above bottom wall 518.

Second Chamber: Portable coffee brewing system 510 includes a second chamber 522. Second chamber 522 is formed of any suitable size, shape and design and is configured to receive and hold water, or more specifically brewed coffee, tea or other beverage, after the brewing process. In the arrangement shown, as one example, second chamber 522 has a generally cylindrical sidewall 272 that connects to a bottom wall 274 positioned at its lower end. In the arrangement shown, as one example, the upper end of second chamber 522 is open and uncovered, however in other arrangements second chamber 522 may include a cover. Second chamber 522 is positioned above first chamber 520 and below lid 536.

In the arrangement shown, as one example, heating element 556 is operably connected to first chamber 520. Heating element 556 is formed of any electrically powered element that is capable of heating water for the brewing process, as is described herein. In the arrangement shown, as one example, heating element 556 is positioned below the bottom wall 568 of first chamber 520 and includes a coil member that extends upward and into the hollow interior of first chamber 520, however any other arrangement is hereby contemplated for use.

Also, in the arrangement shown, as one example, pump 558 is operably connected to first chamber 520 and is configured to facilitate movement of water from first chamber 520 into second chamber 522 during a brewing process. In one arrangement, pump 558 is an air pump that is configured to pressurize first chamber 520 so as to facilitate movement of water from first chamber 520 to second chamber 522. However, any other form of a pump is hereby contemplated for use, such as a water pump or the like.

In the arrangement wherein pump 558 is an air pump, pump 558 is connected to vent 562 so as to facilitate inflow of air into pump 558 so as to pressurize first chamber 520. In the arrangement shown, as one example, vent 562 is an opening in the sidewall of container 512. In alternative arrangements, pump 558 is vented in any other manner so as to provide airflow into pump 558. In the arrangement shown, as one example, pump 558 is positioned above first chamber 520, above upper wall 570, and facilitates airflow into first chamber 520 through an opening connected to the output of pump 558. Care is taken to facilitate pressurization and proper flow of water into and out of first chamber 520 by properly sealing first chamber 520 as well as using proper ventilation as well as directional valves, as is further described herein so as to facilitate the filling of first chamber 520 as well as the transfer of water from first chamber 520 to second chamber 522 through hot water tube assembly 524.

Hot Water Tube Assembly: Portable coffee brewing system 510 includes a hot water tube assembly 524. Hot water tube assembly 524 is formed of any suitable size, shape and design and is configured to facilitate the transfer of water from the first chamber 520 to the second chamber 522 during the brewing process. In the arrangement shown, as one example, hot water tube assembly 524 is formed of a hollow tube that is formed of a plurality of parts, including a lower section 526, an upper section 528 and a pivot section 520.

In the arrangement shown, as one example, lower section 526 extends into first chamber 520 and extends from a lower end, which is positioned just above the upper interior surface of bottom wall 568 of first chamber 520, upward through upper wall 570, past pump 558 and connects at its upper end to the lower end of upper section 528. Upper section 528 connects at its lower end to the upper end of lower section 526 and connects at its upper end to pivot section 530. The connection of upper section 528 to pivot section 530 includes a hinge that facilitates hinged movement of pivot section 530 as the first cover 544 is opened and closed, as is described herein. The end of pivot section 530, opposite upper section 528, is fluidly connected to first nipple 532. In this arrangement, when coffee grounds holding device 26 is in place within basket 554 of lid 540 and the first cover 544 is closed, first nipple 532 penetrates the covering 110 of coffee grounds holding device 26 thereby forming a fluid passageway into coffee grounds holding device 26. Similarly, when coffee grounds holding device 26 is in place within basket 554 of lid 540 and the first cover 544 is closed, second nipple 534 penetrates the bottom wall of coffee grounds holding device 26 thereby forming a fluid passageway out of coffee grounds holding device 26.

That is, during use, when first chamber 520 is filled with water and the brewing process is initiated, heating element 556 is powered thereby heating the water held within first chamber 520 to a desired temperature. Once the desired temperature is achieved, as is sensed by a sensor, as is described herein, pump 558 is activated. Once activated, pump 558 pulls air through vent 562 and pushes the air into first chamber 520. As first chamber 520 is sealed, air inflow into first chamber 520 pressurizes the first chamber 520. This pressurization causes water held within the first chamber 520 up the lower section 526 of hot water tube assembly 524, through the upper section 526 of hot water tube assembly 524, through the joint connecting upper section 528 and pivot section 530, through the pivot section 530, through first nipple and into the coffee grounds holding device 26. This heated water passes through the coffee grounds holding device 26 and drains through the second nipple 534 and drains into the second chamber 522 where it is held for drinking.

The formation of hot water tube assembly 524 out of a number of parts, which in the example shown, is formed of three components, lower section 526, upper section 528 and pivot section 530, allows for portions of the hot water tube assembly 524 to be non-removable in nature, or permanently affixed, whereas other portions are removable in nature, such as for cleaning and replacement purposes. In one arrangement, lower section 526 is non-removable or permanently affixed so as to facilitate proper sealing of first chamber whereas upper section 528 and pivot section 530 are removable for cleaning and replacement purposes. However any number of parts is hereby contemplated for use such as one, two, three, four or more parts.

Similarly in one arrangement, as is shown, first chamber 520 is non-removable in nature, whereas second chamber 522 is removable in nature so as to facilitate cleaning and replacement of the second chamber 522. In one arrangement, as is shown, container 512 includes a divider 576. Divider 576 is formed of any suitable size, shape and design and is configured to separate container 512 into an upper portion and a lower portion. In the arrangement shown, as one example, divider 576 is a flat and generally horizontally extending wall of the clamshell sections of container 512 such that when the two sections of container 512 are joined a sealed compartment is positioned below divider 576 whereas an compartment that is open to the open upper end 514 of container 512 is positioned above divider 576. In this arrangement, some, most or all of the electrical components are held within the sealed section of container 512 below divider 576, including heating element 556, pump 558 and the other electrical components of system 510. Also held within this sealed lower portion of container 512 is first chamber 520, which itself is sealed. Having the lower portion of container 512 being sealed provides protection to the electrical components and other components held within this section of the container 512.

Lid: Portable coffee brewing system 510 includes a lid 536. Lid 536 is formed of any suitable size, shape and design and is configured to close the upper end 514 of container 512 as well as to facilitate drinking out of the portable coffee brewing system 510 as well as facilitate the insertion and removal of a coffee grounds holding device 26. In the arrangement shown, as one example, lid 536 includes a main body 538. Main body 538 has an exterior sidewall that is similarly sized and shaped to the exterior sidewall of container 512 and includes a lip 540 positioned at its lower end. Lip 540 positioned at the lower end of main body 538 of lid 536 is configured to connect to and engage the upper end 514 of container 512, as well as connect to and engage an upper edge 578 of second chamber 522. In one arrangement a sealing member, such as an O-ring, a gasket, a seal or like sealing component, is positioned between the lower edge of lip 540 and the upper edge of 578 of second chamber 522 and or the upper end 514 of container 512 thereby sealing this connection.

In the arrangement shown, lip 540 extends outward a distance from the downwardly extending sidewall of the main body 538 of lid 536 thereby forming a shoulder having a larger diameter than the diameter of the exterior sidewall of lid 536. This outward extension serves as a stop surface that is configured to receive and engage a portion of collar 542. Collar 542 is formed of any suitable size, shape and design and is configured to engage and couple the lower edge of lid 536 to the upper end 514 of container 512. In the arrangement shown, collar 542 is a cylindrical member that fits around the lower end of lid 536 and stops by engagement of lip 540 while having a portion of collar 542 extend past and downward from lip 540. The interior surface of collar 542 that extends below lip 540 of lid 536 includes threads that engages threads in the exterior surface of the upper end 514 of container 512. In this way, collar 542 selectively connects lid 536 to container 512 by rotating collar 542 in a first direction, and collar 542 selectively disconnects lid 536 from container 512 by rotating collar 542 in a second direction opposite the first direction. In the arrangement shown, as one example, collar 542 is formed of an upper section 580, that engages and remains stationary with lid 536 and lip 540 and a lower section 582 includes threads on its interior surface that engages the upper end 514 of container 512 and rotates with respect to lid 536 and lip 540.

In the arrangement shown, as one example, lid 536 includes a first cover 544 connected to lid 536 by first hinge 546. First cover 544 is formed of any suitable size, shape and design and is configured to move between an open position and a closed position. In an open position, first cover 544 allows insertion and removal of coffee grounds holding device 26 into container 512 and./or lid 536. In the arrangement shown, as one example, first cover 544 covers basket 554 which is sized and shaped to receive and hold coffee grounds holding device 26 therein. Also, in the arrangement shown, as one example, pivot section 530 of hot water tube assembly 524 is connected to the lower surface of first cover 544 and moves with first cover 544 such that when first cover 544 is closed, first nipple 532, which is connected to the end of pivot section 530, penetrates the covering 110 of coffee grounds holding device 26 thereby forming an entry point into the coffee grounds holding device 26. Similarly as the first cover 544 is closed, the downward force applied to coffee grounds holding device 26 positioned below first cover 544 causes downward pressure onto coffee grounds holding device 26 thereby causing second nipple 534 to penetrate the lower wall of coffee grounds holding device 26 thereby forming an exit point out of coffee grounds holding device 26.

Basket 554 is formed of any suitable size, shape and design and is configured to receive and hold coffee grounds holding device 26. In the arrangement shown, as one example, basket 554 is formed within lid 536 and under first cover 544. However, in other arrangements, basket 554 is a removable member and/or a separate component that is held within lid 536 and/or within container 512. In the arrangement shown, basket 554 includes a generally cylindrical depression that is sized and shaped to receive coffee grounds holding device 26 therein with close and tight tolerances and includes a second nipple 534 positioned at its lower end that is configured to penetrate coffee grounds holding device 26 when first cover 544 is closed thereby providing a fluid passageway out of coffee grounds holding device 26 and into second chamber 522.

In the arrangement shown, as one example, lid 540 also includes a fill opening 584. Fill opening 584 is formed of any suitable size, shape and design and is configured to facilitate filling portable coffee brewing system 510 with fresh water before brewing. In the arrangement shown, fill opening 584 is positioned between basket 554 and first hinge 546 and connects to funnel 586. Funnell 586 is includes a fill tube 588 that facilitates transfer water from funnel 586 and into first chamber 520. In one arrangement, fill tube 588 includes a valve 590 that facilitates flow of water into first chamber 520 but prevents the flow of water or air out of first chamber 520 so as to facilitate pressurization of first chamber 520 by pump 558. In one arrangement, first chamber 520 includes a vent that facilitates the passage of air out of first chamber 520 during a filling process. In the arrangement shown, fill tube 588 and funnel 586 fit within a recess 592 in the sidewall 572 of second chamber 522 which provides egress for these components. In one arrangement, when first cover 544 is closed, first cover 544 seals the upper end of basket 554 and/or fill opening 584, so as to prevent leaking.

In the arrangement shown, as one example, lid 540 also includes a pour spout 552. Pour spout 552 is formed of any suitable size, shape and design and is configured to facilitate pouring and/or drinking of coffee from the coffee brewing system 510. More specifically, pour spout 552 provides a pathway for brewed coffee held within the second chamber 522 to pass out of container 512. In the arrangement shown, as one example, pour spout 552 is positioned on the front side of lid 536, opposite first hinge 546. Also, in the arrangement shown, the upper end of pour spout 552 is covered by second cover 548 which is connected to lid 536 by second hinge 550. In an open position, second cover 548 provides access to pour spout 552 whereas in a closed position second cover 548 seals the upper end of pour spout 552 to prevent leaking.

Portable coffee brewing system 10 also includes button 564 that is used to control operation of the system 10. Portable coffee brewing system 10 also includes an electrical socket 562 that is used to electrically connect portable coffee brewing system 10 to an external power source. Alternatively, and/or in addition, portable coffee brewing system 10 may include an on-board power source, such as one or more batteries.

In Operation: When using portable coffee brewing system 510, the user opens first cover 544 thereby exposing basket 554 as well fill opening 584. The user fills the portable coffee brewing system 510 by pouring water into fill opening 584. This water is funneled by gravity through funnel 586 and down fill tube 588 and into first chamber 520. As water fills first chamber 520, air is vented out of first chamber 520. With first cover 544 open, a coffee grounds holding device 26 is inserted within basket 554. Once coffee grounds holding device 26 is inserted within basket 554 and the first chamber 520 filled to the desired level, the first cover 544 is closed. As first cover 544 is closed, first cover 544 rotates upon first hinge 546 until first cover 544 fully closes, and latches or snaps closed. In a fully closed position, first cover 544 seals fill opening 584 and/or basket 554. Also, as first cover 544 is closed, first cover 544 forces first nipple 532 to penetrate covering 110 of coffee grounds holding device 26 while second nipple 534 penetrates the bottom of coffee grounds holding device 26.

In this closed position, portable coffee brewing system 510 may be transported in a pre-brewed state. Water held within the first chamber 520 is held in place and does not leak as first chamber 520 is sealed. In addition, first cover 544 seals the upper end of basket 554 and/or fill opening 584, and second cover 548 seals pour spout 552. As such, portable coffee brewing system 510 maybe transported in a pre-brewed state without fear of leaking.

Once the user gets to their desired location, and/or the time is right, the user plugs in the portable coffee brewing system 510, or in a system 510 that is battery powered no plugging in is required. Next, the user activates the system 510 by pressing button 564. Upon activation, heating element 556 heats water held within first chamber 520. Once water within first chamber 520 heats to the desired temperature, pump 558 is activated. When pump 558 is activated, pump 558 sucks air through vent 562, or through another vent or opening and pushes this air into first chamber 520. As first chamber 520 is sealed, as pump 558 pushes air into first chamber 520, first chamber 520 pressurizes. As first chamber 520 pressurizes, heated water is forced up the hot water tube assembly 524. More specifically, hot water enters the open lower end of lower section 526 of hot water tube assembly 524 which is positioned just above the bottom wall 568 of first chamber 520. This water then passes up through the lower section 526 and out of first chamber 520, through the intersection joining the lower section 526 to the upper section 528. Next the water passes through the joint joining the upper section 528 to the pivot section 530. Next the water passes through the pivot section 530, through first nipple 532 which penetrates covering 110 and into the hollow interior of coffee grounds holding device 26. This water percolates through the coffee grounds held within the coffee grounds holding device 26 and out the second nipple 534. As the water, which is now coffee, drains out of the coffee grounds holding device 26 through second nipple 534 it moves by the force of gravity and is captured by the open hollow interior of second chamber 522. This process continues until all water in first chamber 520 transitions through the coffee grounds holding device 26 and into second chamber 520. One benefit of this system 510 and the use of air to pressurize first chamber 520 is that once all of the water passes through first chamber 520 the pressurized air has a tendency to force the water through the coffee grounds holding device 26 thereby preventing the last bit of water from lingering in the coffee grounds holding device 26 and hot water tube assembly 524, which can occur if a water pump is used instead of an air pump. That is, the use of pressurized air helps to complete the brewing process in a more efficient and thorough and cleaner manner that purges the remaining water from the system 510.

After brewing has completed, when the user is ready to drink coffee, tea, or whatever else was brewed, the user simply opens second cover 548, which pivots on second hinge 550, thereby exposing pour spout 552. Next, the user tips back the portable coffee brewing system 510 and drinks from the pour spout 552.

The user may remove and replace the coffee grounds holding device 26 by simply opening the first cover 554 and refill the first chamber 520 by pouring water into the fill opening 584. The user may also clean the portable coffee brewing system 510 by rotating the lower section 582 of collar 542 thereby releasing the lid 536 from the upper end 514 of container 512. In one arrangement, when lid 536 is removed, this removes the upper section 528 and/or the pivot section 530 of hot water tube assembly 524, which separate at the intersection between the lower section 526 and the upper section 528, thereby allowing these components to be cleaned and/or replaced. Once lid 536 is removed, this exposes second chamber 522 which can be removed, cleaned and replaced.

In the arrangement shown, as one example, even when lid 536 is removed and second chamber 522 is removed, the divider 576 of container 512 maintains in place and keeps the electronic components (such as heating element 556 and pump 558 as well as all the other electronic components) as well as first chamber 520 sealed and protected and in place within the lower portion of container 512. In an alternative arrangement, a first chamber 520 is also removable so as to facilitate cleaning and replacement.

The portable coffee brewing system 510 may be assembled in the opposite manner. That is, the second chamber 522 is dropped into the upper open end of container 512. Next, with the second chamber 522 in place and resting upon the upper surface of divider 576, lid 536 is installed by aligning the lower end of lid 536 with the upper end 514 of container 512 and tightening collar 542 in place.

In this way, a new, useful, an non-obvious portable coffee brewing system 510 is presented.

From the above discussion, it will be appreciated that portable coffee brewing device presented improves upon the state of the art. That is, the portable coffee brewing device shown and described herein: is easy to use; brews a pleasing and high quality cup of coffee; is inexpensive to manufacture; has an intuitive design; has a robust and durable design; has a long and useful life; has a simple and ergonomic design; allows a user to make a fresh cup of coffee whenever and wherever they so desire; allows a user to load the device with water and coffee grounds at one time and one place while allowing for brewing of the coffee at another time and another place; uses what are known as K-cups; has an appealing design; is safe to use; is easy to clean; and does not leak; among countless other features and advantages.

Note that reference to coffee brewing herein is only by way of example. It is hereby contemplated that the system 10 can be used to brew any hot beverage such as tea, apple cider, hot chocolate, or the like and is not limited to coffee.

It will be appreciated by those skilled in the art that other various modifications could be made to the device without parting from the spirit and scope of this invention. All such modifications and changes fall within the scope of the claims and are intended to be covered thereby.

What is claimed:

1. A portable coffee brewing device comprising:
   a container;
   the container having a sidewall that extends from an upper end to a lower end;
   the container having an first chamber;
   wherein the first chamber is configured to receive water prior to brewing;
   the container having a second chamber;
   wherein the second chamber is configured to receive water after brewing;
   a lid;
   the lid operably connected to an upper end of the container;
   a cover;
   the first cover operably connected to the lid;
   the first cover configured to move between an open position and a closed position;
   a basket;
   the basket operably connected to the container;
   a coffee grounds holding device operably held by the basket;
   the coffee grounds holding device having a wall that forms a hollow interior, an amount of coffee grounds held within the hollow interior of the coffee grounds holding device, and
   a covering that covers the hollow interior of the coffee grounds holding device;
   a hot water tube assembly;
   the hot water tube assembly fluidly connected to the first chamber;
   a nipple;
   wherein the nipple is configured to penetrate the coffee grounds holding device when the cover is moved to a closed position;
   a heating element;
   the heating element configured to heat water during a brewing process;
   a pump;
   wherein when the first chamber is filled with water and the pump and heating element are powered, fluid moves from the first chamber, through the hot water tube assembly, through the coffee grounds holding device and into the second chamber, thereby brewing coffee.

2. The device of claim 1, wherein the hot water tube assembly includes a lower section, an upper section and a pivot section.

3. The device of claim 1, wherein the pump is an air pump.

4. The device of claim 1, wherein the pump is a water pump.

5. The device of claim 1, wherein when activated, the pump pressurizes the first chamber thereby forcing water within the first chamber through the hot water tube assembly.

6. The device of claim 1, wherein the nipple is operably connected to the cover such that when the coffee grounds holding device is held by the basket and the cover is moved to a closed position, the nipple penetrates the coffee grounds holding device.

7. The device of claim 1, further comprising a second nipple operably connected to the basket, wherein when the coffee grounds holding device is held by the basket and the cover is moved to a closed position, the second nipple is configured to penetrate the coffee grounds holding device.

8. The device of claim 1, wherein the second chamber is held within the container in a removable manner so as to facilitate removal and cleaning of the second chamber.

9. The device of claim 1, wherein the pump is connected to a vent, wherein the vent facilitates air flow to the pump.

10. The device of claim 1, further comprising an electrical socket positioned in the portable coffee brewing device and connected to an external power source thereby powering electrical components of the portable coffee brewing device.

11. The device of claim 1, wherein the hot water tube assembly is removable for cleaning purposes.

12. The device of claim 1, wherein the hot water tube assembly is fluidly connected to the nipple.

13. The device of claim 1, wherein the basket is held within the lid.

14. The device of claim 1, wherein the basket is formed within the lid.

15. The device of claim 1, wherein the lid includes a collar, wherein the collar connects to the container through threaded engagement.

16. The device of claim 1, wherein the cover is connected to the lid by a hinge.

17. The device of claim 1, further comprising a drain positioned in a bottom wall of the first chamber, the drain having a one way valve.

18. The device of claim 1, wherein the heating element is positioned below the first chamber.

19. The device of claim 1, wherein water passes through the heating element between the first chamber and the second chamber during brewing.

20. The device of claim 1, wherein the pump is positioned between the first chamber and the second chamber.

21. The device of claim 1, wherein when activated, the heating element heats fluid within the hot water tube assembly.

22. The device of claim 1, wherein the portable coffee brewing device is powered by an on-board power source, wherein the power source is formed of one or a plurality of batteries.

23. The device of claim 1, further comprising a second cover operably connected to the lid, the second cover configured to cover a pour spout.

24. A portable coffee brewing device comprising:
a container;
the container having a sidewall that extends from an upper end to a lower end;
the container having an first chamber;
wherein the first chamber is configured to receive water prior to brewing;
the container having a second chamber;
wherein the second chamber is configured to receive water after brewing;
a coffee grounds holding device operably connected to the container;
the coffee grounds holding device having a wall that forms a hollow interior, an amount of coffee grounds held within the hollow interior of the coffee grounds holding device, and
a covering that covers the hollow interior of the coffee grounds holding device;
a hot water tube assembly;
the hot water tube assembly fluidly connected to the first chamber;
a nipple;
wherein the nipple is configured to penetrate the coffee grounds holding device;
a heating element;
the heating element configured to heat water during a brewing process;
a pump;
wherein when the first chamber is filled with water and the pump and heating element are powered, fluid moves from the first chamber, through the hot water tube assembly, through the coffee grounds holding device and into the second chamber, thereby brewing coffee.

25. A portable coffee brewing device comprising:
a container;
the container having a sidewall that extends from an upper end to a lower end;
the container having an first chamber;
wherein the first chamber is configured to receive water prior to brewing;
the container having a second chamber;
wherein the second chamber is configured to receive water after brewing;
a coffee grounds holding device operably connected to the container;
the coffee grounds holding device having a wall that forms a hollow interior, an amount of coffee grounds held within the hollow interior of the coffee grounds holding device, and
a covering that covers the hollow interior of the coffee grounds holding device;
a hot water tube assembly;
the hot water tube assembly fluidly connected to the first chamber;
a first nipple;
a second nipple;
wherein the first nipple is configured to penetrate the covering of the coffee grounds holding device thereby forming an entry into the coffee grounds holding device and the second nipple is configured to penetrate the wall of the coffee grounds holding device thereby forming an exit out of the coffee grounds holding device;
a heating element;
the heating element configured to heat water during a brewing process;
a pump;
wherein when the first chamber is filled with water and the pump and heating element are powered, fluid moves from the first chamber, through the hot water tube assembly, through the coffee grounds holding device and into the second chamber, thereby brewing coffee.

* * * * *